(12) United States Patent
Kijima

(10) Patent No.: US 7,295,765 B1
(45) Date of Patent: *Nov. 13, 2007

(54) DIGITAL IMAGE RECORDING AND REPRODUCING APPARATUS HAVING FORMATS CORRESPONDING TO PIXEL CONFIGURATIONS

(75) Inventor: Takayuki Kijima, Akiruno (JP)

(73) Assignee: Olympus Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1826 days.

(21) Appl. No.: 08/645,487

(22) Filed: May 13, 1996

(30) Foreign Application Priority Data

May 16, 1995 (JP) ............................... H7-117522

(51) Int. Cl.
*H04N 5/225* (2006.01)

(52) U.S. Cl. .................. 386/117; 348/294

(58) Field of Classification Search ................ 358/335, 358/310, 906, 342; 348/441, 445, 913, 207, 348/448, 314, 294; 360/33.1, 35.1; 386/117, 386/124; H04N 5/76, 5/78, 5/781, 5/765, H04N 11/20, 11/24, 7/01, 5/225, 9/79
See application file for complete search history.

(56) References Cited

U.S. PATENT DOCUMENTS

| | | | | |
|---|---|---|---|---|
| 4,633,293 A | * | 12/1986 | Powers | 348/441 |
| 4,672,424 A | * | 6/1987 | Lechner | 348/472 |
| 4,734,772 A | * | 3/1988 | Akiyama | 348/340 |
| 4,837,628 A | | 6/1989 | Sasaki | |
| 4,872,054 A | * | 10/1989 | Gray et al. | 348/441 |
| 5,130,814 A | * | 7/1992 | Spencer | 358/335 |
| 5,138,459 A | | 8/1992 | Roberts et al. | |
| 5,307,171 A | * | 4/1994 | Azuma et al. | 358/335 |
| 5,327,235 A | * | 7/1994 | Richards | 348/441 |
| 5,337,154 A | * | 8/1994 | Dorricott et al. | 348/448 |
| 5,374,955 A | * | 12/1994 | Furuhata et al. | 348/264 |
| 5,402,171 A | * | 3/1995 | Tagami et al. | 348/219 |
| 5,428,454 A | * | 6/1995 | Kimura et al. | 358/335 |
| 5,450,129 A | | 9/1995 | Matoba et al. | |
| 5,473,381 A | * | 12/1995 | Lee | 348/441 |
| 5,517,588 A | | 5/1996 | Kondo | |

(Continued)

FOREIGN PATENT DOCUMENTS

JP 6-142689 7/1985

(Continued)

*Primary Examiner*—Young Lee
(74) *Attorney, Agent, or Firm*—Volpe and Koenig, P.C.

(57) ABSTRACT

In a digital image recording/reproducing apparatus of the invention, image data obtained via a charge-coupled-device (CCD) is processed by a processing circuit so as to produce a luminance signal and color-difference signals, which are supplied to corresponding first frame memories via selectors and temporarily stored therein. Then the data are read from the first frame memory and subjected to data conversion in terms of vertical pixels via line memories and further via vertical pixel conversion circuits. The data is then subjected to data conversion in terms of horizontal pixels via a first horizontal pixel conversion circuit. The resultant data is selectively supplied to a monitor and an electronic viewfinder via a selector or stored in a second frame memory. The data stored in the second frame memory is read via a selector and subjected to data compression. The resultant data is then recorded on a recording medium.

29 Claims, 37 Drawing Sheets

| | U.S. PATENT DOCUMENTS | | | JP | 0 507 297 A2 * | 10/1992 |
|---|---|---|---|---|---|---|
| | | | | JP | 05-122574 | 5/1993 |
| | 5,585,856 A | 12/1996 | Nakaya et al. | JP | 5-328185 | 12/1993 |
| | FOREIGN PATENT DOCUMENTS | | | JP | 06-205278 | 7/1994 |
| | | | | JP | 7-123369 | 5/1995 |
| JP | 2-170790 | * | 7/1990 | | | |
| JP | 3-148970 | * | 6/1991 | | | |
| JP | 4-79585 | | 3/1992 | * cited by examiner | | |

FIG.2

| HORIZONTAL PIXEL NUMBER | H1 | H2 | H3 | H4 | H5 | H6 | H7 | H8 | H9 | H10 | H11 | H12 | H13 | H14 | H15 | H16 |
|---|---|---|---|---|---|---|---|---|---|---|---|---|---|---|---|---|
| 800 HORIZONTAL PIXELS | A | B | C | D | E | F | G | H | I | J | K | L | M | N | O̅ | P |

| HORIZONTAL PIXEL NUMBER | H1 | H2 | H3 | H4 | H5 | H6 | H7 | H8 | H9 | H10 | H11 | H12 | H13 | H14 | H15 |
|---|---|---|---|---|---|---|---|---|---|---|---|---|---|---|---|
| 768 HORIZONTAL PIXELS | $\frac{15A+1B}{16}$ | $\frac{14B+2C}{16}$ | $\frac{13C+3D}{16}$ | $\frac{12D+4E}{16}$ | $\frac{11E+5F}{16}$ | $\frac{10F+6G}{16}$ | $\frac{9G+7H}{16}$ | $\frac{8H+8I}{16}$ | $\frac{7I+9J}{16}$ | $\frac{6J+10K}{16}$ | $\frac{5K+11L}{16}$ | $\frac{4L+12M}{16}$ | $\frac{3M+13N}{16}$ | $\frac{2N+14O̅}{16}$ | $\frac{1O̅+15P}{16}$ |

FIG.3

| HORIZONTAL PIXEL NUMBER | H1 | H2 | H3 | H4 | H5 | H6 | H7 | H8 | H9 | H10 | H11 |
|---|---|---|---|---|---|---|---|---|---|---|---|
| 800 HORIZONTAL PIXELS | A | B | C | D | E | A | B | C | D | E | A |

| HORIZONTAL PIXEL NUMBER | H1 | H2 | H3 | H4 | H5 | H6 | H7 | H8 | H9 |
|---|---|---|---|---|---|---|---|---|---|
| 640 HORIZONTAL PIXELS | $\frac{4A+1B}{5}$ | $\frac{3B+2C}{5}$ | $\frac{2C+3D}{5}$ | $\frac{1D+4E}{5}$ | $\frac{4A+1B}{5}$ | $\frac{3B+2C}{5}$ | $\frac{2C+3D}{5}$ | $\frac{1D+4E}{5}$ | $\frac{4A+1B}{5}$ |

FIG.5

| | PIXEL DATA OF A SOLID STATE IMAGING DEVICE | | CALCULATION OF IDEAL NONINTERLACED DATA | |
|---|---|---|---|---|
| | 600 VERTICAL PIXELS | | 480 LINES | |
| VERTICAL PIXEL NUMBER | 21 | LINE NUMBER | 22 | |
| V 1 | a1 | LINE 1 | a1+b1 |
| V 2 | b1 | LINE 2 | b1+a2 |
| V 3 | a2 | LINE 3 | a2+b2 |
| V 4 | b2 | | |
| V 5 | a3 | LINE 4 | b2+a3 |
| V 6 | b3 | LINE 5 | b3+a4 |
| V 7 | a4 | LINE 6 | a4+b4 |
| V 8 | b4 | LINE 7 | b4+a5 |
| V 9 | a5 | | |
| V 10 | b5 | LINE 8 | a5+b5 |
| V 11 | a6 | LINE 9 | a6+b6 |
| V 12 | b6 | LINE 10 | b6+a7 |
| V 13 | a7 | LINE 11 | a7+b7 |
| V 14 | b7 | | |
| V 15 | a8 | LINE 12 | b7+a8 |
| V 16 | b8 | LINE 13 | b8+a9 |
| V 17 | a9 | LINE 14 | a9+b9 |
| V 18 | b9 | LINE 15 | b9+a10 |
| V 19 | a10 | | |
| V 20 | b10 | LINE 16 | a10+b10 |
| V 21 | a11 | LINE 17 | a11+b11 |

FIG.6

INTERLACED OUTPUT OF A SOLID STATE IMAGING DEVICE
GENERATE 300-LINE DATA×2 FIELDS

GENERATE A NONINTERLACED 480-LINE STILL IMAGE DATA FROM THE INTERLACED OUTPUT OF THE SOLID STATE IMAGING DEVICE
→ CONVERT TO 480-LINE DATA

| ODD-NUMBERED FIELDS (23) | EVEN-NUMBERED FIELDS (24) | LINE NUMBER | (25) |
|---|---|---|---|
| LINE 1  $A1 = a1+b1$  (R−Y) | | LINE 1 | $Y=A1=a1+b1$  $R-Y=A1$  $(B-Y=B0)$ |
| | LINE 2  $B1 = b1+a2$  (R−Y) | LINE 2 | $Y=B1=b1+a2$  $R-Y=B1$  $(B-Y=A2)$ |
| LINE 3  $A2 = a2+b2$  (B−Y) | | LINE 3 | $Y=A2=a2+b2$  $(R-Y=B1)$  $B-Y=A2$ |
| | LINE 4  $B2 = b2+a3$  (B−Y) | LINE 4 | $Y=B2=b2+a3$  $(R-Y=A3)$  $B-Y=B2$ |
| LINE 5  $A3 = a3+b3$  (R−Y) | | LINE 5 | $Y=B3=b3+a4$  $R-Y=B3$  $(B-Y=A4)$ |
| | LINE 6  $B3 = b3+a4$  (B−Y) | LINE 6 | $Y=A4=a4+b4$  $(R-Y=B3)$  $B-Y=A4$ |
| LINE 7  $A4 = a4+b4$  (B−Y) | | LINE 7 | $Y=B4=b4+a5$  $(R-Y=A5)$  $B-Y=B4$ |
| | LINE 8  $B4 = b4+a5$  (B−Y) | LINE 8 | $Y=A5=a5+b5$  $R-Y=A5$  $(B-Y=B4)$ |
| LINE 9  $A5 = a5+b5$  (R−Y) | | LINE 9 | $Y=A6=a6+b6$  $(R-Y=B5)$  $B-Y=A6$ |
| | LINE 10  $B5 = b5+a6$  (R−Y) | LINE 10 | $Y=B6=b6+a7$  $(R-Y=A7)$  $B-Y=B6$ |
| LINE 11  $A6 = a6+b6$  (B−Y) | | LINE 11 | $Y=A7=a7+b7$  $R-Y=A7$  $(B-Y=B6)$ |
| | LINE 12  $B6 = b6+a7$  (B−Y) | LINE 12 | $Y=B7=b7+a8$  $R-Y=B7$  $(B-Y=A8)$ |
| LINE 13  $A7 = a7+b7$  (R−Y) | | LINE 13 | $Y=B8=b8+a9$  $(R-Y=A9)$  $B-Y=B8$ |
| | LINE 14  $B7 = b7+a8$  (R−Y) | LINE 14 | $Y=A9=a9+b9$  $R-Y=A9$  $(B-Y=B8)$ |
| LINE 15  $A8 = a8+b8$  (B−Y) | | LINE 15 | $Y=B9=b9+a10$  $R-Y=B9$  $(B-Y=A10)$ |
| | LINE 16  $B8 = b8+a9$  (B−Y) | LINE 16 | $Y=A10=a10+b10$  $(R-Y=B9)$  $B-Y=A10$ |
| LINE 17  $A9 = a9+b9$  (R−Y) | | LINE 17 | |
| | LINE 18  $B9 = b9+a10$  (R−Y) | | |
| LINE 19  $A10 = a10+b10$  (B−Y) | | | |
| | LINE 20  $B10 = b10+a10$  (B−Y) | | |

FIG.7

PIXEL DATA OF A SOLID STATE IMAGING DEVICE
600 VERTICAL PIXELS

INTERLACED OUTPUT DATA OF THE SOLID STATE IMAGING DEVICE
GENERATE 300-LINE DATA ×2FIELDS

| VERTICAL PIXEL NUMBER | 21 | ODD-NUMBERED FIELDS 23 | EVEN-NUMBERED FIELDS 24 |
|---|---|---|---|
| V 1 | a1 | LINE 1<br>A1 = a1+b1<br>(R-Y) | |
| V 2 | b1 | | LINE 2<br>B1 = b1+a2<br>(R-Y) |
| V 3 | a2 | LINE 3<br>A2 = a2+b2<br>(B-Y) | |
| V 4 | b2 | | LINE 4<br>B2 = b2+a3<br>(B-Y) |
| V 5 | a3 | LINE 5<br>A3 = a3+b3<br>(R-Y) | |
| V 6 | b3 | | LINE 6<br>B3 = b3+a4<br>(R-Y) |
| V 7 | a4 | LINE 7<br>A4 = a4+b4<br>(B-Y) | |
| V 8 | b4 | | LINE 8<br>B4 = b4+a5<br>(B-Y) |
| V 9 | a5 | LINE 9<br>A5 = a5+b5<br>(R-Y) | |
| V 10 | b5 | | LINE 10<br>B5 = b5+a6<br>(R-Y) |
| V 11 | a6 | LINE 11<br>A6 = a6+b6<br>(B-Y) | |
| V 12 | b6 | | LINE 12<br>B6 = b6+a7<br>(B-Y) |
| V 13 | a7 | LINE 13<br>A7 = a7+b7<br>(R-Y) | |
| V 14 | b7 | | LINE 14<br>B7 = b7+a8<br>(R-Y) |
| V 15 | a8 | LINE 15<br>A8 = a8+b8<br>(B-Y) | |
| V 16 | b8 | | LINE 16<br>B8 = b8+a9<br>(B-Y) |
| V 17 | a9 | LINE 17<br>A9 = a9+b9<br>(R-Y) | |
| V 18 | b9 | | LINE 18<br>B9 = b9+a10<br>(R-Y) |
| V 19 | a10 | LINE 19<br>A10 = a10+b10<br>(B-Y) | |
| V 20 | b10 | | LINE 20<br>B10 = b10+a10<br>(B-Y) |
| V 21 | a11 | | |

CONVERT INTERLACED OUTPUT DATA OF A SOLID STATE IMAGING DEVICE TO A 480-LINE MOVIE OUTPUT DATA FORMAT

CONVERT TO 240-LINE DATA × 2FIELDS

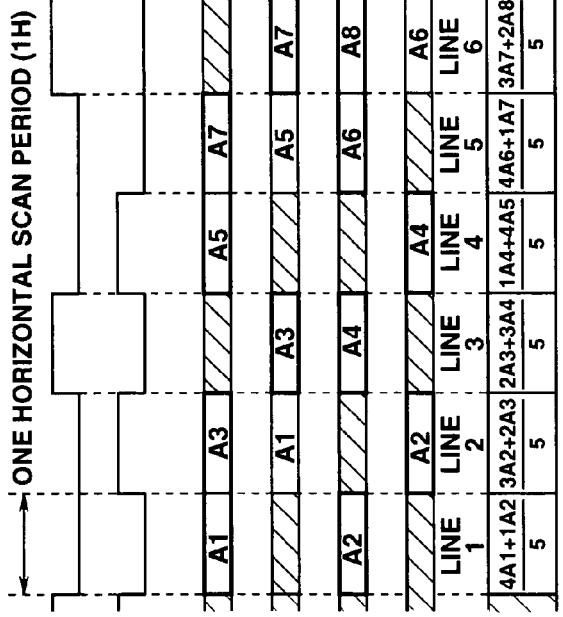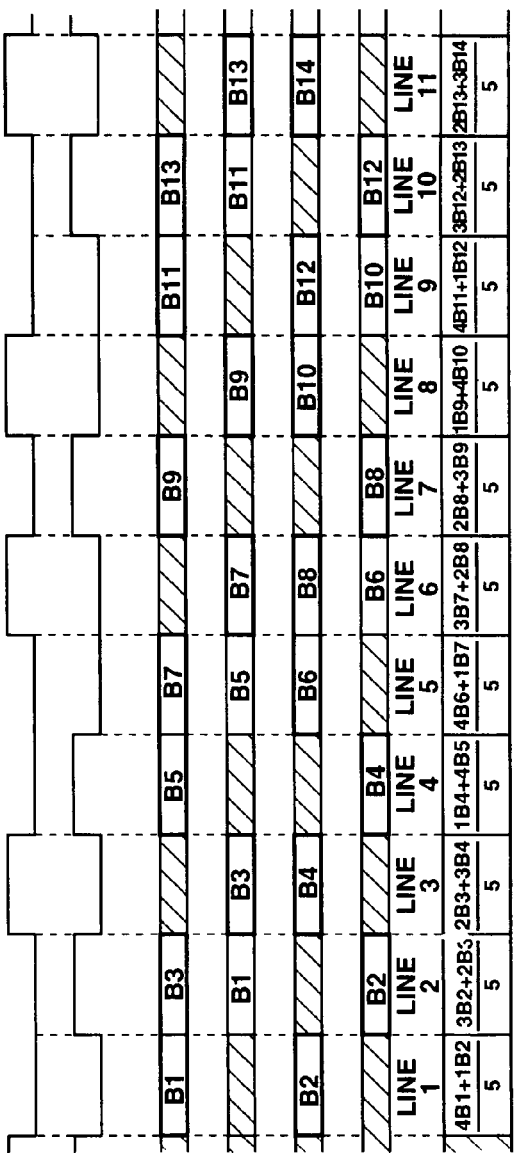
FIG.15A
FIG.15B

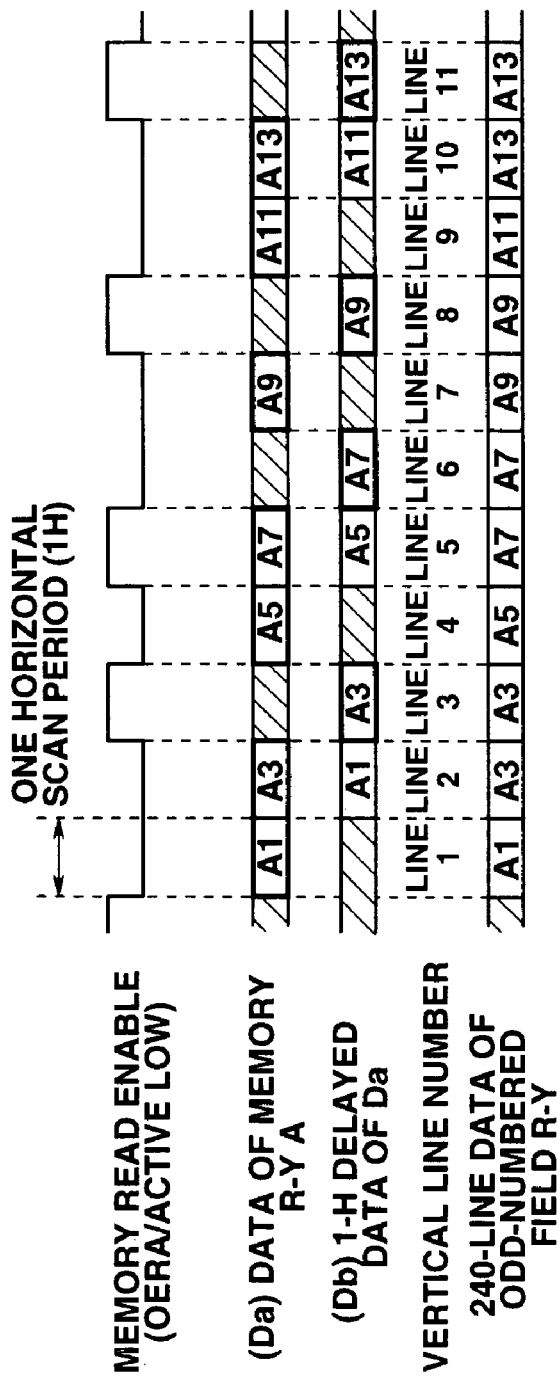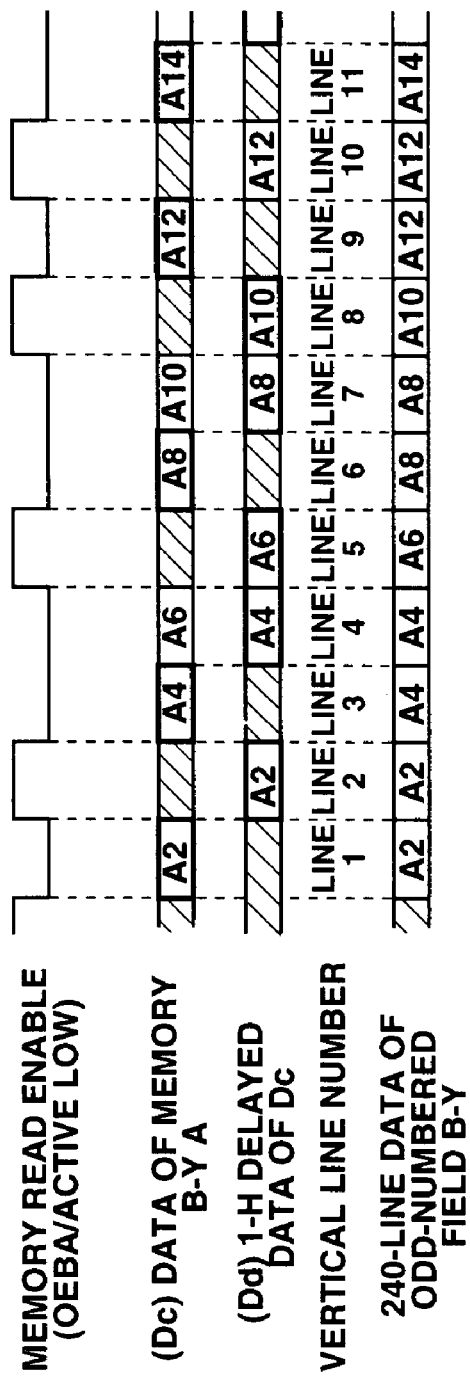
FIG.18A
FIG.18B

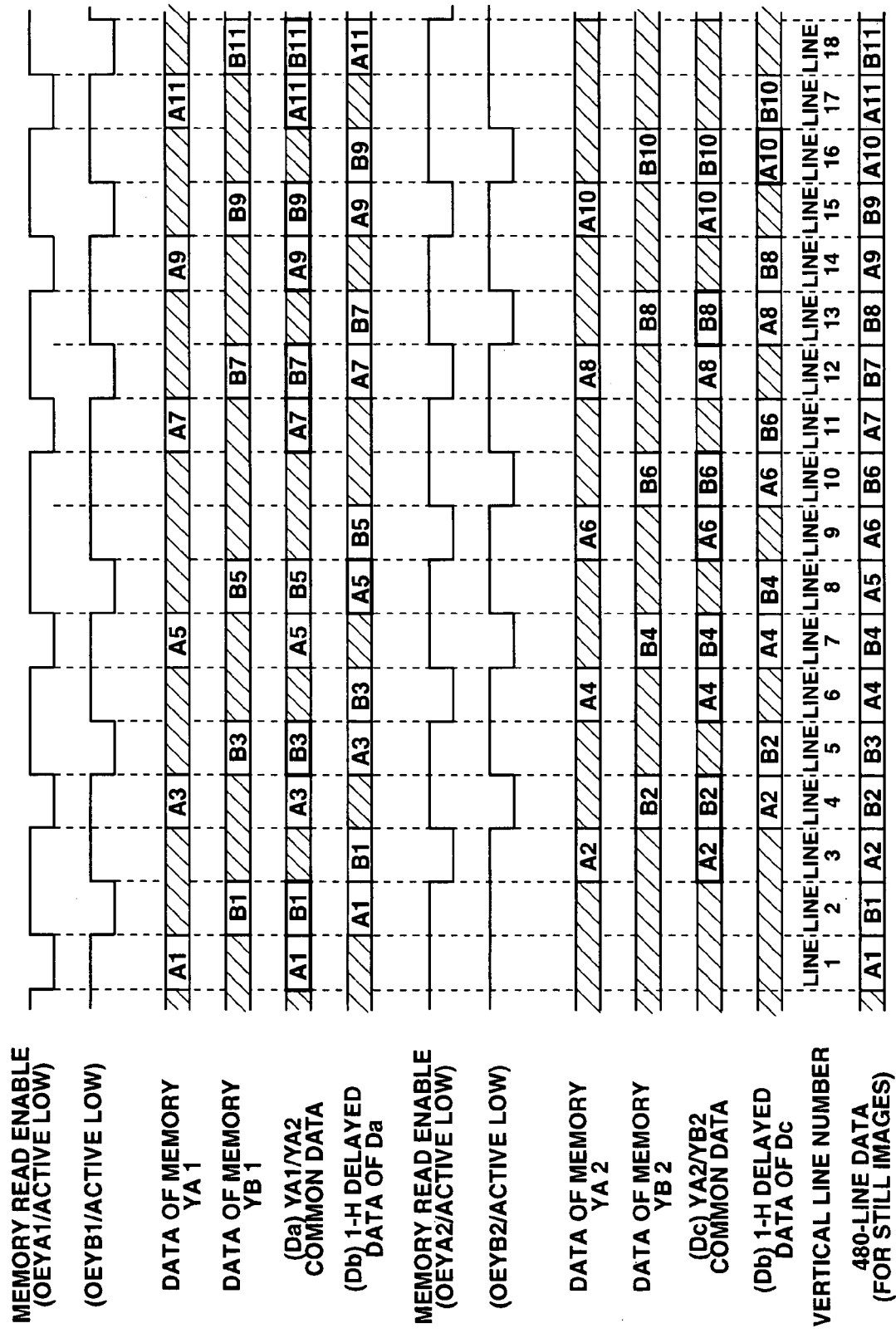

FIG.29
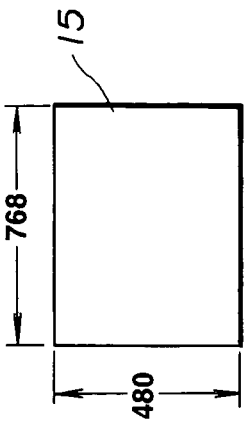
DATA FORMAT OF OUTPUT DATA OF SOLID STATE IMAGING DEVICE
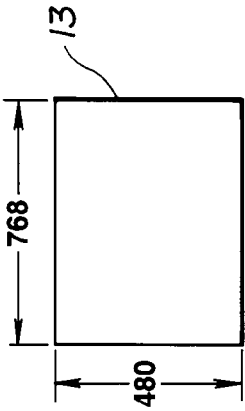
DATA FORMAT IN RECORDING
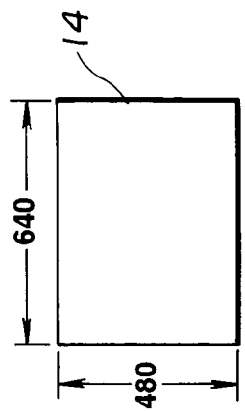
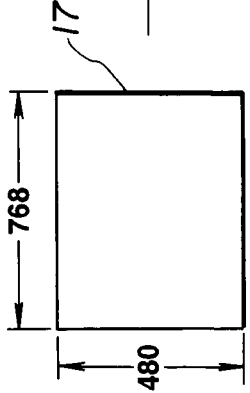
NTSC MONITOR OUTPUT DATA FORMAT

FIG.30

| HORIZONTAL PIXEL NUMBER | H1 | H2 | H3 | H4 | H5 | H6 | H7 | H8 | H9 | H10 | H11 |
|---|---|---|---|---|---|---|---|---|---|---|---|
| 768-HORIZONTAL-PIXEL DATA | A | B | C | D | E | F | G | H | A | B | C |

| HORIZONTAL PIXEL NUMBER | H1 | H2 | H3 | H4 | H5 | H6 | H7 | H8 | H9 | H10 |
|---|---|---|---|---|---|---|---|---|---|---|
| 640-HORIZONTAL-PIXEL DATA | $\frac{7A+1B}{8}$ | $\frac{6B+2C}{8}$ | $\frac{5C+3D}{8}$ | $\frac{4D+4E}{8}$ | $\frac{3E+5F}{8}$ | $\frac{2F+6G}{8}$ | $\frac{1G+7H}{8}$ | $\frac{7A+1B}{8}$ | $\frac{6B+2C}{8}$ | $\frac{5C+3D}{8}$ |

NONINTERLACED

600-LINE DATA → CONVERT TO 480-LINE DATA

| LINE NUMBER | 111 | LINE NUMBER | 112 |
|---|---|---|---|
| LINE 1 | A1 | LINE 1 | $\frac{4A1+1B1}{5}$ |
| LINE 2 | B1 | LINE 2 | $\frac{3B1+2A2}{5}$ |
| LINE 3 | A2 | LINE 3 | $\frac{2A2+3B2}{5}$ |
| LINE 4 | B2 | | |
| LINE 5 | A3 | LINE 4 | $\frac{1B2+4A3}{5}$ |
| LINE 6 | B3 | LINE 5 | $\frac{4B3+1A4}{5}$ |
| LINE 7 | A4 | LINE 6 | $\frac{3A4+2B4}{5}$ |
| LINE 8 | B4 | | |
| LINE 9 | A5 | LINE 7 | $\frac{2B4+3A5}{5}$ |
| LINE 10 | B5 | LINE 8 | $\frac{1A5+4B5}{5}$ |
| LINE 11 | A6 | LINE 9 | $\frac{4A6+1B6}{5}$ |
| LINE 12 | B6 | LINE 10 | $\frac{3B6+2A7}{5}$ |
| LINE 13 | A7 | | |
| LINE 14 | B7 | LINE 11 | $\frac{2A7+3B7}{5}$ |
| LINE 15 | A8 | LINE 12 | $\frac{1B7+4A8}{5}$ |
| LINE 16 | B8 | LINE 13 | $\frac{4B8+1A9}{5}$ |
| LINE 17 | A9 | LINE 14 | $\frac{3A9+2B9}{5}$ |
| LINE 18 | B9 | | |

FIG.38
RELATED ART
CONVERT THE OUTPUT DATA OF THE SOLID
STATE IMAGING DEVICE TO A NONINTERLACED FORMAT

| 600-LINE DATA LINE NUMBER | 116 | 480-LINE DATA LINE NUMBER | 117 |
|---|---|---|---|
| LINE 1 | A1=a1+b1<br>R−Y=A1,B−Y=A0 | LINE 1 | Y = (4A1+1B1) / 5<br>  = (4a1+5b1+1a2) / 5<br>R-Y = (4A1+1B1) /5<br>B-Y = (4A0+1B0) / 5 |
| LINE 2 | B1=b1+a2<br>R−Y=B1,B−Y=B0 | LINE 2 | Y = (3B1+2A2) / 5<br>  = (3b1+5a2+2b2) / 5<br>R-Y = (3B1+2A1) /5<br>B-Y = (3B0+2A2) / 5 |
| LINE 3 | A2=a2+b2<br>R−Y=A1,B−Y=A2 | LINE 3 | Y = (2A2+3B2) / 5<br>  = (2a2+5b2+3a3) / 5<br>R-Y = (2A1+3B1) /5<br>B-Y = (2A2+3B2) / 5 |
| LINE 4 | B2=b2+a3<br>R−Y=B1,B−Y=B2 | | |
| LINE 5 | A3=a3+b3<br>R−Y=A3,B−Y=A2 | LINE 4 | Y = (1B2+4A3) / 5<br>  = (1b2+5a3+4b3) / 5<br>R-Y = (1B1+4A3) /5<br>B-Y = (1B2+4A2) / 5 |
| LINE 6 | B3=b3+a4<br>R−Y=B3,B−Y=B2 | LINE 5 | Y = (4B3+1A4) / 5<br>  = (4b3+5a4+1b4) / 5<br>R-Y = (4B3+1A3) /5<br>B-Y = (4B2+1A4) / 5 |
| LINE 7 | A4=a4+b4<br>R−Y=A3,B−Y=A4 | LINE 6 | Y = (3A4+2B4) / 5<br>  = (3a4+5b4+2a5) / 5<br>R-Y = (3A3+2B3) /5<br>B-Y = (3A4+2B4) / 5 |
| LINE 8 | B4=b4+a5<br>R−Y=B3,B−Y=B4 | LINE 7 | Y = (2B4+3A5) / 5<br>  = (2b4+5a5+3b5) / 5<br>R-Y = (2B3+3A5) /5<br>B-Y = (2B4+3A4) / 5 |
| LINE 9 | A5=a5+b5<br>R−Y=A5,B−Y=A4 | | |
| LINE 10 | B5=b5+a6<br>R−Y=B5,B−Y=B4 | LINE 8 | Y = (1A5+4B5) / 5<br>  = (1a5+5b5+4a6) / 5<br>R-Y = (1A5+4B5) /5<br>B-Y = (1A4+4B4) / 5 |
| LINE 11 | A6=a6+b6<br>R−Y=A5,B−Y=A6 | LINE 9 | Y = (4A6+1B6) / 5<br>  = (4a6+5b6+1a7) / 5<br>R-Y = (4A5+1B5) /5<br>B-Y = (4A6+1B6) / 5 |
| LINE 12 | B6=b6+a7<br>R−Y=B5,B−Y=B6 | LINE 10 | Y = (3B6+2A7) / 5<br>  = (3b6+5a7+2b7) / 5<br>R-Y = (3B5+2A7) /5<br>B-Y = (3B6+2A6) / 5 |
| LINE 13 | A7=a7+b7<br>R−Y=A7,B−Y=A6 | LINE 11 | Y = (2A7+3B7) / 5<br>  = (2a7+5b7+3a8) / 5<br>R-Y = (2A7+3B7) /5<br>B-Y = (2A6+3B6) / 5 |
| LINE 14 | B7=b7+a8<br>R−Y=B7,B−Y=B6 | | |
| LINE 15 | A8=a8+b8<br>R−Y=A7,B−Y=A8 | LINE 12 | Y = (1B7+4A8) / 5<br>  = (1b7+5a8+4b8) / 5<br>R-Y = (1B7+4A7) /5<br>B-Y = (1B6+4A8) / 5 |
| LINE 16 | B8=b8+a9<br>R−Y=B7,B−Y=B8 | LINE 13 | Y = (4B8+1A9) / 5<br>  = (4b8+5a9+1b9) / 5<br>R-Y = (4B7+1A9) /5<br>B-Y = (4B8+1A8) / 5 |
| LINE 17 | A9=a9+b9<br>R−Y=A9,B−Y=A8 | LINE 14 | Y = (3A9+2B9) / 5<br>  = (3a9+5b9+2a10) / 5<br>R-Y = (3A9+2B9) /5<br>B-Y = (3A8+2B8) / 5 |
| LINE 18 | B9=b9+a10<br>R−Y=B9,B−Y=B8 | | |

DIGITAL IMAGE RECORDING AND REPRODUCING APPARATUS HAVING FORMATS CORRESPONDING TO PIXEL CONFIGURATIONS

BACKGROUND OF THE INVENTION

1. Field of the Invention

The present invention relates to a digital image recording/reproducing apparatus. More particularly, the present invention relates to a digital image recording apparatus for recording an image taken via a solid state imaging device and to a digital image reproducing apparatus for reproducing a recorded image.

2. Description of the Related Art

In the technology of digital image recording/reproducing apparatus such as an electronic still camera, it is known in the art to separate the record still image data taken via a solid state imaging device into luminance and chrominance signals and then record the data on a recording medium. The recorded still image data may be reproduced by a reproducing circuit and displayed on a screen of a monitor or the like.

An example of such an electronic still camera is disclosed in Japanese Patent Publication No. HEI 2-2353 (1990). In this technique, the electronic still camera includes: an image taking element for taking an image of an object and generating a color video signal corresponding to the object wherein the color video signal includes a chrominance signal having a first resolution; a display element capable of displaying an image in response to a chrominance signal having a second resolution lower than the first resolution; and a video signal output control element having first and second output modes such that, in a first output mode, the color video signal generated by the image taking element is outputted to an element other than the above-described display element while, in a second output mode, a signal representing the brightness included in the color video signal generated by the image taking element is outputted to the display element, wherein in the first output mode the signal representing the brightness included in the color video signal generated by the image taking element is outputted to an element other than the above-described display element so that the signal representing the brightness has the first resolution, while in the second output mode the resolution of the signal representing the brightness included in the color video signal generated by the image taking element is converted from the first resolution to the second resolution and then the resultant signal is outputted to the above-described display element.

As for a recording medium for use in an electronic still camera (hereafter referred to simply as a camera), a built-in memory such as an SRAM or a flush memory, or a solid-state memory card is now widely used. Various digital recording techniques for the electronic still cameras are proposed.

The advent of the digital recording technique has made electronic still cameras popular as an input device for inputting image data to a personal computer.

A solid state imaging device of the type widely used in a video camera of an NTSC monitor system is often employed in the electronic still camera. A great number of solid state imaging devices of this type are produced, and thus the employment of such devices leads to a reduction in cost.

In the standard VIDEO-1 regarding the digital still cameras prescribed by JEIDA (Japan Electronic Industry Development Association), the pixel number of one image is defined as 768 (horizontal)×480 (vertical) so that the pixel number may be compatible with that of the solid state imaging device of the above-described type.

In the solid state imaging device used in a video camera, while the number of pixels along a vertical direction is determined according to the standard such as the NTSC standard, the number of pixels along a horizontal direction may be set to a desired arbitrary value.

In many solid state imaging devices, to achieve a high horizontal resolution, the length of one image frame along its horizontal direction is set to a value WA smaller than the length HA along the vertical direction as shown in FIG. 33A, such as:

$$HA:WA=1:(n/m)$$

where $n<m$.

If the sampling number is determined according to the pixel configuration of a solid state imaging device defined, for example, by the standard VIDEO-1, the aspect ratio or the ratio of the vertical length to the horizontal length of one pixel corresponding to each unit of digital data has a value other than 1 (unity).

On the other hand, in a display device such as a monitor used in a personal computer system, the aspect ratio of each pixel is equal to unity as shown in FIG. 33B. That is:

$$HB:WB=1:1$$

where HB is the horizontal length and the WB is the vertical length of one pixel. This element is such that each pixel has a square shape in this case.

When image data recorded in digital form having an aspect ratio different from unity such as that shown in FIG. 33A is input to a personal computer, if the image data is displayed directly on a monitor screen consisting of pixels having a square shape such as that shown in FIG. 33B, the ratio of the horizontal length to the vertical length of the resultant image will be greater than that of the original image taken by a camera.

One known technique to solve such a problem is to display an image after converting the image data by a software program provided in the personal computer so that the pixel has a correct aspect ratio. However, this technique needs a long time to display a frame of the image, ranging from a few seconds to a few tens of seconds depending on the processing speed of the software which is, in turn, dependent on the processing ability of a CPU used in the personal computer.

In another known technique, a camera equipped with a solid state imaging device having a pixel aspect ratio equal to unity (hereafter such a pixel will also be referred to as a square pixel) is employed. In this technique, it is possible to directly display an image on a monitor screen without having to convert the pixel aspect ratio via a personal computer. In this case, the pixel numbers along the horizontal and vertical directions are selected as 640×480 elements according to the VGA standard widely employed in personal computers.

However, the solid state imaging device of this type is generally designed for use in conjunction with a monitor display of a personal computer, and no consideration is taken into account in the design for use in conjunction with a TV monitor device according to, for example, the NTSC standard. Although it is possible to reproduce an image taken via such a solid state imaging device based on the VGA standard on a TV monitor, the horizontal resolution is not good enough since the number of pixels along the horizontal direction is less than the required value or 768.

To achieve a higher resolution while maintaining the aspect ratio at 1:1, it has been proposed to employ a solid state imaging device having a greater number of pixels such as 1240×1024 pixels.

However, to directly display an image taken via such a high-density solid state imaging device on a TV monitor, the TV system is required to have the capability of dealing with such great numbers of pixels along the vertical and horizontal directions, and thus the TV system is required to be of the high-density type such as a high-vision system. This results in an increase in system cost. Another problem in this technique is that it is required to convert image data from digital form to analog form at a very high clock rate, and complicated and difficult techniques are required in processing circuits.

Thus, when an image taken via a solid state imaging device having such a great number of pixels is displayed, for example, on a TV monitor according to the NTSC standard, it is required to select a limited area of the entire image as shown in FIG. 34 so that the selected area is displayed on the screen of the TV monitor having a smaller number of scanning lines than that of solid state imaging device. For example, it is required to select a 640×480 area within the total image area consisting of 1240×1024 pixels.

However, the difference between the display area and the area of the image taken via the solid state imaging device causes difficulty in knowing whether an image is being recorded in a manner suitable for reproducing the image on a monitor. Furthermore, in an operation of taking an image, it becomes impossible to obtain full-area framing using a monitor element such as an electronic viewfinder (hereafter referred to as an EVF). Thus, this technique is very inconvenient in practical use.

Another problem of the above technique is that the production yield of solid state imaging devices having a great number of pixels is low and thus this type of solid state imaging device is very expensive, which results in a high cost of the total system.

Thus, as described above, various formats and techniques are used to record an image via a camera and to reproduce the recorded image on a monitor via a personal computer, as shown in FIG. 35.

In FIG. 35, a camera 101 is of the type having a solid state imaging device with a pixel aspect ratio other than 1:1 such as that shown in FIG. 33A. This camera 101 has the capability of displaying an image on a TV monitor 108.

A camera 102 is of the type having a solid state imaging device with a pixel aspect ratio equal to 1:1 such as that shown in FIG. 33B.

Both cameras 101 and 102 are designed to use a memory card 103 or 104 as a recording medium. These memory cards 103 and 104 are same in geometrical configurations and electrical specifications as that used in personal computer systems, and thus these memory cards 103 and 104 may be used by inserting either one into a memory card slot provided in a personal computer 105.

If the memory card 103 or 104 is inserted into the memory slot card of the personal computer, image data obtained via the camera 101 or 102 can be inputted to the personal computer via the memory card 103 or 104.

Either a software program 106 or 107 is selected depending on the recording format of the camera 101 or 102, and the image data input into the personal computer 105 is processed by the personal computer with the selected software program so as to display the image data on a monitor screen of the personal computer system.

To process the image data obtained via the camera 101, the software program 106 is required to convert the pixel aspect ratio as described above with the result that the software program 106 is poor in versatility compared with the software program 107 which is not required to perform pixel aspect ratio conversion.

As a result, although the memory cards 103 and 104 used by the cameras 101 and 102 are of the same type in geometrical configurations and electric specifications, these memory cards 103 and 104 cannot be used in an exchangeable manner since image data is recorded on them in different formats. This is very inconvenient for a user.

Even if the same unified recording format is employed, it will still be impossible to correctly display, on a TV monitor screen, images taken via different cameras having a solid state imaging device with different pixel configurations, since the sampling clock rate used in the digital-to-analog conversion varies depending on the pixel configuration employed.

Although there is no compatibility between cameras having different recording formats or different pixel configurations as described above, an image taken via any type of camera can be displayed on a monitor of a personal computer if a user converts the image data into a correct format using a personal computer with a software program.

FIGS. 36 to 38 illustrate conventional techniques of converting image data consisting 600 pixels in the vertical direction into image data consisting of 480 pixels in the vertical direction. In these figures, data is shown in an enlarged fashion starting with a pixel located at the uppermost point in a vertical direction. The pixel position relative to the starting point is denoted by the vertical pixel number or line number.

In FIG. 36, data 111 consists of noninterlaced 600-line data. A1, A2, A3, . . . denote interlaced lines of an odd-numbered field before being converted into noninterlaced form. Similarly, B1, B2, B3, . . . denote interlaced lines of an even-numbered field before being converted into noninterlaced form.

The data 111 can be converted into data 112 consisting of 480 lines by producing 8 lines from 10 lines of the data 111 according to the algorithm shown in FIG. 36.

That is, value of line 1 in the data 112 is given as (4A1+1B1)/5, value of line 2 is given as (3B1+2A2)/5, value of line 3 is given as (2A2+3B2)/5, value of line 4 is given as (1B2+4A3)/5, value of line 5 is given as (4B3+1A4)/5, value of line 6 is given as (3A4+2B4)/5, value of line 7 is given as (2B4+3A5)/5, value of line 8 is given as (1A5+4B5)/5, and so on.

When the above-described data conversion is performed on image data taken via a solid state imaging device of the interline type, the conversion can be performed in such a manner as represented by data 113 to 117 of FIGS. 37 and 38.

In the case of a camera equipped with a solid state imaging device of the interline type, the output signal represents the sum of some pixel values along the vertical direction. In FIG. 37, therefore, the output data along the vertical direction are designated by the scanning line number to distinguish them from the pixels of the solid state imaging device.

The data 113 represents pixels along the vertical direction of the solid state imaging device. Furthermore, to distinguish odd-numbered pixels from even-numbered pixels, the odd-numbered pixel data are denoted by a1, a2, a3, . . . , and the even-numbered pixel data are denoted by b1, b2, b3, and so on.

In the case of a solid state imaging device of the interline type with complementary color filters, two pixel signals along the vertical direction are combined into one signal. To achieve a sufficiently good vertical resolution, the addition operation is performed for different pairs of pixels depending on whether the field is an odd-numbered or an even-numbered one.

That is, for odd-numbered fields, as shown by the data 114 in FIG. 37, data A1 of line 1 is given as a1+b1, data A2 of line 3 is given as a2+b2, data A3 of line 5 is given as a3+b3, data A4 of line 7 is given as a4+b4, and data A5 of line 9 is given as a5+b5. Furthermore, other data are produced in a similar manner so as to obtain a complete frame data.

For even-numbered fields, as shown by the data 115 in FIG. 37, data B1 of line 2 is given as b1+a2, data B2 of line 4 is given as b2+a3, data B3 of line 6 is given as b3+a4, data B4 of line 8 is given as b4+a5, and data B5 of line 10 is given as b5+a6. Furthermore, other data are produced in a similar manner so as to obtain a complete frame data.

In the data 114 and 115 shown in FIG. 37, (R−Y) and (B−Y) denote color-difference signals obtained via color filters of the solid state imaging device.

From these data 114 and 115, noninterlaced data 116 can be obtained as shown in FIG. 38. In the data 116, missing color-difference signals are recovered by means of simple embedding.

That is, the data of line 1 is given by A1 wherein R−Y=A1 and B−Y=A0, the data of line 2 is given by B1 wherein R−Y=B1 and B−Y=B0, the data of line 3 is given by A2 wherein R−Y=A1 and B−Y=A2, the data of line 4 is given by B2 wherein R−Y=B1 and B−Y=B2, the data of line 5 is given by A3 wherein R−Y=A3 and B−Y=A2, the data of line 6 is given by B3 wherein R−Y=B3 and B−Y=B2, the data of line 7 is given by A4 wherein R−Y=A3 and B−Y=A4, the data of line 8 is given by B4 wherein R−Y=B3 and B−Y=B4, the data of line 9 is given by A5 wherein R−Y=A5 and B−Y=A4, the data of line 10 is given by B5 wherein R−Y=B5 and B−Y=B4, and so on.

If the data 116 is converted into the 480-line format in a manner similar to that employed to obtain the data 112 from the data 111, data 117 can be obtained as shown in FIG. 38.

If the resultant data is represented in terms of the vertical pixel data a1, b1, . . . , etc. of the data 113 of the solid state imaging device, it can be seen that the data calculated from two lines of the data 116 is equal to the data calculated from three pixel data. For example, the luminance signal Y of line 1 of the data 117 can be represented in terms of the vertical pixel data as:

$$Y=(4a1+5b1+1a2)/5$$

From the above representation, it can be seen that the luminance signal Y includes three pixel data a1, b1 and a2.

This technique shows the data undergoes an desirable dispersion in the vertical direction, which causes a great reduction in the vertical resolution relative to the original image.

As described earlier, in the standard regarding digital still cameras VIDEO 1, the numbers of pixels along vertical and horizontal directions of one image are defined on the basis of the number of pixels of a solid state imaging device and thus this standard is not suitable for displaying an image on a monitor of a personal computer system.

On the other hand, the pixel configuration consisting of 640×480 elements according to the VGA standard widely employed in personal computers cannot provide a horizontal resolution good enough to display an image on a TV monitor.

If the number of pixels is increased to a level greater than that defined by the VGA standard to improve the horizontal resolution, a full-area of image cannot be displayed on a TV monitor according to the NTSC standard, and such a format is not suitable to display an image on an EVF.

Furthermore, as described above in connection with FIG. 35, the various recording formats are incompatible with each other. This is another problem with conventional techniques.

Another serious problem in the conventional technique is that if image data taken via a camera equipped with a solid state imaging device of the interline type is converted with respect to the number of pixels using a personal computer with a software program, a great reduction in vertical resolution occurs.

SUMMARY OF THE INVENTION

According to an aspect of the present invention, there is provided a digital image recording apparatus including: a solid state imaging device; a selecting element for selecting either predetermined image data in a format corresponding to the pixel configuration of the solid state imaging device or other image data in a format corresponding to a pixel configuration different from the above-described pixel configuration; and a recording element for recording the image data selected via the selecting element.

According to another aspect of the present invention, there is provided a digital image reproducing apparatus including: a recording element for recording image data; an identification element for identifying the pixel configuration of the image data recorded on the recording element; and a conversion element for converting image data to be reproduced into image data having a particular pixel configuration according to the identification result given by the identification element.

According to still another aspect of the invention, there is provided a digital image recording/reproducing apparatus including: a solid state imaging device; a selecting element for selecting either predetermined image data in a format corresponding to the pixel configuration of the solid state imaging device or other image data in a format corresponding to a pixel configuration different from the above-described pixel configuration; a recording element for recording the image data selected via the selecting element; a calculation element for producing the above-described other image data by performing inter-pixel calculation; an identification element for identifying the pixel configuration of the image data recorded on the recording element; and a conversion element for converting image data to be reproduced into image data having a particular pixel configuration according to the identification result given by the identification element, wherein the calculation element and the conversion element are constructed with commonly-used functional blocks.

The advantages of the present invention will become further apparent from the following detailed explanation.

BRIEF DESCRIPTION OF THE DRAWINGS

FIG. 2 is a schematic representation of a method of converting 800 horizontal pixels to 768 horizontal pixels in the digital image recording/reproducing apparatus according to the first embodiment of the invention;

FIG. 3 is a schematic representation of a method of converting 800 horizontal pixels to 640 horizontal pixels in the digital image recording/reproducing apparatus according to the first embodiment of the invention;

FIG. 5 is a schematic representation of ideal noninterlaced 480-line data calculated from 600 vertical pixel data output by a solid state imaging device in the digital image recording/reproducing apparatus according to the first embodiment of the invention;

FIG. 6 is a schematic representation of noninterlaced 480-line still image data calculated from interlaced 300-line data×2 fields output by the solid state imaging device in the digital image recording/reproducing apparatus according to the first embodiment of the invention;

FIG. 7 is a schematic representation of interlaced data of 300-line×2 fields output by the solid state imaging device with 600 pixels in the vertical direction in the digital image recording/reproducing apparatus according to the first embodiment of the invention;

FIGS. 15A and 15B are timing charts illustrating the operation of reading luminance signal data from the field memory and the operation of converting the data from the 600-line format to the 480-line format in the digital image recording/reproducing apparatus according to the first embodiment of the invention;

FIGS. 18A and 18B are timing charts illustrating the operation of reading color-difference signal data of an odd-numbered field from the field memory and the operation of converting the data from the 600-line format to the 480-line format in the digital image recording/reproducing apparatus according to the first embodiment of the invention;

FIG. 24 is a timing chart illustrating the operation of reading luminance signal data from the field memory and the operation of converting the data from the 600-line format to the 480-line format in the digital image recording/reproducing apparatus according to the first embodiment of the invention;

FIG. 29 is a schematic representation of the formats in terms of the pixel configuration of the data output by a solid state imaging device of a digital image recording/reproducing apparatus according to a second embodiment of the invention, the data to be recorded, and the data to be output to a monitor according to the NTSC standard;

FIG. 30 is a schematic representation of a method of converting 768 horizontal pixels to 640 horizontal pixels, in the digital image recording/reproducing apparatus according to the second embodiment of the invention;

FIG. 36 is a schematic representation of a method of converting noninterlaced 600-line data to 480-line data according to a conventional technique;

FIG. 38 is a schematic diagram illustrating noninterlaced 600-line data converted from the interlaced data of 300-line×2 fields shown in FIG. 37 and also illustrating 480-line data converted from the 600-line data.

DETAILED DESCRIPTION OF THE PREFERRED EMBODIMENTS

The present invention will be described below in greater detail with reference to preferred embodiments in connection with the accompanying drawings.

Figure 1:
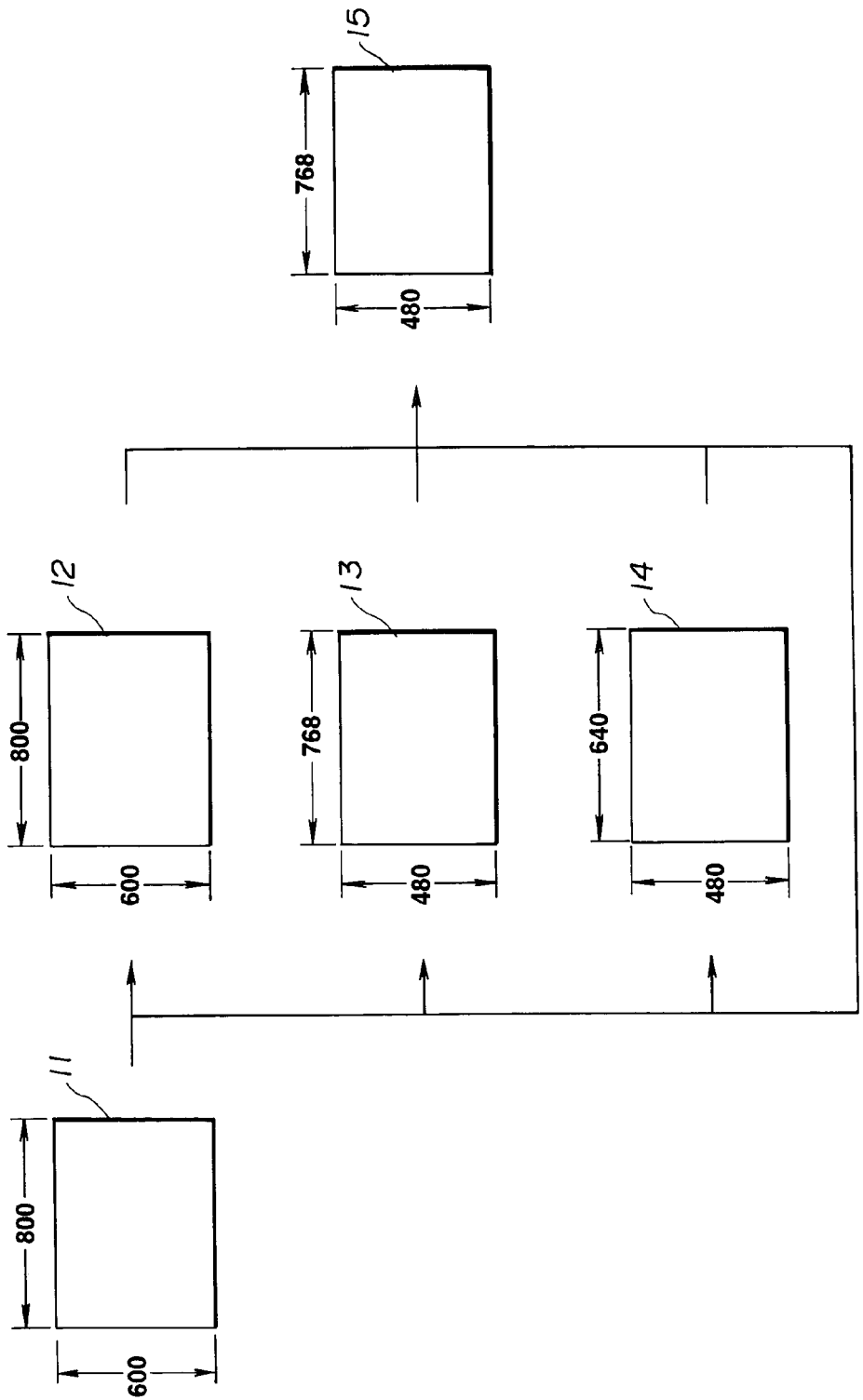
FIG. 1 is a schematic representation of the formats in terms of the pixel configuration of the data output by a solid state imaging device of a digital image recording/reproducing apparatus according to a first embodiment of the invention, the data to be recorded, and the data to be output to a monitor according to the NTSC standard.

FIGS. 1 to 28 illustrate a first embodiment of the invention. FIG. 1 illustrates various pixel configurations for a full image area employed in a digital image recording/reproducing apparatus.

In FIG. 1, image data output by a solid state imaging device is converted to a digital form having a pixel configuration 11. The image data is recorded on a recording medium according to one of formats 12, 13, and 14 with respect to the pixel configuration. These formats are employed for the "other image data" defined above. The pixel configuration 15 corresponds both to the "particular pixel configuration" defined above and to the "other image data", and is employed for image data to be displayed on a TV monitor according to the NTSC standard or on an EVF wherein the pixel configuration 15 in FIG. 15 represents the form immediately before being converted into analog data.

The pixel configuration 11 consists of 800×600 elements according to the standard known as super VGA employed in displaying an image on a monitor of a personal computer. In this case, each pixel of the solid state imaging device has a square shape. In the standard VIDEO 1 described above, the pixel configuration consists of 768×480 elements. Compared to the standard VIDEO 1, the pixel configuration 11 includes a greater number of pixels and thus can provide a sufficiently good resolution.

However, the image data having the pixel configuration 11 can be directly displayed only on a monitor screen according to the super VGA standard. In the present embodiment, to avoid the above problem, image data may be recorded in other formats in terms of pixel configurations so that the image data may be displayed on various display devices according to different standards.

The pixel configuration 12 consists of 800×600 elements according to the super VGA standard. Also in this case, each pixel has a square shape. This format 12 may be employed to directly record image data having the pixel configuration 11.

The pixel configuration 13 consists of 768×480 elements according to the VIDEO-1 standard.

The pixel configuration 14 consists of 640×480 elements according to the VGA standard widely employed in personal computer systems. Still in this case, each pixel has a square shape.

The VIDEO-1 standard has been established as a standard for displaying an image on a TV monitor according to the NTSC standard. Therefore, of the pixel configuration formats 12, 13 and 14, the VIDEO-1 standard has the most suitable pixel configuration for displaying an image on a TV monitor. Thus, the pixel configuration 15 consists of 768×480 elements as in the case of the pixel configuration 13.

One of advantageous features of the present embodiment of the invention is that a desired pixel configuration can be selected from a plurality of configurations while maintaining the angle of view constant.

Each pixel configuration 11, 12, 13, 14, and 15 described above is for a full image area. When image data is recorded, the data having the pixel configuration 11 is converted to data having any one of the pixel configurations 12, 13, and 14.

When the recorded image is reproduced, the data is displayed on a TV monitor after converting the pixel configuration 12, 13 or 14 to the pixel configuration 15. When an image taken via a solid state imaging device is displayed directly on a TV monitor or another monitor device such as an EVF, the image data according to the pixel configuration format 11 is converted to the pixel configuration format 15.

Figure 4:
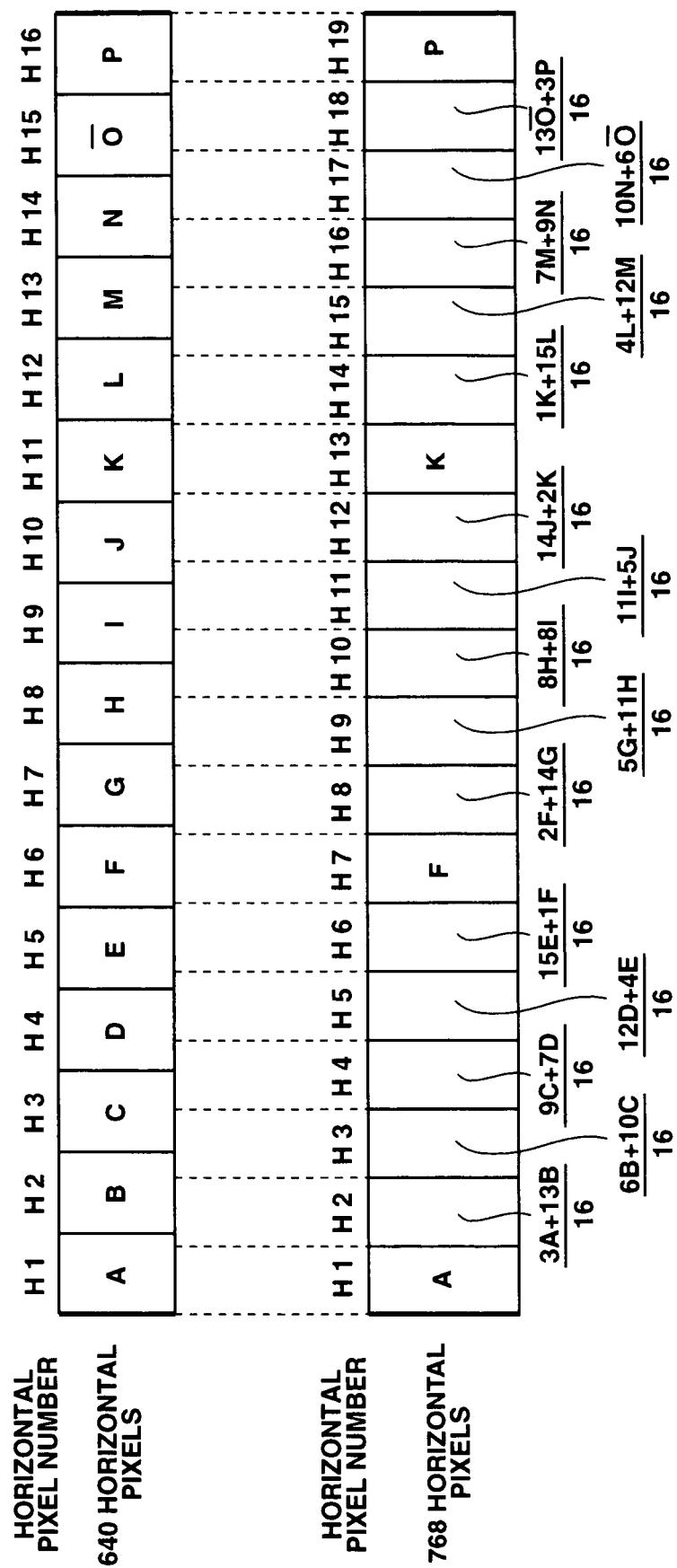
FIG. 4 is a schematic representation of a method of converting 640 horizontal pixels to 768 horizontal pixels in the digital image recording/reproducing apparatus according to the first embodiment of the invention.

FIGS. 2 to 9 illustrate data conversion among different formats in terms of the pixel configuration described above. FIGS. 2 to 4 illustrate the conversion of the pixel number along the horizontal direction while FIGS. 5 to 9 illustrate the conversion of the pixel number along the vertical direction.

FIG. 2 illustrates the conversion from 800 horizontal pixels to 768 horizontal pixels. This conversion is employed when the pixel configuration 11 is converted to the pixel configuration 13 or 15 or when the pixel configuration 12 is converted to the pixel configuration 15. In FIG. 2, data is shown in an enlarged fashion starting with a pixel data located at the leftmost point in a horizontal direction. The pixel position relative to the starting point is denoted by the horizontal pixel number.

As shown in FIG. 2, the sampling period for 16 pixels of an image according to the 800-horizontal-pixel format is nearly equal to the sampling period for 15 pixels of an image according to the 768-horizontal-pixel format. Thus, if each set of 16 pixels (hereafter referred to as a group) of 800 horizontal pixels is converted to a corresponding set of 15 pixels, it is possible to obtain data composed of 768 horizontal pixels which are sampled during the same sampling period as that of the 800 horizontal pixels.

In FIG. 2, if 16 pixel data in a group are denoted by A to P respectively from left to right, 15 pixel data of the 768-horizontal-pixel data can be calculated from the 16 pixel data A to P according to the algorithm shown in the FIG. 2.

For example, a pixel data H-1 of the 768-horizontal-pixel data can be calculated from the pixel data A and B of the 800-horizontal-pixel data taking into account the relative sampling periods of the pixels A and B. The sampling period of the pixel H-1 of the 768-horizontal-pixel data is equal to the sampling period of the pixel A plus 1/15 of that of the pixel B. Therefore, the pixel data H-1 of the 768-horizontal-pixel data should include the pixel data A and B with a ratio of A:B=15:1. Thus the pixel data H-1 can be given by (15A+1B)/16. Similarly, the pixel data H-2 includes the pixel data B and C with a ratio of 14:2, and the pixel data H-3 includes the pixel data C and D with a ratio of 13:3, and so on. The pixel data H-16 and the data following that can also be calculated in a similar manner to the pixel data H-1 to H-15 by periodically applying the above-described calculation algorithm to each group consisting of 15 pixels.

If 800 horizontal pixels are divided into groups each consisting of 16 pixels, 50 groups are obtained wherein the counting of the total number of pixels is equal to the original number or 800. On the other hand, if 768 pixels are divided into groups each consisting of 15 pixels, then 50 groups are obtained wherein the counting of the total number of pixels over the entire 50 groups results in 750 which is smaller than 768 by 18. These 18 deficient pixels are filled with black data. According to the NTSC standard, the sampling rate is prescribed as 14.3 MHz, and a total of 12 pixels prior to and subsequent to the 768 pixels are assigned as a blanking period. Therefore, the error due to the above-described deficiency of 18 pixels can be considered to be within an acceptable small range.

In practical operations of displaying an image on a monitor according to the NTSC standard, these 18 pixels will be outside the effective screen area, and thus no problems occur.

As can be seen from the above discussion, the data conversion technique according to the present embodiment of the invention in which 16 pixels are taken as a unit of conversion operation provides a great advantage while a small error occurs. That is, in this calculation technique, in which a total of 800 pixel data are divided into groups each consisting of 16 pixel data, and each group is converted to 15 pixel data so as to finally obtain data according to the 768-horizontal-pixel format, division operations required in the conversion process can be performed very easily. More particularly, since 16 is equal to $2^4$, the division operations can be performed by simply removing some bits. Thus, this technique has really a great advantage with a very slight disadvantage of the error.

FIG. 3 illustrates the conversion from 800 horizontal pixels to 640 horizontal pixels. This conversion is employed when the pixel configuration 11 is converted to the pixel configuration 14 shown in FIG. 1. In FIG. 3, data is shown in an enlarged fashion starting with a pixel data located at the leftmost point in a horizontal direction. The pixel position relative to the starting point is denoted by the horizontal pixel number.

As can be seen from FIG. 3, the sampling period for 5 pixels of image data according to the 800-horizontal-pixel format is equal to the sampling period for 4 pixels of image data according to the 640-horizontal-pixel format. Thus, if 800 horizontal pixels are divided into groups each consisting of 5 pixels and each group of 5 pixel data is converted into a corresponding group of data consisting of 4 pixels, then it is possible to finally obtain image data according to the 640-horizontal-pixel format.

In FIG. 3, if 5 pixel data in a group are denoted by A to E respectively from left to right, 4 pixel data of the 640-horizontal-pixel data can be calculated from these 5 pixel data A to E according to the algorithm shown in FIG. 3.

That is, the pixel data H-1 of the 640-horizontal-pixel data can be given as the sum of the pixel data A and B with a ratio of A:B=4:1 or as (4A+1B)/5. Similarly, the pixel data H-2 can be given as (3B+2C)/5, the pixel data H-3 as (2C+3D)/5, and so on.

If 800 horizontal pixels are divided into groups each consisting of 5 pixels, there will be 160 resultant groups constituting the total of 800 pixels. On the other hand, if 640 pixels are divided into groups each consisting of 4 pixels, then 160 resultant groups are obtained which constitute the total of 640 pixels. In this case, unlike the conversion shown FIG. 2, there is no deficiency in the number of pixels.

FIG. 4 illustrates the conversion from 640 horizontal pixels to 768 horizontal pixels. This conversion is employed when the pixel configuration 14 is converted to the pixel configuration 15 shown in FIG. 1. In FIG. 4, as in FIG. 2, data is shown in an enlarged fashion starting with a pixel data located at the leftmost point in a horizontal direction wherein the pixel position relative to the starting point is denoted by the horizontal pixel number.

In the conversions shown in FIGS. 2 and 3, the number of pixels is decreased. In contrast, in the conversion shown in FIG. 4, the number of pixels is increased.

As shown in FIG. 4, the sampling period for 16 pixels of image data according to the 640-horizontal-pixel format is nearly equal to the sampling period for 19 pixels of image data according to the 768-horizontal-pixel format. Thus, if 640-horizontal-pixel data is divided into groups each consisting of 16 pixels and each group of 16 pixels is converted into a corresponding group of data consisting of 19 pixels, then it is possible to obtain image data according to the 768-horizontal-pixel format.

In FIG. 4, if 16 pixel data in a group are denoted by A to P respectively from left to right, 19 pixel data according to the 768-horizontal-pixel format can be calculated from these 16 pixel data A to P in the manner shown in FIG. 4.

In this conversion process, since the sampling period for each pixel data H-1, H-7, H13, and H-19 of the 768-horizontal-pixel data is entirely included in corresponding one sampling period of the 640-horizontal-pixel data, these pixel data are obtained by simply employing the pixel data H-1, H-6, H-11, and H-16 of the 640-horizontal-pixel data without having to perform calculation.

If 640 horizontal pixels are divided into groups each consisting of 16 pixels, there will be 40 resultant groups constituting the total of 640 pixels. On the other hand, if 768 pixels are divided into groups each consisting of 19 pixels, then 40 groups are obtained wherein the total number of pixels counted over all groups is equal to 760 which is smaller than 768 by 8. For the same reason as that described above in connection with FIG. 2, the error due to these 8 deficient pixels can be considered to be within an acceptable range.

FIGS. 5 to 8 illustrate the conversion from 600 vertical pixels to 480 vertical pixels. This conversion is employed when the pixel configuration 11 is converted to the pixel configuration 13, 14, or 15 shown in FIG. 1.

In the FIGS. 5 to 8, the solid state imaging device employed is assumed to be of the interline type, and pixel data are shown in an enlarged fashion starting with a pixel data located at the uppermost point in a vertical direction wherein the pixel position relative to the starting point is denoted by the vertical pixel number or line number.

FIGS. 5 and 6 illustrate the methods of converting the pixel configuration 11 to the pixel configurations 13 and 14, respectively, according to the embodiment of the invention. This conversion technique is suitable for calculating noninterlaced still data.

In FIGS. 5 and 6, data 21 represents pixels along the vertical direction of the solid state imaging device. To distinguish odd-numbered pixels and even-numbered pixels from each other, odd-numbered pixel data are denoted by a1, a2, a3, ..., and even-numbered pixel data are denoted by b1, b2, b3, and so on.

As can be seen from FIGS. 5 and 6, the sampling period for 10 pixels of the 600-vertical-pixel data is equal to the sampling period for 8 pixels of the 480-vertical-pixel data.

Thus, if 600 vertical pixels are divided into groups each consisting of 10 pixels and each group is converted into a corresponding group of data consisting of 8 pixels, then it is possible to finally obtain 480-line data having the same vertical period as that of the original 600-vertical-pixel data.

If 600 vertical pixels are divided into groups each consisting of 10 pixels, there will be 60 resultant groups constituting the total of 600 pixels. On the other hand, if 480 lines are divided into groups each consisting of 8 lines, there will be 60 resultant groups constituting the total of 480 lines. In the solid state imaging device of the interline type, as described earlier, pixel data are added to obtain frame data in which the addition is performed for different pairs of pixels depending on whether the field is an odd-numbered or an even-numbered one. If this fact is taken into account, it is inadequate that the 480-line data be calculated from the noninterlaced data. Instead, it is desirable that the noninterlaced 480-line data be calculated from the original vertical pixel data before being added. In FIG. 5, data 22 represents 480-line data calculated from the original vertical pixel data wherein the resultant data is ideal in the sense described above.

In the case of a solid state imaging device of the interline type with complementary color filters, a luminance signal Y and color-difference signals R–Y and B–Y are produced by adding two pixel data along the vertical direction. In this calculation, it is required that two pixel data should be added with equal weighting factors. Therefore, it is not suitable to employ the conventional technique shown in FIGS. 36 to 38 in which the addition is performed with weighting factors depending on the vertical pixel locations.

Instead, the 480-line data should be calculated directly from the original 600-pixel data by converting each group consisting of 10 vertical pixels into a corresponding group consisting of 8 pixel data as represented by the data 22 in FIG. 5. That is, data of line 1 is given by a1+b1, data of line 2 is given by b1+a2, data of line 3 is given by a2+b2, and so on.

However, in practice, if the solid state imaging device of the interline type is employed, the output data is given in the form of addition of two vertical pixels and thus the output data cannot be employed for the calculation of the data 22. In this embodiment of the invention, the above problem is avoided by taking into account the above-described nature of the signal output by the solid state imaging device thereby providing a conversion technique capable of obtaining data nearly equal to the ideal data 22.

Figure 37:
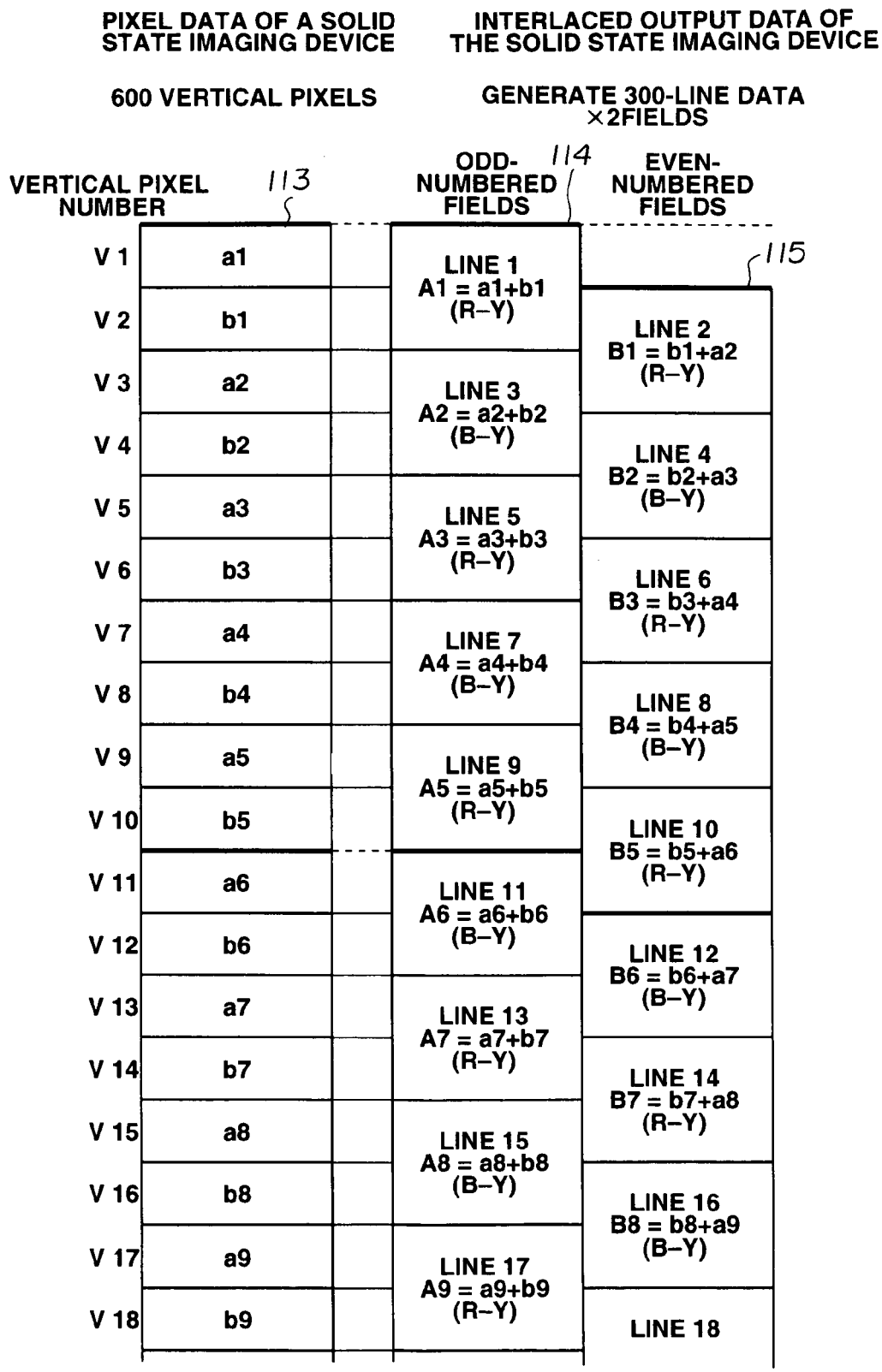
FIG. 37 is a schematic diagram illustrating 600-vertical-pixel data output by a conventional solid state imaging device and interlaced data of 300-line×2 fields.

First, as in the data 114 and 115 shown in FIG. 37, pixel data are added to obtain frame data in which the addition is performed for different pairs of pixels depending on whether the field is an odd-numbered or an even-numbered one, thereby obtaining data 23 and 24. From these data 23 and 24, noninterlaced 480-line data is calculated as shown by data 25 in FIG. 6.

If the data 23 and 24 output by the solid state imaging device are compared with the ideal data 22, it can be seen that each line of data in the ideal data 22 is equal to some line of data 23 or 24. Thus, data 25 can be obtained by selecting correct lines from the data 23 and 24 so that the resultant data 25 becomes equivalent to the ideal data 22.

In the case of the solid state imaging device of the interline type with complementary color filters, color-difference signals are calculated from line-to-line signals. Accordingly, only one color signal, either R–Y or B–Y, can be obtained from a signal given in the form of a combination of two pixel data. Thus, in the data 25 in FIG. 6, the color-difference signal which cannot be obtained by the calculation is distinguished by enclosing it in parentheses ( ). The missing color-difference signal is recovered with a color-difference signal of an adjacent line calculated from two pixel data, one of which is included in common as one of two pixel data in the line under consideration. For example, the line 2 of the data 25 is obtained by employing the line 2 of the data 24, and thus it includes only a color signal R–Y and it does not include a color signal B–Y. This missing color signal B–Y for the line 2 of the data 25 is supplied in a supplementary manner by employing the color-difference signal B–Y of the line 3 of the data 23 which includes pixel data a2 which is also included in the line 2 of the data 25. In the case of the line 1 of the data 25, the data B0 of the line 0 (not shown) is employed as will be described later in greater detail. In this invention, as described above, the missing data is recovered by using another data which has common pixel data and thus has a close relationship with the missing data.

Figure 8:
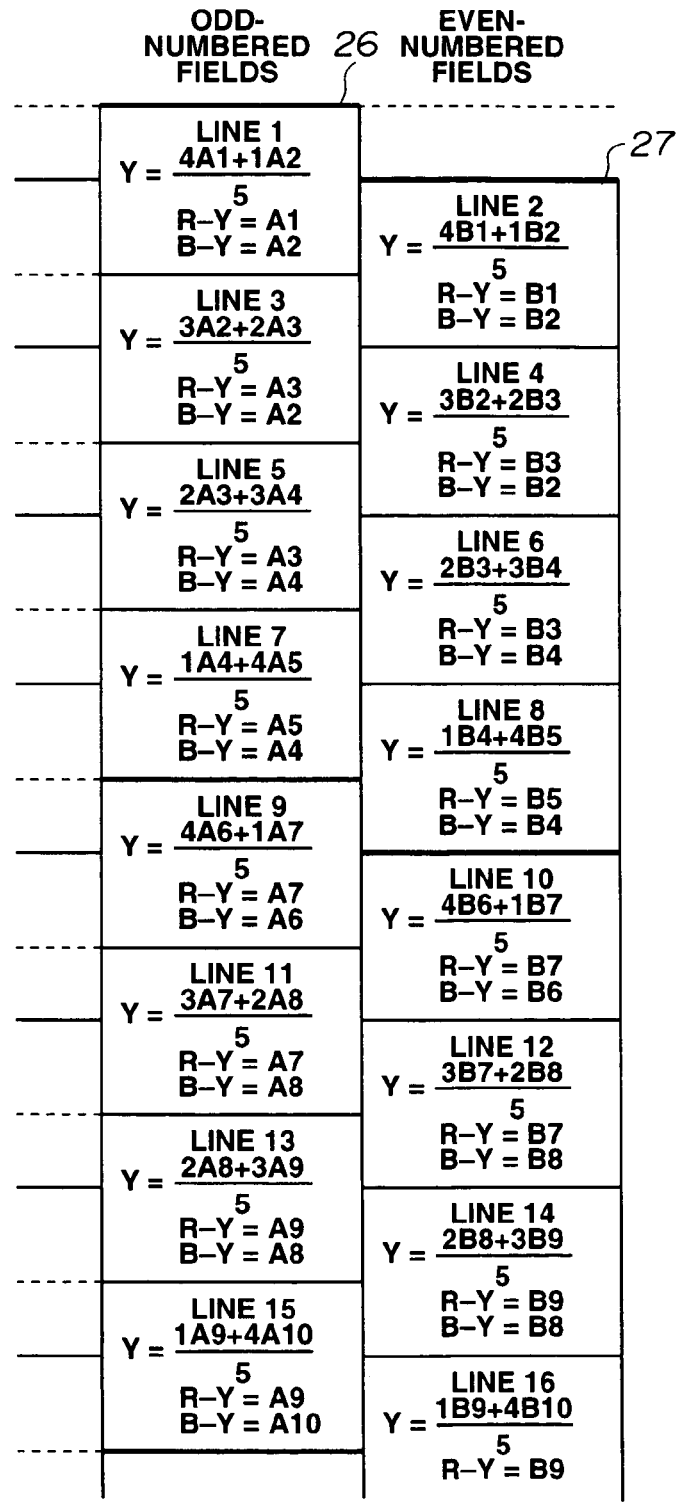
FIG. 8 is a schematic representation of interlaced moving image data of 240-line×2 fields calculated from the interlaced data of 300-line×2 fields shown in FIG. 7.

FIGS. 7 and 8 illustrate a calculation method of converting the pixel configuration 11 to the pixel 15 shown in FIG. 1 wherein this method is suitable for obtaining interlaced moving image data used to check the framing condition.

In FIGS. 7 and 8, the data 21, 23, and 24 are similar to those used in FIGS. 5 and 6.

To display a moving image on a monitor device according to the NTSC standard, it is required that the moving image data should be represented in the interlaced 480-scanning-line format. One way of obtaining such data is to re-convert the data 25 into the interlaced form. In this technique, however, frame data is required and thus the response to a moving object becomes slow.

To avoid the above problem, in the present embodiment of the invention, moving image data used to check the framing condition is obtained for each field by calculating 240-scanning-line data from 300-scanning-line data.

More specifically, data 26 for an odd-numbered field is calculated from the data 23 according to the algorithm shown in FIG. 8, and data 27 for an even-numbered field is calculated from the data 24 according to the algorithm also shown in FIG. 8.

In the case of the data 26, data of line 1 is given as Y=(4A1+1A2)/5, data of line 3 is given as Y=(3A2+2A3)/5, data of line 5 is given as Y=(2A3+3A4)/5, data of line 7 is given as Y=(1A4+4A5)/5, and so on.

On the other hand, for the data 27, data of line 2 is given as Y=(4B1+1B2)/5, data of line 4 is given as Y=(3B2+2B3)/5, data of line 6 is given as Y=(2B3+3B4)/5, data of line 8 is given as Y=(1B4+4B5)/5, and so on.

Although the vertical resolution of these data 26 and 27 is rather low, these data are still good enough for the purpose of checking the framing condition.

The color-difference signals for line 1 are given as R−Y=A1 and B−Y=A2 by employing the color-difference signals of the line 1 and line 3 of the data 23. The color-difference signals for line 2 are given as R−Y=B1 and B−Y=B2 by employing the color-difference signals of the line 2 and line 4 of the data 24. The color-difference signals for the other lines are obtained in a similar manner. In this technique, the color-difference signals are given by directly employing the data of two lines which are used to calculate the luminance signal Y, and thus no color shifting error occurs.

Figure 9:
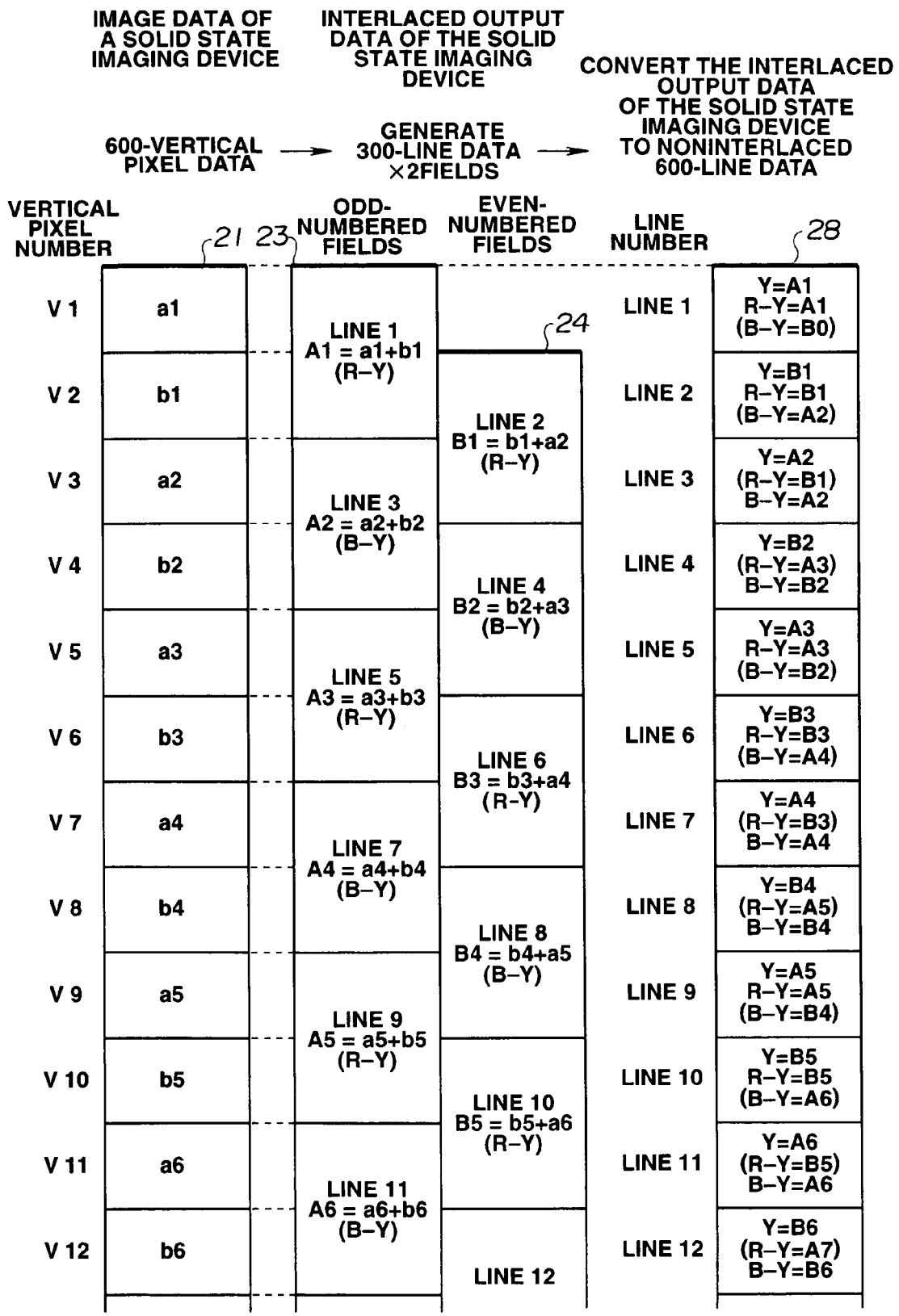
FIG. 9 is a schematic representation of noninterlaced 600-line still image data calculated from the interlaced data of 300-line×2 fields output by the solid state imaging device in the digital image recording/reproducing apparatus according to the first embodiment of the invention.

FIG. 9 illustrates a method of interpolating color-difference signals of noninterlaced 600-vertical-pixel data. This technique may be employed when the pixel configuration 11 is converted to the pixel configuration 12 equivalent to the original configuration to obtain image data to be recorded.

In FIG. 9, data 21, 23, and 24 are the same as those shown in FIGS. 5 and 6, and data 28 is noninterlaced data calculated from the data 23 and 24.

As described above with reference to FIGS. 5 and 6, if a solid state imaging device of the interline type with complementary color filters is employed, only one color signal, either R−Y or B−Y, can be obtained from a signal given in the form of a combination of two pixel data. Thus, in the data 28, as in the data 25 shown in FIG. 6, the color-difference signal which is not obtained is distinguished by enclosing it in parentheses ( ). The missing color-difference signal is recovered with a color-difference signal of an adjacent line calculated from two pixel data one of which is included in common as one of two pixel data in the line under consideration. In this invention, as in a previous example, the missing data is recovered by using another data which has common pixel data and thus has a close relationship with the missing data. This technique has an advantage that the resultant color-difference signal has a higher vertical resolution than that obtained from two lines prior to and subsequent to the line of interest by means of interpolation.

Figure 10:
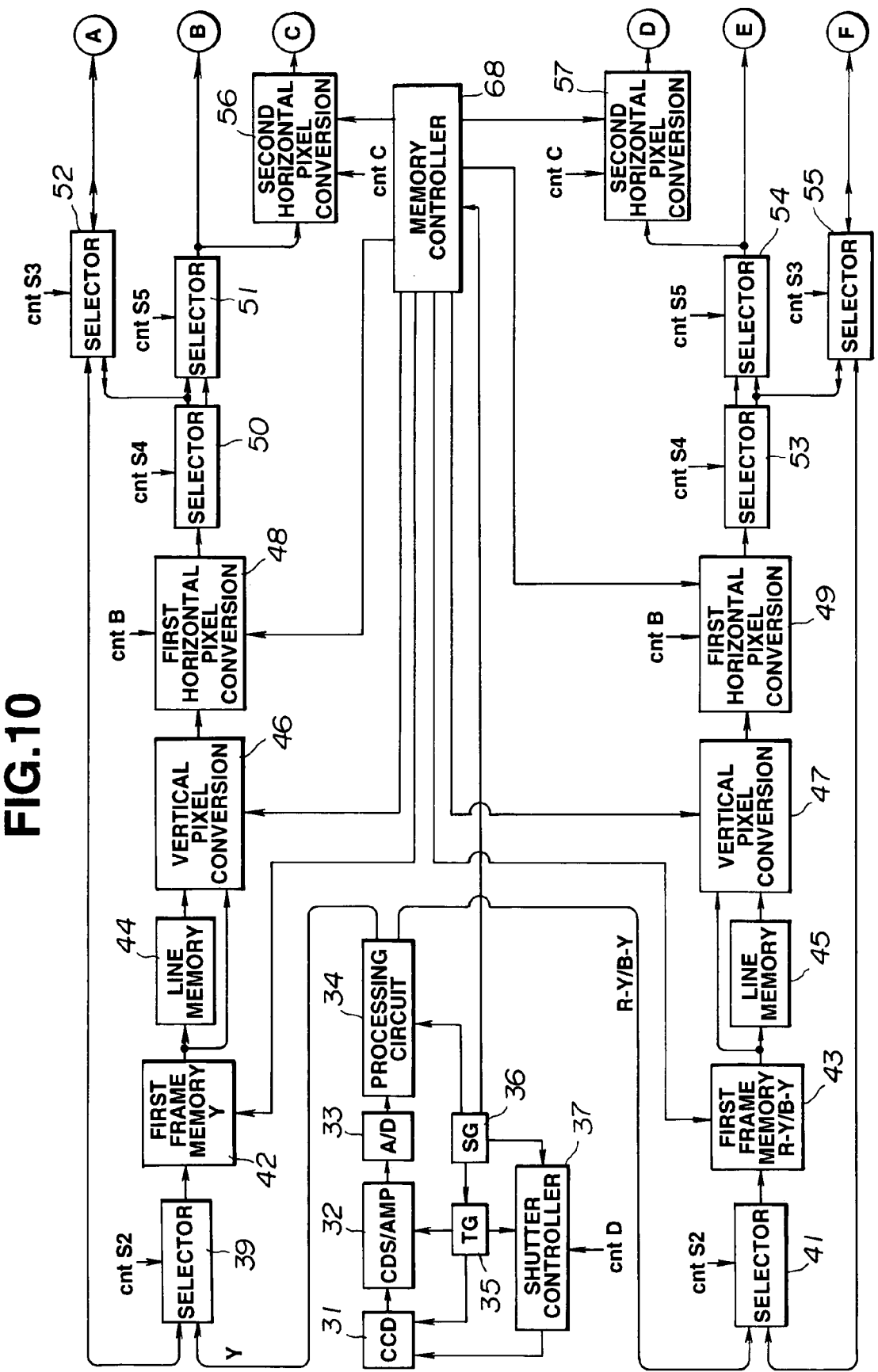
FIG. 10 is a block diagram illustrating a part of the construction of the digital image recording/reproducing apparatus according to the first embodiment of the invention.
Figure 11:
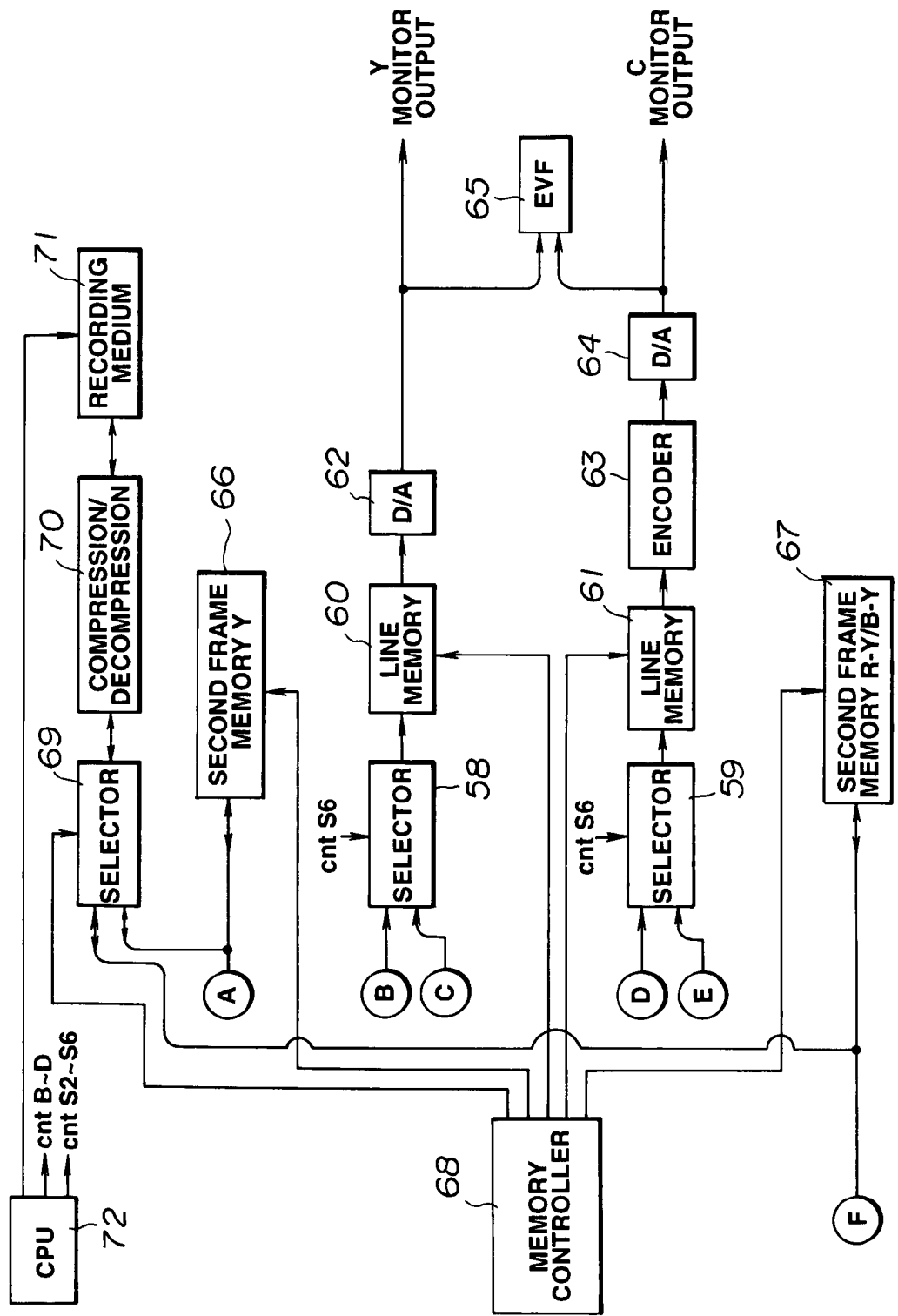
FIG. 11 is a block diagram illustrating another part of the construction of the digital image recording/reproducing apparatus according to the first embodiment of the invention.

FIGS. 10 and 11 are a block diagram illustrating a circuit of a digital image recording/reproducing apparatus in which data conversion in terms of the pixel-configuration is performed according to the techniques described above with reference to FIGS. 1 to 9. FIGS. 10 and 11 illustrate different parts of the same single apparatus. As shown in FIGS. 10 and 11, the digital image recording/reproducing apparatus includes: a solid state imaging device (or CCD) 31 of the interline type having 800 horizontal pixels×600 vertical pixels and having complementary color filters; a correlation double sampling circuit/amplifier (CDS) 32; an analog-to-digital (A/D) converter 33; a processing circuit 34 for processing image data; a timing generator (TG) 35 for driving the solid state imaging device; a sync signal generator (SG) 36; a shutter controller 37 for controlling the electronic shutter of the solid state imaging device; selectors 39, 41, 50, 51, 52, 53, 54, 55, 58, 59, and 69 serving as a selecting element composed of a multiplexer; first frame memories of the FIFO type 42 and 43 for storing one frame of image data; line memories of the FIFO type 44, 45, 60, and 61 for storing one horizontal-scanning-line data; vertical pixel conversion circuits 46 and 47 serving as a calculation element as well as a conversion element for converting 600 vertical pixels to 480 vertical pixels; first horizontal pixel conversion circuits 48 and 49 serving as a calculation element as well as a conversion element for converting 800 horizontal pixels to 768 or 640 horizontal pixels; second horizontal pixel conversion circuits 56 and 57 serving as a calculation element as well as a conversion element for converting 640 horizontal pixels to 768 horizontal pixels; second frame memories 66 and 67 for storing one frame of image data; a memory controller 68 for controlling the operation of the first and second frame memories 42, 43, 66, and 67 to store data, and also for controlling the vertical pixel conversion circuits 46 and 47 and the line memories 60 and 61 which are all operated in conjunction with the first and second frame memories 42, 43, 66, and 67, and furthermore for controlling the selector 69; digital-to-analog converters D/A 62 and 64; a chroma balanced-modulator serving as an encoder 63; an electronic viewfinder EVF 65 serving as a monitor element for checking the framing condition of a image data to be recorded on a recording medium 71 which will be described later; a compression/decompression circuit 70 for compressing and decompressing image data; a recording medium 71 serving as a recording element for recording compressed image data; and a microprocessor CPU 72 for controlling the operation mode over the entire apparatus.

Now the data flow in operation from acquisition of image data via the CCD 31 to outputting of moving image data to be displayed on the monitor or recorded on a recording medium will be described below.

The CCD 31 outputs a signal representing an image wherein each frame of image is composed of 800 pixels in the horizontal direction×300 lines in the vertical direction. The signal is read from the CCD 31 in response to the timing pulse which is generated by the TG 35 according to the sync signal supplied by the SG 36. The exposure time of the CCD 31 is controlled by the shutter controller 37.

The signal output from the CCD 31 is applied to the CDS 32, which removes noise from the signal. The resultant signal is then applied to the A/D converter 33 and converted into digital form. The A/D converter 33 operates at a sampling frequency equal to the frequency of the horizontal driving signal generated by the TG 35 so that one sampled digital data is obtained for each horizontal pixel of the CCD 31. Similarly, subsequent digital signal processing is also performed in response to a clock signal having a frequency equal to the frequency of the horizontal driving signal generated by the TG 35.

The data output from the A/D converter is applied to the processing circuit 34 and subjected to processes including color separation, gamma correction, and edge enhancement. The resultant signals, that is, luminance signal Y, color-difference signals R−Y and B−Y, are output separately as shown in FIG. 10. The data output from the processing circuit 34 is further processed so that image data is recorded on a recording medium or moving image data is displayed on a monitor device depending on the operation mode. The mode selection is performed as follows. In response to a switching operation by a user, the CPU 72 generates control signals cntB to cntD and cntS2 to cntS6. The control signal cntB is applied to the first horizontal pixel converters 48 and 49, the control signal contC is applied to the second horizontal pixel conversion circuits 56 and 57, and the control signal contD is applied to the shutter controller 37, while the control signal cntS2 is applied to the selectors 39 and 41, the control signal cntS3 is applied to the selectors 52 and 55, the control signal cntS4 is applied to the selectors 50 and 53, the control signal cntS5 is applied to the selectors 51 and 54, and the control signal cntS6 is applied to the selectors 58 and 59, so as to control these selectors thereby controlling the operation mode. In a recording mode, the CPU 72 writes data serving as an identification element into the header area of image data to be recorded thereby indicating the pixel configuration of that data.

The process flow of converting the data output from the processing circuit 34 to various pixel configurations will be described below.

The conversion from the pixel configuration 11 to the pixel configuration 15 shown in FIG. 1 so as to obtain image data to be displayed on the monitor and the EVF 65 will be described first. For this purpose, it is required to convert 800 horizontal pixels to 768 horizontal pixels as described earlier in connection with FIG. 2, and it is also required to convert 600 vertical pixels to 480 vertical pixels as described above in connection with FIGS. 7 and 8.

Referring to FIGS. 10 and 11, the luminance signal Y output by the processing circuit 34 is supplied to the first frame memory 42 via the selector 39 and stored therein temporarily. The luminance signal Y is then read from the first frame memory 42, and data conversion in terms of vertical pixels is performed using the line memory 44 and the vertical pixel conversion circuit 46.

After that, data conversion in terms of horizontal pixels is performed by the first horizontal pixel conversion circuit 48. The resultant data is supplied to the line memory 60 via the selectors 50, 51, and 58. The data which has been adjusted to suit the monitor in this way is further converted into analog form by the D/A converter 62, and supplied to the monitor and the EVF 65.

On the other hand, the color-difference signals R–Y and B–Y output from the processing circuit 34 are supplied to the first frame memory 43 via the selector 41 and stored therein temporarily. The color-difference signals R–Y and B–Y are then read from the first frame memory 43, and data conversion in terms of vertical pixels is performed using the line memory 45 and the vertical pixel conversion circuit 47.

After that, data conversion in terms of horizontal pixels is performed by the first horizontal pixel conversion circuit 49. The resultant data is supplied to the line memory 61 via the selectors 53, 54, and 59. The data which has been adjusted to suit the monitor in this way is then converted into a chroma signal by the encoder 63 and further into analog form by the D/A converter 64, and finally supplied to the monitor and the EVF 65.

Figure 12:
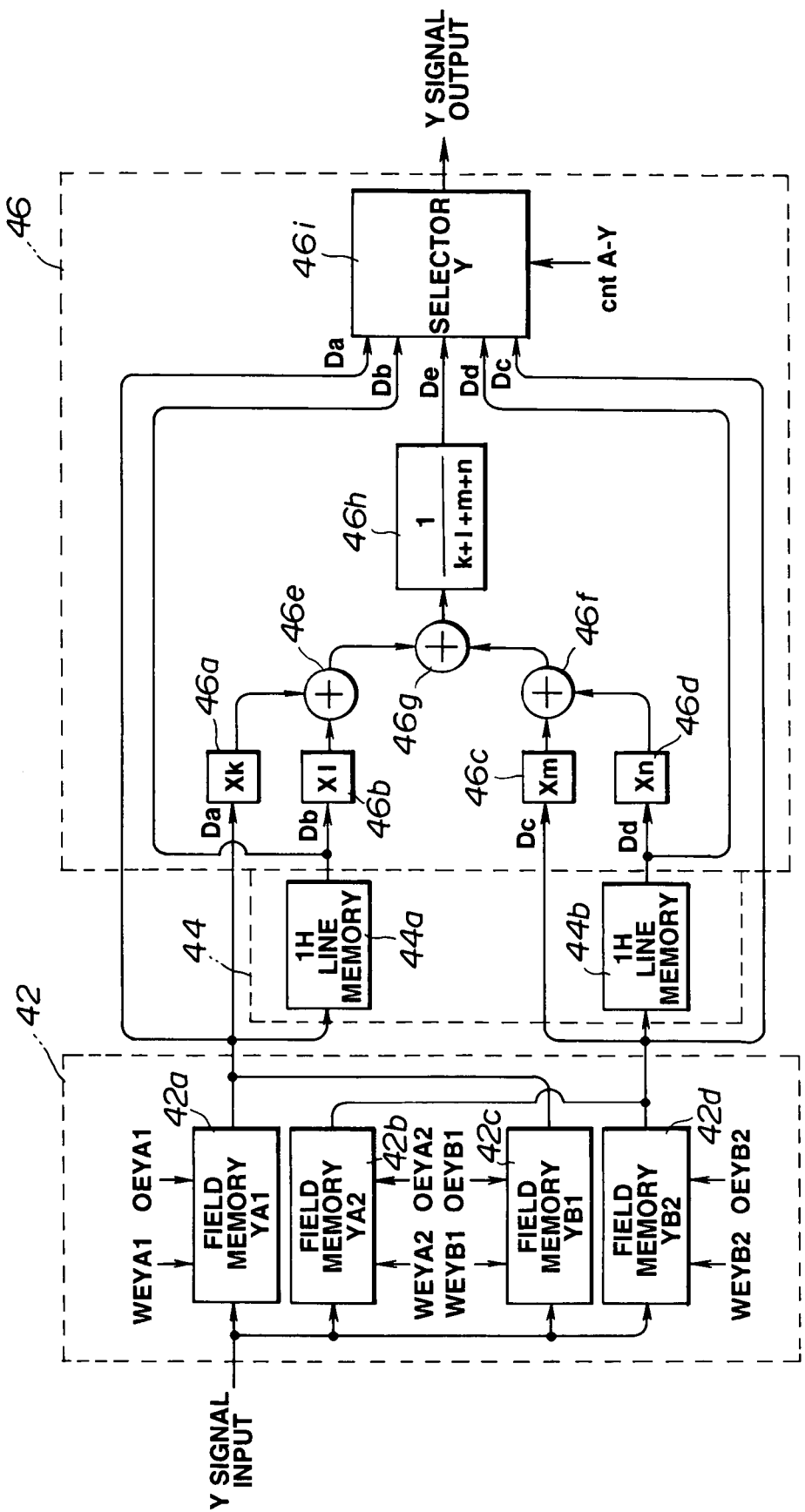
FIG. 12 is a block diagram illustrating a part responsible for vertical pixel conversion on a luminance signal, the part including a first frame memory, a line memory, and a vertical pixel conversion circuit, in the digital image recording/reproducing apparatus according to the first embodiment of the invention.

FIG. 12 is a block diagram illustrating in further detail the circuit blocks responsible for data conversion of the luminance signal Y in terms of vertical pixels including the first frame memory 42, the line memory 44, and the vertical pixel conversion circuit 46 shown in FIG. 10.

As shown in FIG. 12, the first frame memory 42 includes four memories so that one field of data is stored in field memories 42a and 42b and another field of data is stored in field memories 42c and 42d.

The line memory 44 includes line memories 44a and 44b of the FIFO type for storing one horizontal-scanning-period of data.

The vertical pixel conversion circuit 46 includes coefficient multipliers 46a, 46b, 46c and 46d, adders 46e, 46f and 46g, a divider 46h, and a selector 46i.

Figure 13A:
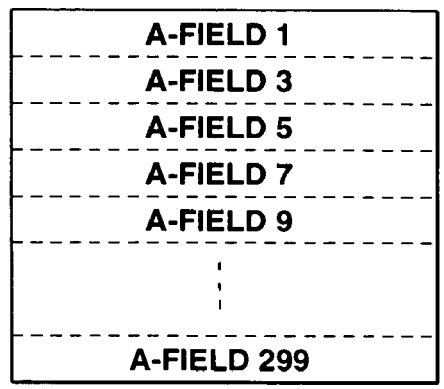
FIGS. 13A, 13B, 13C, and 13D are schematic representations of memory mapping associated with the first frame memory for storing the luminance signal, in the digital image recording/reproducing apparatus according to the first embodiment of the invention.

FIG. 13A is a schematic representation of mapping of luminance signal data Y written in the field memory 42a.

Figure 13B:
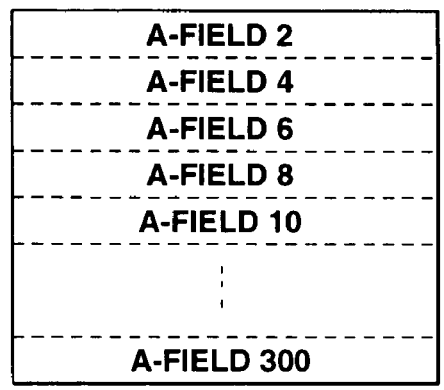
Figure 13C:
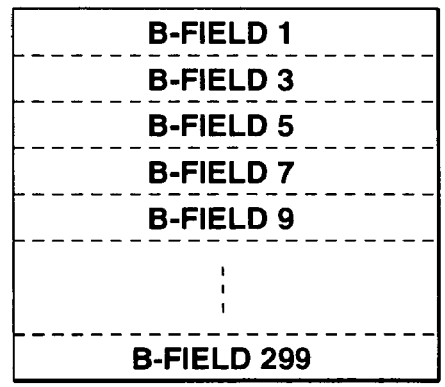
Figure 13D:
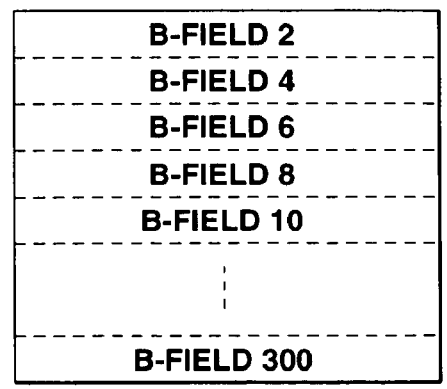

Similarly, FIG. 13B illustrates data written as a luminance signal Y into the field memory 42b, FIG. 13C illustrates data written as a luminance signal Y into the field memory 42c, and FIG. 13D illustrates data written as a luminance signal Y into the field memory 42d.

As can be seen from these figures, the field memory 42a stores odd-numbered line data of an odd-numbered field (also referred to as an A-field) and the field memory 42b stores even-numbered line data of the odd-numbered field.

Similarly, the field memory 42c stores odd-numbered line data of an even-numbered field (also referred to as a B-field) and the field memory 42d stores even-numbered line data of the even-numbered field.

Since the field memories 42a, 42b, 42c, and 42d are of the FIFO type as described above, if write enable signals WEYA1, WEYA2, WEYB1, WEYB2 shown in FIG. 12 are activated depending on the data to be stored, the data can be stored in a correct field memory described above.

Such control of the write enable signals WEYA1, WEYA2, WEYB1, and WEYB2 is performed by the memory controller 68. The data stored in the memory consists of 300 lines (counted in the vertical direction) per each field, and thus it is impossible to deal with the data during a single vertical scanning period (1/60 sec) defined by the NTSC standard.

Figure 14:
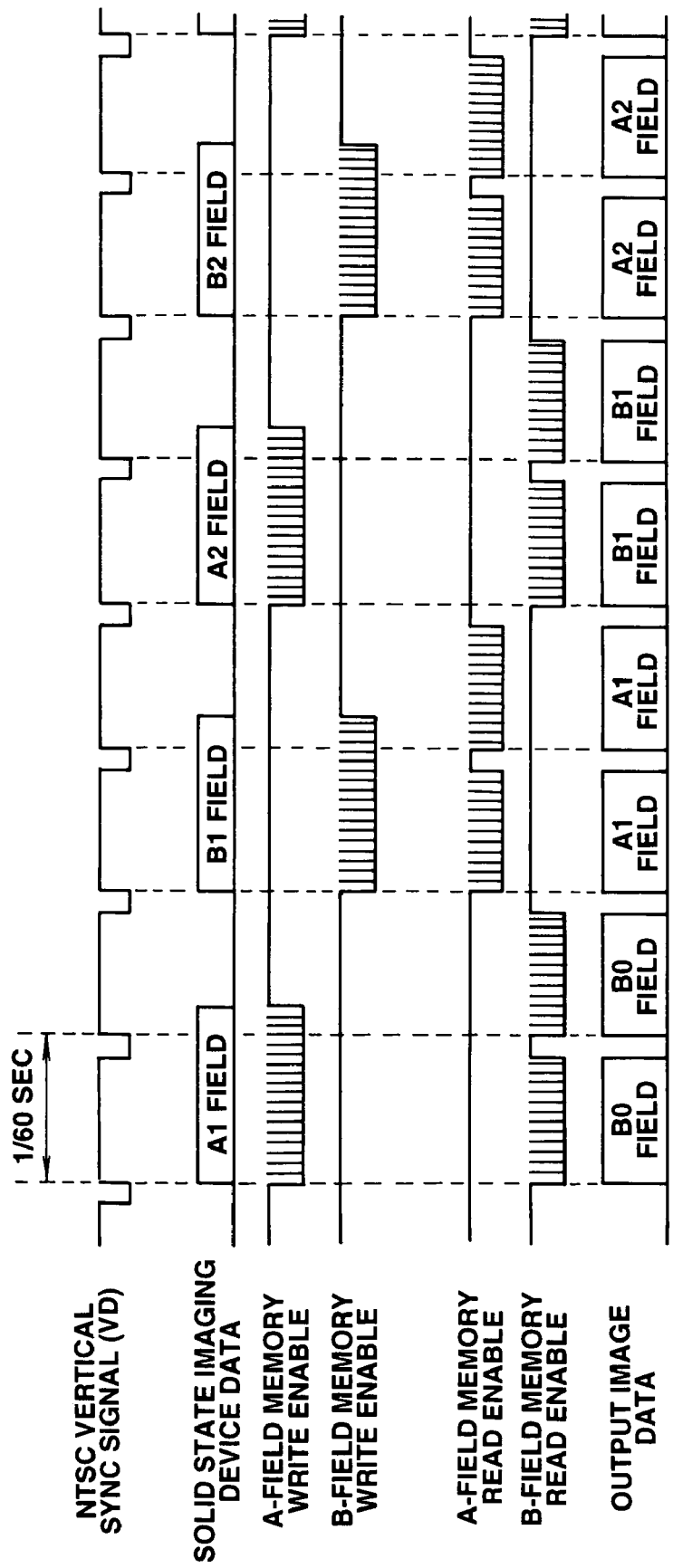
FIG. 14 is a timing chart illustrating the operation of reading data to obtain moving image data from the data output by the solid state imaging device in the digital image recording/reproducing apparatus according to the first embodiment of the invention.

In the present embodiment of the invention, the above problem is avoided by controlling the field memories 42a, 42b, 42c, and 42d with respect to the timing as shown in FIG. 14 so that pseudo moving image data having 30 fields per sec is output to the monitor.

In FIG. 14, when a vertical sync signal VD according to the NTSC standard is given, the solid state imaging device outputs a image signal in response to the VD signal so that one field is output every two pulses of the VD signal.

The data is stored alternately either in the odd-numbered or even-numbered memories depending on the data output by the solid state imaging device. When certain data is being written into some memories, data in the same field is read from the remaining memories twice every 1/30 sec in response to the VD signal.

The field memories 42a, 42b, 42c, and 42d are organized so that each memory may store one odd-numbered line of data or one even-numbered line of data. This memory organization makes it possible to read two lines of data at the same time and thus a reading operation can be completed within 1/60 sec.

In FIG. 14, all the enable signals are assumed to be active low.

Referring to FIGS. 12, 15A, and 15B, the above operation performed in 1/60 sec will be described in greater detail below.

FIGS. 15A and 15B illustrate the relationship regarding the timing between the conversion operation in terms of vertical pixels and the reading operations of the field memories 42a, 42b, 42c, and 42d, wherein FIG. 15A is concerned with an odd-numbered field and FIG. 15B is concerned with an even-numbered field. There is no particular difference in the timing between the odd-numbered field and the even-numbered field.

The data conversion in terms of vertical pixels is performed so that 5 lines are converted to 4 lines according to the method shown in FIGS. 7 and 8. If the fact that the field memories 42a and 42b are organized so that each memory may store one even-numbered line of data or one odd-numbered line of data is taken into account, it is possible to regard a conversion operation from 10 lines to 8 lines as a unit of operation. Therefore, only a first set of 8 lines plus some lines are shown in FIGS. 15A and 15b. Furthermore, in FIGS. 15A and 15B, transitions of data and control signals are represented in units of horizontal scanning periods (H) according to the NTSC standard.

The operation timing will be described below taking an odd-numbered field shown in FIG. 15A as an example. In response to a read enable signal OEYA1, data (Da in FIG. 12) is read from the field memory (YA1). Similarly, in response to a read enable signal OEYA2, data (Dc in FIG. 12) is read from the field memory (YA2).

From these data, one horizontal-scanning-period (1 H) delayed data (Db and Dd in FIG. 12) are produced via the line memories 44a and 44b, respectively. 240-line data (De in FIG. 12) is calculated from data correctly selected from the above data Da, Db, Dc, and Dd.

In FIGS. 15A and 15B, data which should be selected from the data Da, Db, Dc, and Dd are denoted by surrounding them by bold solid lines. As shown, two data are selected for each calculation.

For example, data for line 1 of an odd-numbered field is produced from A1 of Da and A2 of Dc as (4A1+1A2)/5.

Referring to FIG. 12, the calculation process of obtaining the above result will be described below.

There are provided multipliers 46a, 46b, 46c, 46d for multiplying the data by factors k, l, m, and n, respectively, wherein unnecessary data are multiplied by a factor of 0.

In the case of the above-described data for line 1 of the odd-numbered field, k=4, m=1, 1=n=0 are taken as the factors, and the multiplied data are added together via the adders 46e and 46f and further via the adder 46g. Thus the result at the output of the adder 46g becomes 4A1+1A2. The resultant data is divided by 5 (=k+l+m+n) by the divider 46h. Thus (4A1+1A2)/5 is obtained.

In the conversion from the pixel configuration 11 to the pixel configuration 15 shown in FIG. 1, the dividing factor employed by the divider 46h is always equal to 5 (=k+l+m+n). The selector 46i is controlled by the control signal cntA-Y supplied from the memory controller 68 so that the resultant data De is always selected.

Figure 16:
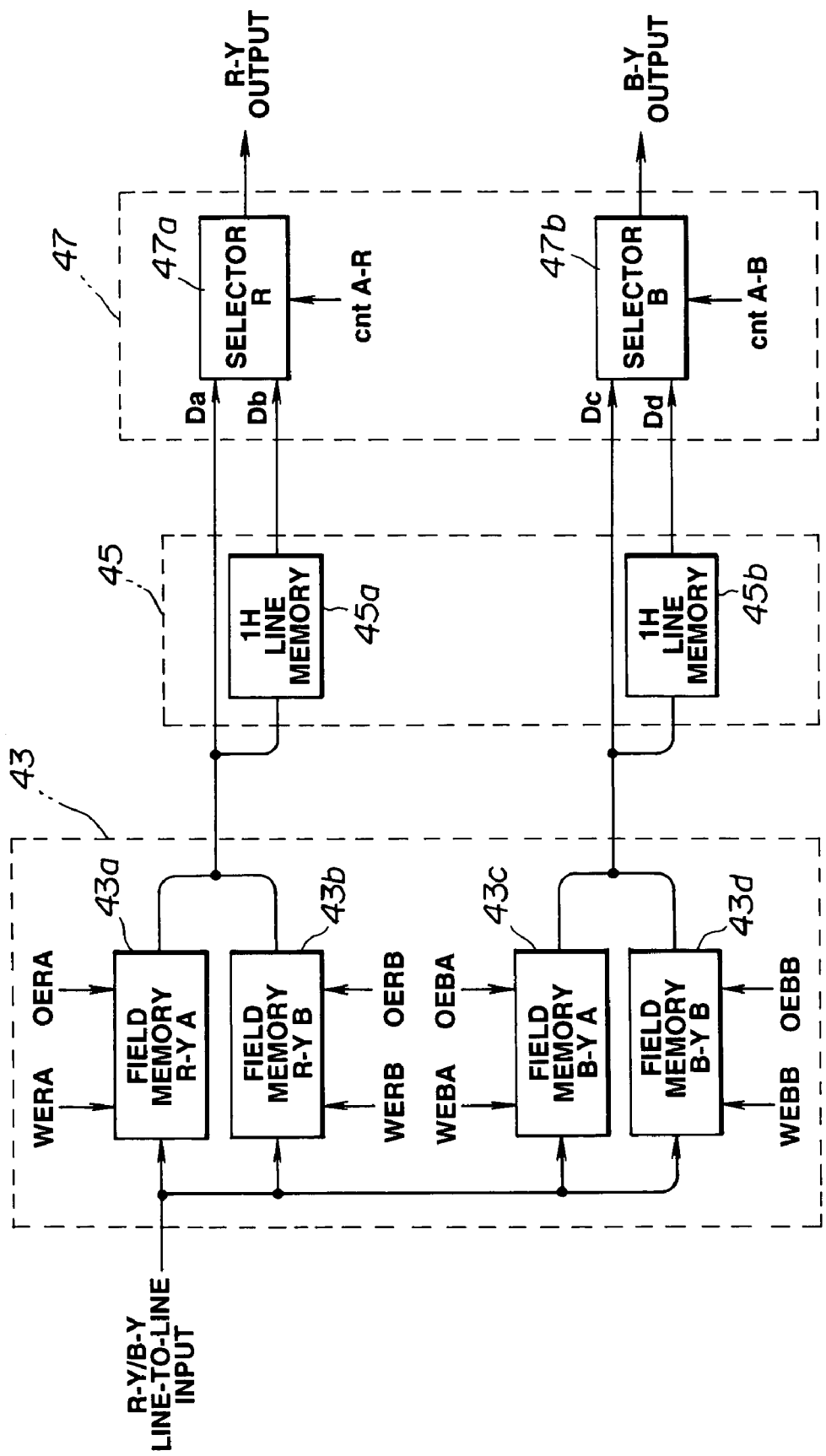
FIG. 16 is a block diagram illustrating a part responsible for vertical pixel conversion on color-difference signals, the part including a first frame memory, a line memory, and a vertical pixel conversion circuit, in the digital image recording/reproducing apparatus according to the first embodiment of the invention.

FIG. 16 is a block diagram illustrating in further detail the circuit blocks responsible for data conversion of the color-difference signals R–Y/B–Y in terms of vertical pixels including the first frame memory 43, the line memory 45, and the vertical pixel conversion circuit 47 shown in FIG. 10.

As shown in FIG. 16, the first frame memory 43 includes four memories so that one field of R–Y data is stored in field memories 43a and 43b and one field of B–Y data is stored in field memories 43c and 43d.

The line memory 45 includes a plurality of line memories 45a and 45b of the FIFO type for storing one horizontal-scanning-period of data.

The selector 47 includes a selector 47a for dealing with an R–Y signal and a selector 47b for dealing with a B–Y signal.

Figure 17A:
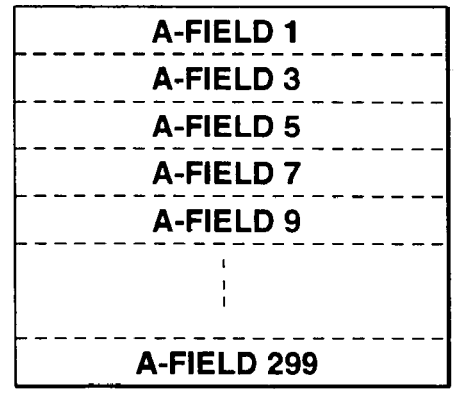
FIGS. 17A, 17B, 17C, and 17D are schematic representations of memory mapping associated with the first frame memory for storing the color-difference signals, in the digital image recording/reproducing apparatus according to the first embodiment of the invention.
Figure 17B:
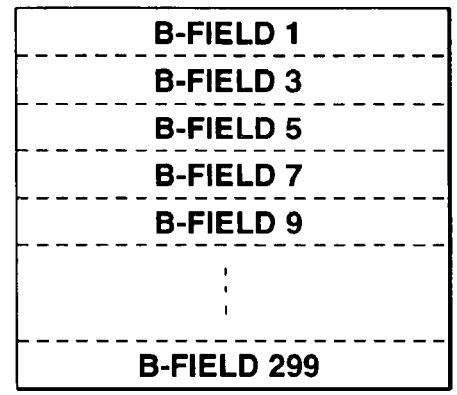
Figure 17C:
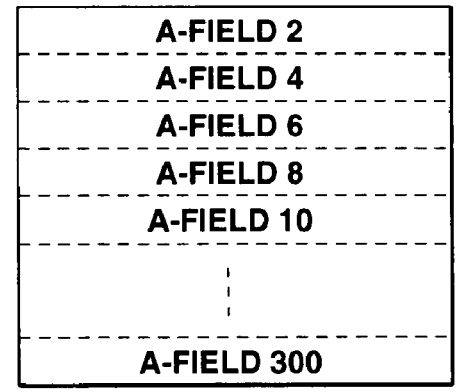
Figure 17D:
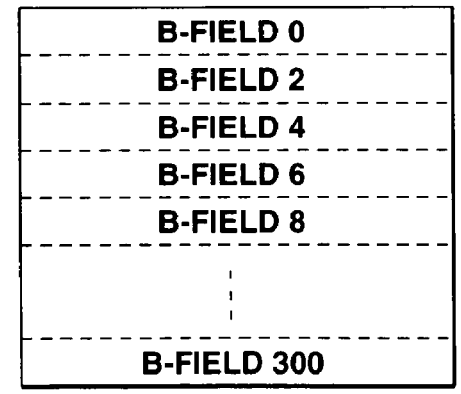

FIG. 17A is a schematic representation of mapping of data written into the field memory 43a. Similarly, FIG. 17B illustrates data written into the field memory 43b, FIG. 17C illustrates data written into the field memory 43c, and FIG. 17D illustrates data written into the field memory 43d. The color-difference signal is supplied line by line, and thus the field memory 43a is designed to store odd-numbered line data of an odd-numbered field (also referred to as an A-field) and the field memory 43c is designed to store even-numbered line data of the odd-numbered field.

Similarly, the field memory 43b stores odd-numbered line data of an even-numbered field (also referred to as a B-field) and the field memory 43d stores even-numbered line data of the even-numbered field.

Since these field memories are of the FIFO type, if write enable signals WERA, WERB, WEBA, and WEBB are activated depending on the data to be stored, the data can be stored in a correct field memory described above.

Such control of the write enable signals WERA, WERB, WEBA, and WEBB is performed by the memory controller 68.

Referring to FIGS. 16, 18A, 18B, 19A, and 19B, the conversion process of color-difference signals in terms of vertical pixels will be described below.

Figure 19A:
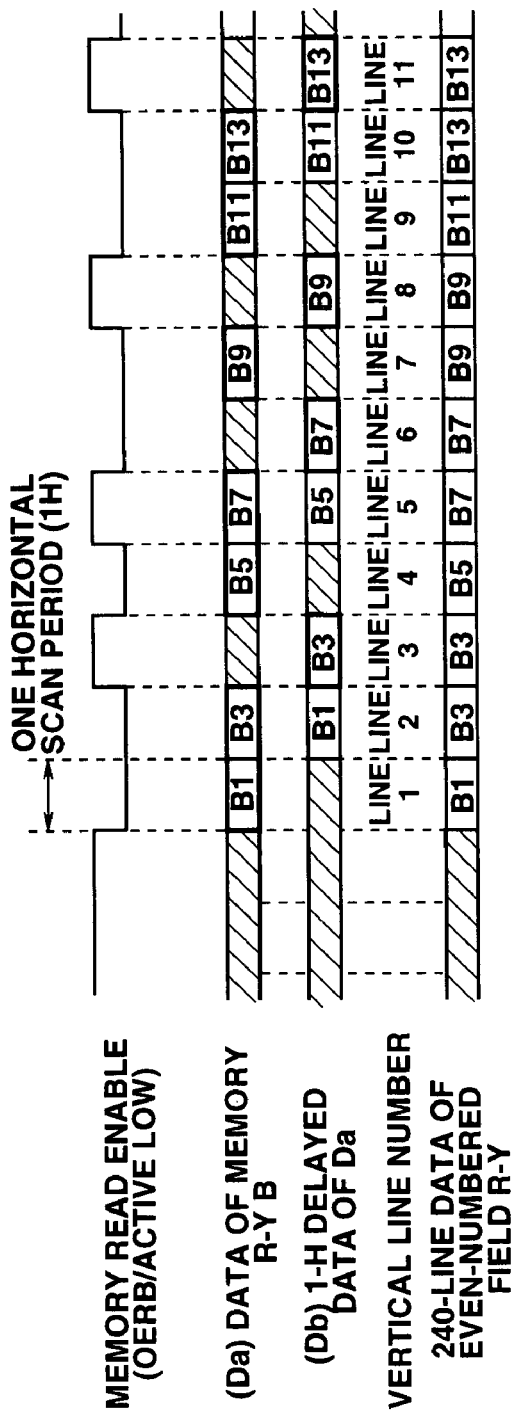
FIGS. 19A and 19B are timing charts illustrating the operation of reading color-difference signal data of an even-numbered field from the field memory and the operation of converting the data from the 600-line format to the 480-line format in the digital image recording/reproducing apparatus according to the first embodiment of the invention.
Figure 19B:
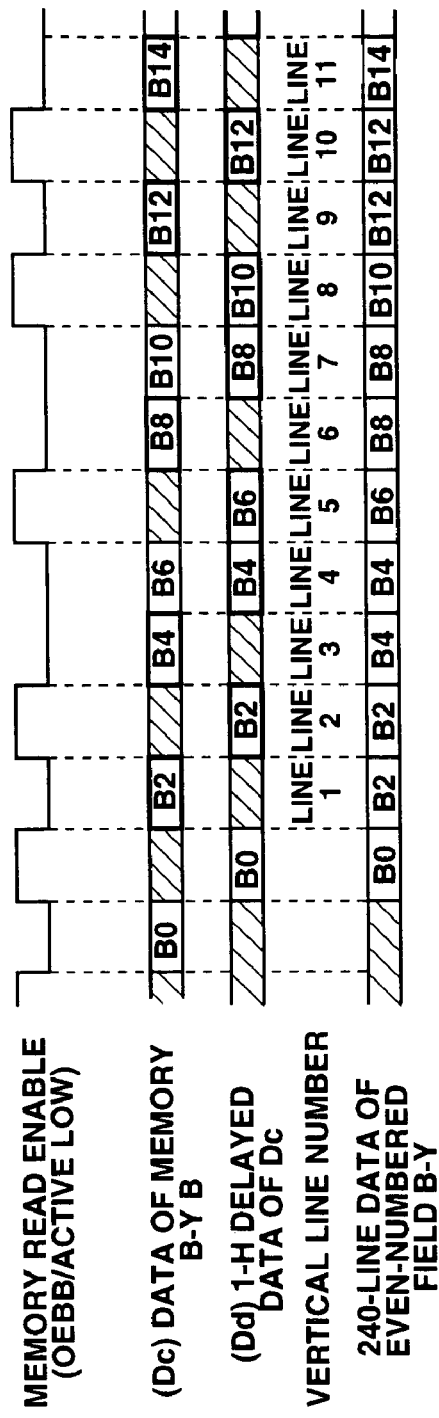

FIGS. 18A, 18B, 19A, and 19B illustrate the relationship regarding the timing between the conversion operation in terms of vertical pixels and the reading operations of the field memories 43a, 43b, 43c, and 43d, wherein FIGS. 18A and 18B are concerned with an odd-numbered field and FIGS. 19A and 19B are concerned with an even-numbered field.

In these figures, a unit of time period is equal to that employed in FIGS. 15A and 15B. Since color-difference signals are supplied in the form of line-to-line data, one line of data is one-half that of luminance signal. Therefore, data of two lines employed for calculating the luminance signal Y are employed to obtain color-difference signals R–Y and B–Y as described above with reference to FIGS. 7 and 8.

By way of example, the operation timing for an R–Y signal shown in FIG. 18A will be described below. In response to a read enable signal BERA, data (Da in FIG. 16) is read from the field memory (R–Y A).

From this data, one horizontal-scanning-period (1 H) delayed data (Db in FIG. 16) is produced via the line memory 45a. 240-line data is obtained by selecting correct data from the above data Da and Db.

In FIG. 18A, data which should be selected from data Da and Db are denoted by surrounding them by bold solid lines. As shown, either Da or Db are selected for each horizontal scanning period.

For example, A1 of Da is selected for line 1 of an R–Y signal. Similarly, A3 of Da is selected for line 2 and A3 of Db is selected for line 3. The above selection is performed via the selector 47a in response to the control signal cntA-R supplied from the memory controller 68.

The operation for the B–Y signal is performed in a similar manner. That is, in response to a read enable signal OEBA shown in FIG. 18B, data (Dc in FIG. 16) is read from the field memory 43c (B–Y A).

From this data, one horizontal-scanning-period (1 H) delayed data (Dd in FIG. 16) is produced via the line memory 45b. The data Dc and Dd are then correctly selected in response to the control signal cntA-B supplied from the memory controller 68.

The process for even-numbered fields is performed in a manner basically similar to odd-numbered fields except that it is required to deal with the effects which occur during a noninterlacing process as will be described later.

In the operation for the R–Y signal, data (Da in FIG. 16) is read from the field memory 43b (R–Y BA) in response to a read enable signal OERB shown in FIG. 19A.

From this data, one horizontal-scanning-period (1 H) delayed data (Db in FIG. 16) is produced via the line memory 45a. 240-line data is obtained by selecting correct data from the above data Da and Db under the control of the memory controller 68 via the control signal cntA-R. In FIG.

19A, data which should be selected from data Da and Db are denoted by surrounding them by bold solid lines.

In the mapping regarding a B−Y signal of an even-numbered field for the field memory 43d, as can be seen from FIG. 17D, data of line 0 is written into the memory as opposed to the other field memories. This occurs because of the noninterlacing process.

To deal with the above effect, in the processing of even-numbered fields, the write enable signal OEBB is controlled so that first data B0 for a color-difference signal B−Y is read with timing two horizontal scanning periods earlier relative to the other field memories as shown in FIG. 19B, while data B2 and following that are processed in the same manner as odd-numbered fields as described above with reference to FIGS. 18A and 18B.

Figure 20:
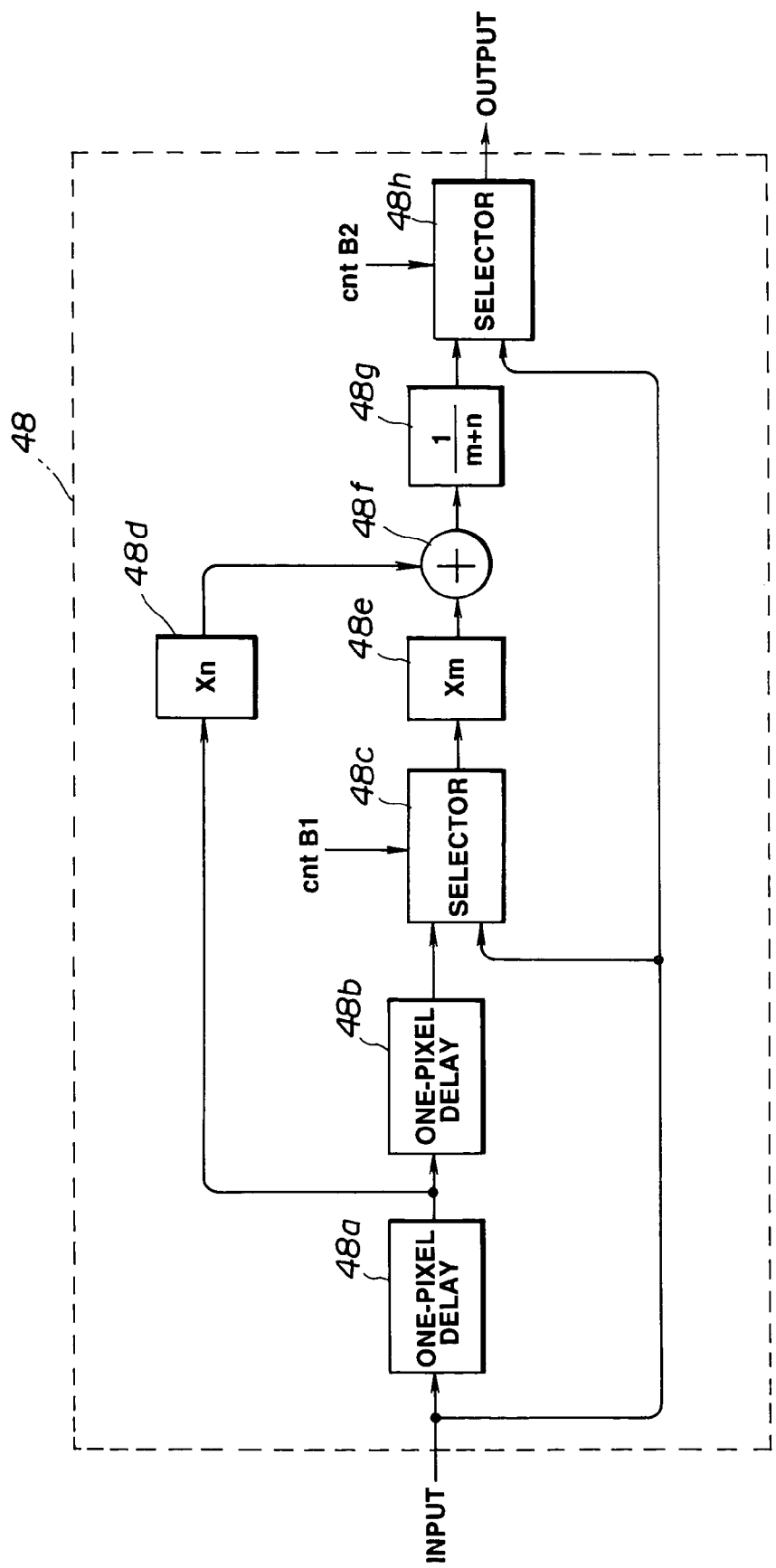
FIG. 20 is a block diagram illustrating the detailed construction of the first horizontal pixel conversion circuit in the digital image recording/reproducing apparatus according to the first embodiment of the invention.

FIG. 20 is a block diagram illustrating, in greater detail, the first horizontal pixel conversion circuit 48. The other first horizontal pixel conversion circuit 49 is also constructed in a similar manner although it is not shown.

As shown in FIG. 20, the first horizontal pixel conversion circuit 48 includes one-pixel delay circuits 48a and 48b for producing a delay in data by the amount of one sampling period corresponding to one pixel along the horizontal direction, coefficient multipliers 48d and 48e, an adder 48f, a divider 48g, and selectors 48c and 48h.

Figure 21:
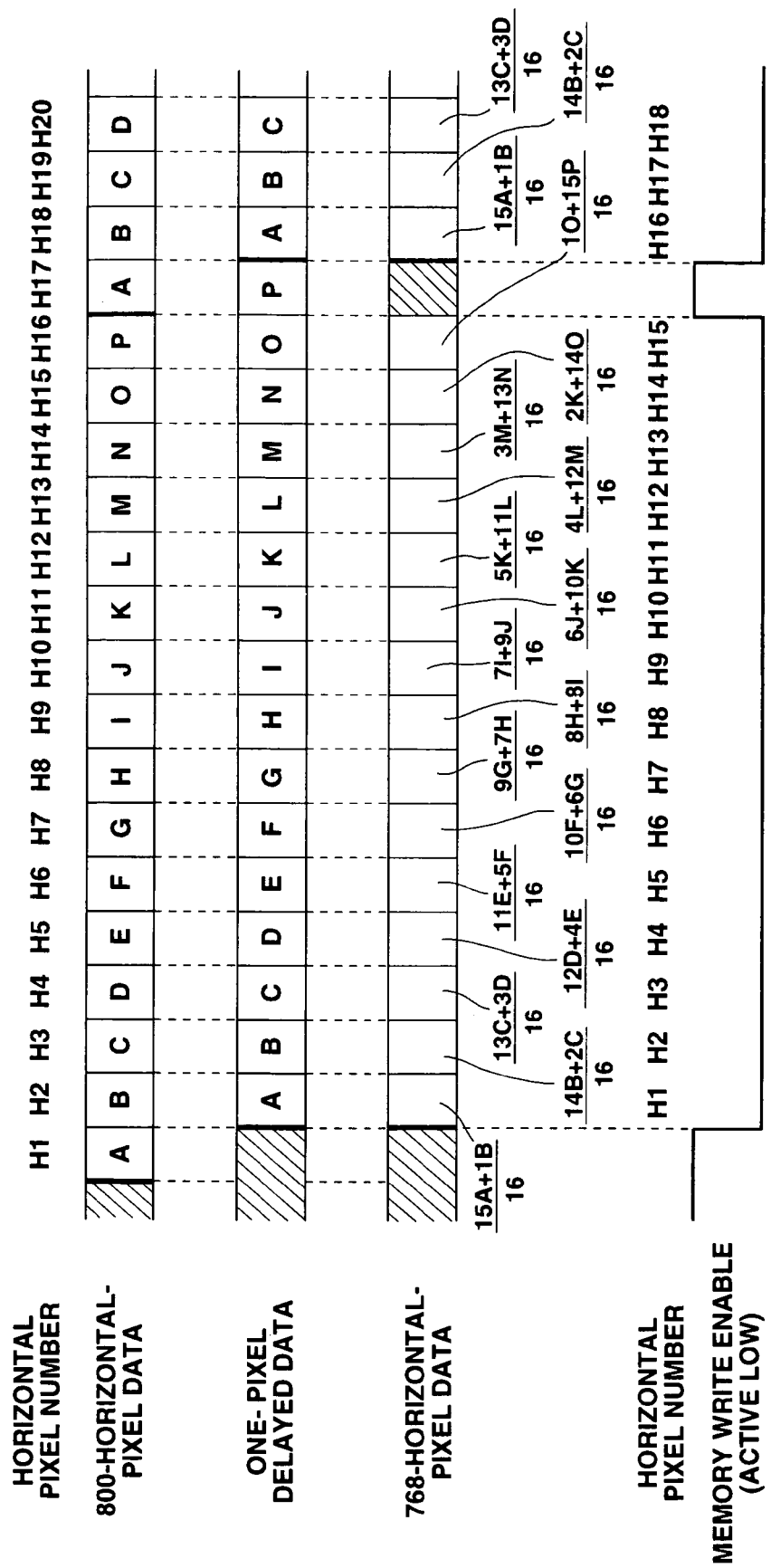
FIG. 21 is a timing chart illustrating 800-horizontal-pixel data, data delayed from the 800-horizontal-pixel data by one pixel period, and 768-horizontal-pixel data obtained by conversion process, in the digital image recording/reproducing apparatus according to the first embodiment of the invention.

Referring to FIGS. 20 and 21, the conversion process in terms of horizontal pixels will be described below.

FIG. 21 illustrates the relationship regarding the timing among 800 horizontal pixel data, data delayed from the 800 horizontal pixel data by an amount of one pixel, and 768 horizontal pixel data obtained by the conversion operation, wherein the data are represented in units of sampling periods described above.

As described earlier with reference to FIG. 2, the conversion from 800 horizontal pixels to 768 horizontal pixels can be accomplished by performing a calculation on two adjacent pixel data in which the conversion process from 16 pixels to 15 pixels can be regarded as a calculation unit. Therefore, only a first set of 15 lines plus some lines are shown in FIG. 21. As in FIG. 2, 16 pixels in a calculation unit are denoted by A to P from left to right.

As shown in FIG. 21, the calculation on two adjacent pixels can be performed using one-pixel delayed data and its original data.

Referring to FIG. 20, the process of this calculation will be described below.

The one-pixel delayed data is input to the multiplier 48d while the original data with no delay is input to the multiplier 48e via the selector 48c.

In the case of the conversion from 800 horizontal pixels to 768 horizontal pixels, the conversion is performed using two adjacent pixels as described above, and thus the one-pixel delay circuit 48b is not used in this case. Therefore, the CPU 72 sends a control signal cntB1 to the selector 48c so as to set the selector 48c such that the one-pixel delay circuit 48b is skipped. The multipliers 48d and 48e are used to multiply the data by factors n and m, respectively. For example, for line 1, factors n=15 and m=1 are employed and thus the result at the output of the adder 48f will be 15A+1B. The resultant data is then divided by 16 (=m+n) by the divider 48g. Thus (15A+1B)/16 is obtained.

In the conversion from 800 horizontal pixels to 768 horizontal pixels the dividing factor employed by the divider 48g is always equal to 16 (=m+n). The selector 48h is controlled by the memory controller 68 via the control signal cntB2 so that the above result is always selected.

In the above conversion process, since 16 horizontal pixel data are converted to 15 horizontal pixel data, a blank occurs every 15 pixels in the converted data. Therefore, the converted data cannot be employed to be displayed on the monitor. To avoid the above problem, the blanks are removed by the line memory 60 (refer to FIG. 11).

Figure 22:
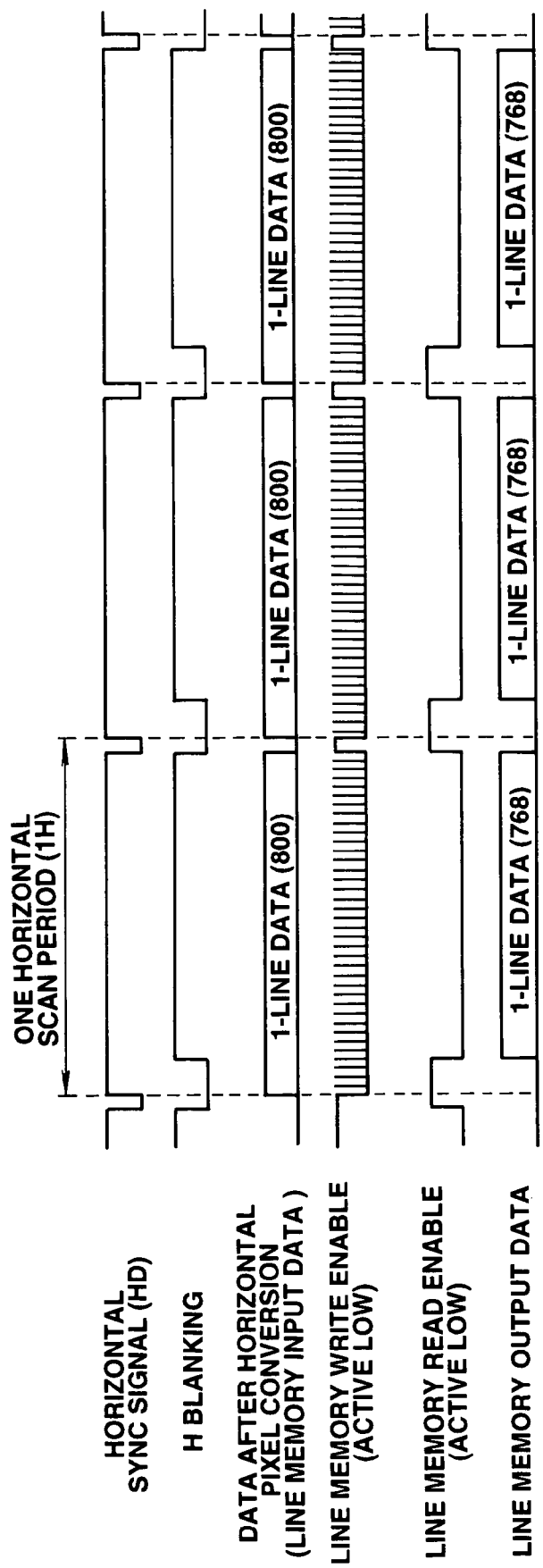
FIG. 22 is a timing chart illustrating the operation of writing and reading data into and from the line memory to obtain moving image data, in the digital image recording/reproducing apparatus according to the first embodiment of the invention.

FIG. 22 illustrates the timing regarding operations of writing and reading data into or from the line memory 60.

If the entire apparatus is driven at 14.3 MHz which is equal to the sampling rate for the 768 horizontal pixels, then 800 horizontal pixels can be dealt with within one horizontal scanning period defined by the NTSC standard plus some amount of period in the associated blanking period.

The converted 768-horizontal-pixel data including blanks is present within the horizontal scanning period of the 800-horizontal-pixel data, and thus is outputted with the timing as shown in FIG. 22. The starting position of data relative to the horizontal sync signal HD is determined by the manner in which the CCD 31 is driven.

After the conversion, only effective portions of the 768-horizontal-pixel data are written in the line memory 60 by making the write enable signal inactive as shown in FIG. 21.

The data stored in the line memory 60 is successively read in response to the trailing end position of a horizontal blanking signal thereby providing image data that can be displayed on a monitor according to the NTSC standard.

The process of converting the pixel configuration 11 to the pixel configuration 13 shown in FIG. 1 so as to provide data to be recorded on a recording medium will be described below.

For the above purpose, it is required to convert 800 horizontal pixels to 768 horizontal pixels as described earlier with reference to FIG. 2 and it is also required to convert 600 vertical pixels to 480 vertical pixels as described above with reference to FIGS. 5 and 6.

Referring again to FIGS. 10 and 11, the luminance signal Y is supplied to the first frame memory 42 via the selector 39 so that two fields of data are stored therein temporarily. The luminance signal Y is then read from the first frame memory 42, and data conversion in terms of vertical pixels is performed using the line memory 44 and the vertical pixel conversion circuit 46.

After that, conversion in terms of horizontal pixels is performed on the data using the first horizontal pixel conversion circuit 48. The resultant data is then sent to the second frame memory 66 via the selectors 50 and 52, and stored therein temporarily.

On the other hand, the color-difference signals R−Y and B−Y are supplied to the first frame memory 43 via the selector 41 so that two fields of data are temporarily stored in the frame memory 43. The data stored in the first frame memory 43 is then read, and data conversion in terms of vertical pixels is performed using the line memory 45 and the vertical pixel conversion circuit 47.

After that, conversion in terms of horizontal pixels is performed on the data using the first horizontal pixel conversion circuit 49. The resultant data is then sent to the second frame memory 67 via the selectors 53 and 55, and stored therein temporarily.

The luminance signal Y stored in the second frame memory 66 and the color-difference signals R−Y and B−Y stored in the second frame memory 67 are selected by the selector 69 and supplied to the compression/decompression circuit 70 so as to compress the data. The resultant data is then recorded on a recording medium 71.

Figure 23A:
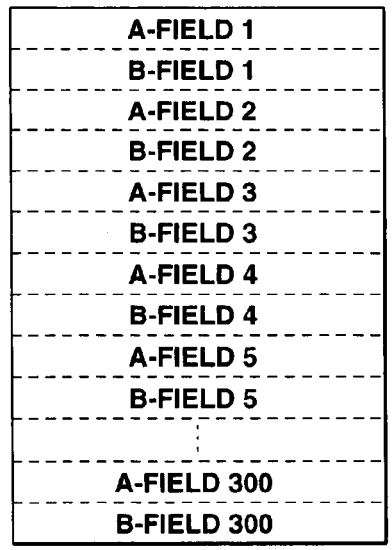
FIGS. 23A, 23B, and 23C are schematic representations of memory mapping associated with the data written in the second frame memory in the digital image recording/reproducing apparatus according to the first embodiment of the invention.
Figure 23B:
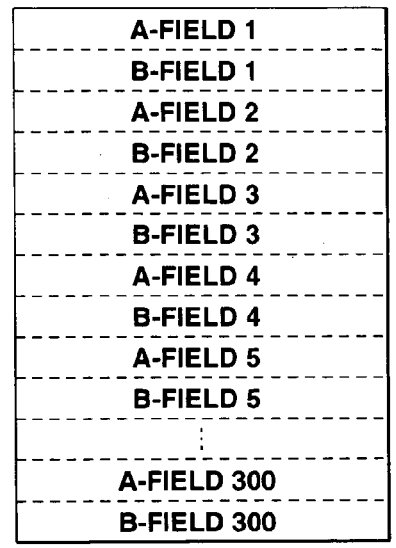
Figure 23C:
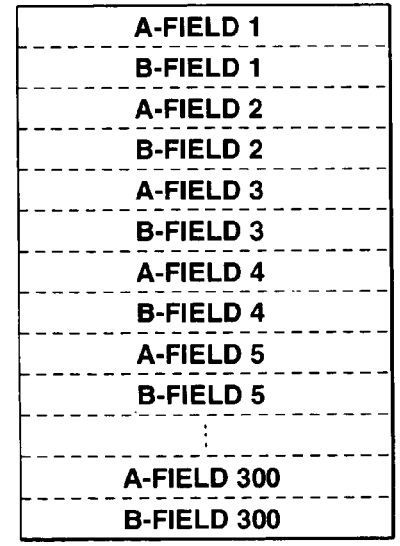

FIG. 23A is a schematic representation of mapping of luminance signal data Y written in the second field memory 66. Similarly, FIG. 23B illustrates color-difference signal data R–Y written in the second field memory 67, and FIG. 23C illustrates color-difference signal data B–Y written in the field memory 67. Since the data to be recorded is of the noninterlaced type as described earlier with reference to FIGS. 5 and 6, the data is mapped in the manner as shown in FIGS. 23A, 23B, and 23C.

FIG. 24 illustrates the relationship regarding the timing between the conversion operation in terms of vertical pixels and the operations of reading the luminance signal Y from the field memories 42a, 42b, 42c, and 42d. Noninterlaced data is produced from the data of odd-numbered and even-numbered fields and converted into the 480-line format via the vertical pixel conversion circuit shown in FIG. 12.

The data conversion in terms of vertical pixels is performed such that 10 lines are converted to 8 lines according to the method shown in FIGS. 5 and 6. If the fact that the field memories 42a, 42b, 42c, and 42d are organized so that each memory may store one even-numbered line of data or one odd-numbered line of data is taken into account, it is possible to regard a conversion operation from 20 lines to 16 lines as a unit of operation. Therefore, only a first set of 16 lines plus some lines are shown in FIG. 24. In FIG. 24, transitions in the data and control signals are shown in units of one horizontal scanning period (1 H) defined by the NTSC standard.

Referring to FIG. 24, the operation timing will be described below. In response to read enable signals OEYA1, OEYA2, OEYB1, and OEYB2, data is read from the field memories 42a, 42b, 42c, and 42d respectively.

Of these data, the data from the field memories 42a and 42c and also the data from the field memories 42b and 42d are output via a common bus. Therefore, the reading timing is controlled by the read enable signals OEYA1, OEYA2, OEYB1, and OEYB2 so that no collision occurs among the above-described data. Thus, common data (Da and Dc in FIG. 12) is obtained (note that the term "common data" is used here to refer to such data output via a common bus).

From these common data Da and Dc, one horizontal-scanning-period (1 H) delayed data (Db and Dd in FIG. 12) are produced via the line memories 44a and 44b, respectively. 480-line data is obtained by selecting correct data from the above data Da, Db, Dc, and Dd. In FIG. 24, data which should be selected from data Da, Db, Dc, and Dd are denoted by surrounding them by bold solid lines. As shown, one data is selected from Da, Db, Dc, and Dd for each horizontal scanning period.

For example, A1 of Da is selected for line 1 and B1 of Da is selected for line 2. Similarly, A2 of Dc is selected for line 3 and B2 of Dc is selected for line 4. The above selection is performed via the selector 46i shown in FIG. 12 in response to the control signal cntA-Y supplied from the memory controller 68.

Figure 25A:
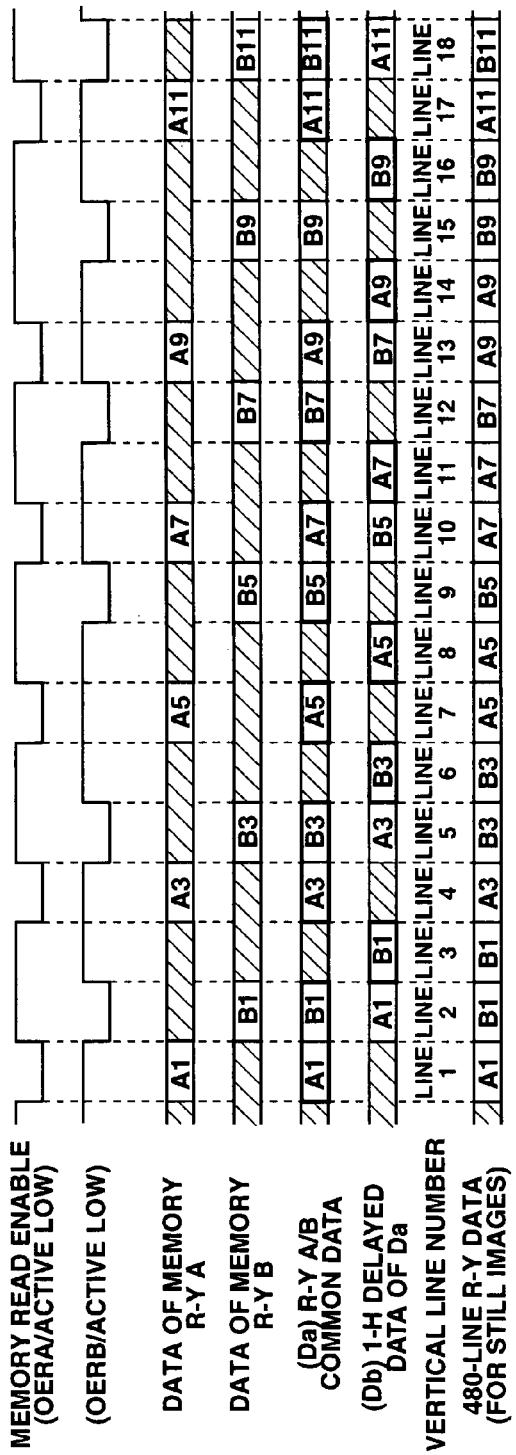
FIGS. 25A and 25B are timing charts illustrating the operation of reading color-difference signal data from the field memory and the operation of converting the data from the 600-line format to the 480-line format in the digital image recording/reproducing apparatus according to the first embodiment of the invention.
Figure 25B:
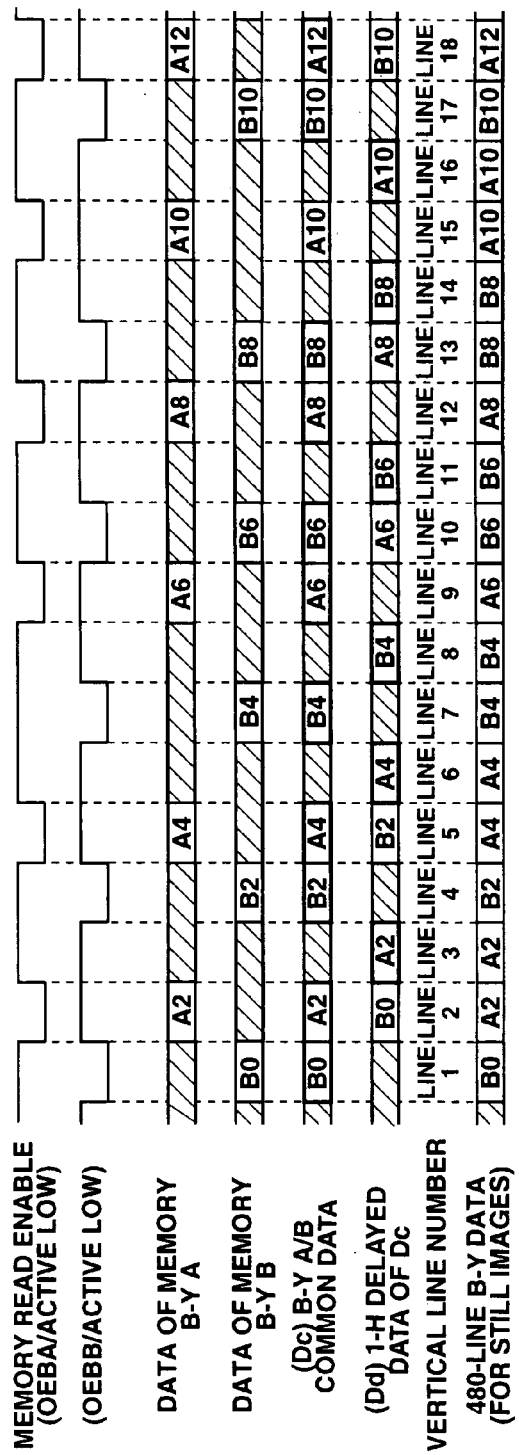

FIGS. 25A and 25B illustrate the relationship regarding the timing between the conversion operation in terms of vertical pixels and the operations of reading the color-difference signals R–Y and B–Y from the field memories 43a, 43b, 43c, and 43d, wherein FIG. 25A illustrates the timing regarding a color-difference signal R–Y and FIG. 25B illustrate the timing regarding a color-difference signal B–Y. Noninterlaced data is produced from the data of odd-numbered and even-numbered fields and converted into the 480-line format via the vertical pixel conversion circuit shown in FIG. 16. FIG. 25A illustrates data of color-difference signal R–Y, and FIG. 25B illustrates data of color-difference signal B–Y. In the FIGS. 25A and 25B, the operation timing is represented in the same units as those employed in FIG. 24. Since color-difference signals are supplied in the form of line-to-line data, one line of data is one-half that of the luminance signal. As a result, as described above with reference to FIGS. 5 and 6, a single line of data can provide a luminance signal Y and either one of color-difference signals R–Y and B–Y. The missing color-difference signal is given in a supplementary manner by employing a color-difference signal of an adjacent line including pixel data which is also included in common in the line under consideration.

Referring to FIG. 25A, the operation timing for an R–Y signal will be described below. In response to read enable signals OERA and OERB, data is read from the field memories 43a and 43b, respectively. Although the data from the field memories 43a and 43b are output via a common bus, the reading timing is controlled by the read enable signals OERA and OERB so that no collision occurs between these data. Thus common data (Da in FIG. 16) is obtained (note that the term "common data" is used here to refer to such data output via a common bus). From this common data Da, one horizontal-scanning-period (1 H) delayed data (Db in FIG. 16) is produced via the line memory 45a.

480-line data is obtained by selecting correct data from the above data Da and Db.

In FIG. 25A, data which should be selected from data Da and Db are denoted by surrounding them by bold solid lines. As shown, either Da or Db are selected for each horizontal scanning period.

For example, A1 of Da is selected for line 1 and B1 of Da is selected for line 2. Similarly, B1 of Db is selected for line 3. The above selection is performed via the selector 47a shown in FIG. 16 in response to the control signal supplied from the memory controller 68.

The color-difference signal B–Y is also processed in a similar manner in response to read enable signals OEBA and OEBB shown in FIG. 25B.

However, in the case of the color-difference B–Y, unlike the color-difference R–Y, data B0 of line 0 is used as data for line 1 as described above in connection with FIGS. 19A and 19B. This makes it possible to keep the above-described calculation rule in which the missing color-difference signal is recovered by employing a color-difference signal of another line having common pixel data.

The data conversion is performed for each unit of calculation in which 20 lines are converted into 16 lines. To preserve the above conversion rule, it is required to interpolate color-difference signals B–Y across two different groups.

The data conversion in terms of horizontal pixels is performed with the timing shown in FIG. 21 by the first horizontal pixel conversion circuits 48 and 49 in the same manner as in the case of the data conversion from the pixel configuration 11 to the pixel configuration 15 shown in FIG. 1.

After the data conversion in terms of horizontal pixels, the data will include blanks which should be removed before recording the data. The blanks can be removed by applying the write enable signals to the second frame memories 66 and 67 as shown in FIG. 21 so that only effective parts of the data are written. This ensures that data, excluding blanks is further subjected to a compression process.

Now the operation of converting the pixel configuration 11 to the pixel configuration 14 shown in FIG. 1 so as to obtain data to be recorded will be described below.

For the above purpose, it is required to convert 800 horizontal pixels to 640 horizontal pixels as described earlier with reference to FIG. 3 and it is also required to convert 600 vertical pixels to 480 vertical pixels as described above with reference to FIGS. 5 and 6.

In this data conversion process, data flow within the circuit shown in FIGS. 10 and 11 occurs in the same manner as in the previous case. Furthermore, the data conversion in terms of vertical pixels is performed in the same manner as the above-described conversion from the pixel configuration 11 to the pixel configuration 13. Thus, only the conversion process in terms of horizontal pixels will be described here with reference to FIGS. 26 and 20.

Figure 26:
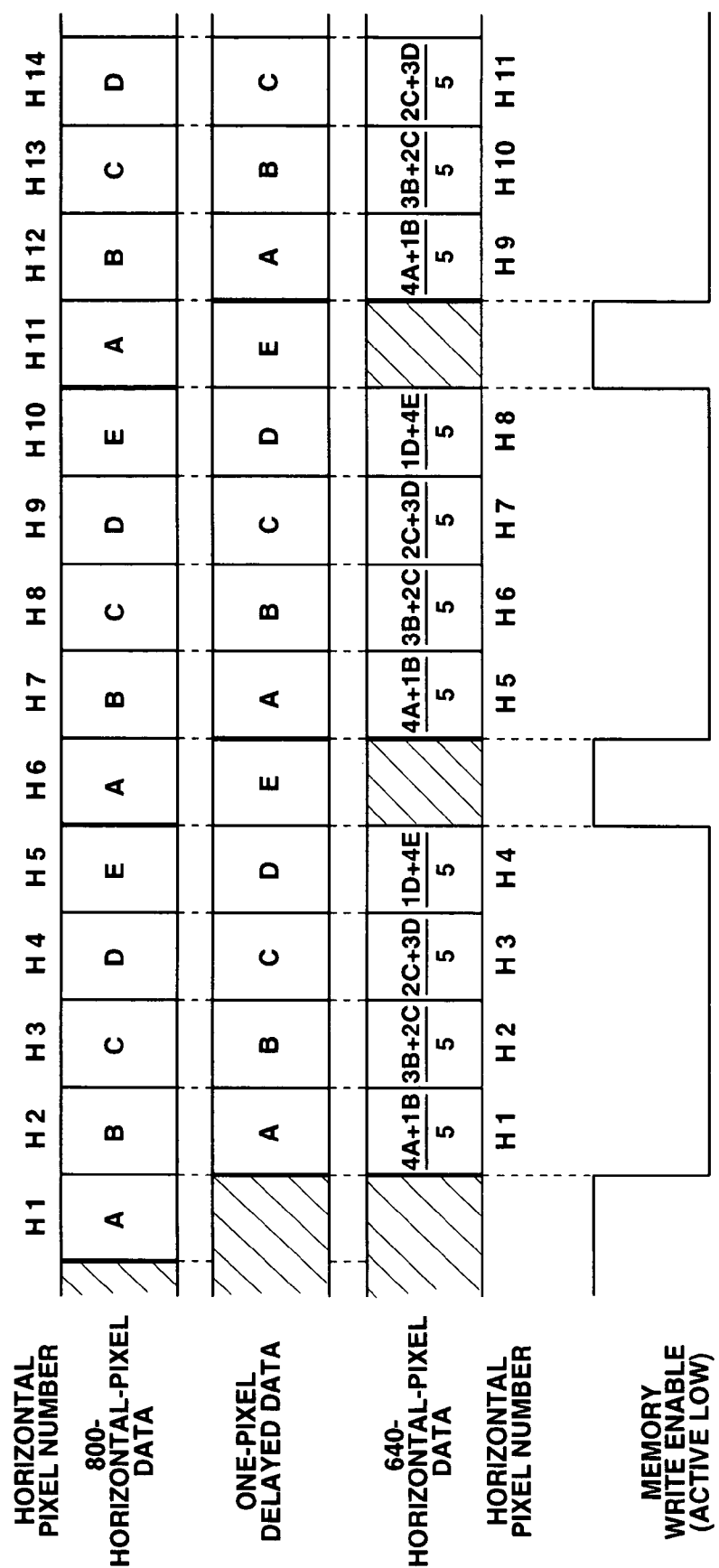
FIG. 26 is a timing chart illustrating 800-horizontal-pixel data, data delayed from the 800-horizontal-pixel data by one pixel period, and 640-horizontal-pixel data obtained by conversion process, in the digital image recording/reproducing apparatus according to the first embodiment of the invention.

FIG. 26 illustrates the relationship regarding the timing among 800-horizontal-pixel data, the data delayed from the 800-horizontal-pixel data by an amount of one pixel, and 640-horizontal-pixel data obtained by the conversion operation, wherein data are represented in units of one pixel sampling period.

As described earlier with reference to FIG. 3, the conversion from 800 horizontal pixels to 640 horizontal pixels can be accomplished by performing a calculation on two adjacent pixel data in which the conversion process from 5 pixels to 4 pixels can be regarded as a calculation unit. Therefore, only a first set of 5 lines plus some lines are shown in FIG. 26. As in FIG. 2, 5 pixels in a calculation unit are denoted by A to E from left to right.

As shown in FIG. 26, the calculation on two adjacent pixels can be performed using one-pixel delayed data and its original data.

Referring to FIG. 20, the process of this calculation will be described below.

The one-pixel delayed data is input to the multiplier 48d while the original data with no delay is input to the multiplier 48e via the selector 48c.

In the case of the conversion from 800 horizontal pixels to 640 horizontal pixels, the conversion is performed using two adjacent pixels as described above, and thus the one-pixel delay circuit 48b is not used in this case. Therefore, the CPU 72 sends a control signal cntB1 to the selector 48c so as to set the selector 48c such that the one-pixel delay circuit 48b is skipped. The multipliers 48d and 48e are used to multiply the data by factors n and m, respectively. For example, for the data of H-1, factors n=4 and m=1 are employed and thus the result at the output of the adder 48f will be 4A+1B. The resultant data is then divided by 5 (=m+n) by the divider 48g. Thus (4A+1B)/5 is obtained.

In the conversion from 800 horizontal pixels to 640 horizontal pixels, the dividing factor employed by the divider 48g is always equal to 5 (=m+n). The selector 48h operates such that the above result is always selected.

In the above conversion process, since 5 horizontal pixel data are converted to 4 horizontal pixel data, a blank occurs every 4 pixels in the converted data. These blanks are removed by applying the write enable signals to the second frame, memories 66 and 67 as shown in FIG. 26 so that only effective parts of the data are stored in the second frame memories 66 and 67. This ensures that data excluding blanks is subjected to a compression process.

The process of converting the pixel configuration 11 to the pixel configuration 12 shown in FIG. 1 so that the data is recorded in the format having the same number of pixels as the original data will be described below. In this case, color-difference signals are interpolated according to the method described above with reference to FIG. 9.

Referring to FIGS. 10 and 11, the luminance signal Y is supplied to the first frame memory 42 via the selector 39 so that two fields of data are stored therein temporarily.

The luminance signal Y is then read from the first frame memory 42, and data conversion in terms of vertical pixels is performed by the vertical pixel conversion circuit 46. After that, conversion in terms of horizontal pixels is performed using the first horizontal pixel conversion circuit 48. The resultant data is then sent to the second frame memory 66 via the selectors 50 and 52, and stored therein temporarily.

In the above process, the selector 46i in the vertical pixel conversion circuit 46 operates so that the data Da and Dc shown in FIG. 12 are selected, while the selector 48h in the first horizontal pixel conversion circuit 48 operates in such a manner as to select non-processed data so that the non-processed data is stored in the second frame memory 66.

On the other hand, the color-difference signals R−Y and B−Y are supplied to the first frame memory 43 via the selector 41 and stored therein temporarily. The color-difference signals R−Y and B−Y are then read from the first frame memory 43, and data conversion in terms of vertical pixels is performed using the line memory 45 and the vertical pixel conversion circuit 47.

After that, conversion in terms of horizontal pixels is performed on the data using the first horizontal pixel conversion circuit 49. The resultant data is then sent to the second frame memory 67 via the selectors 53 and 55, and stored therein temporarily.

In the above conversion operation of the color-difference signals in terms of horizontal pixels, as in the case of the luminance signal Y, non-processed data is stored in the second frame memory 67 by selecting such data via the selector.

The interpolation of the color-difference signals is performed by selecting correct data via selectors in such a manner that the data Da and Db shown in FIG. 16 are selected via the selector 47a and the data Dc and Dd are selected via the selector 47b such that these data are alternately switched every two horizontal scanning periods.

The luminance signal Y stored in the second frame memory 66 and the color-difference signals R−Y and B−Y stored in the second frame memory 67 are selected by the selector 69 and supplied to the compression/decompression circuit 70 so as to compress the data. The resultant data is then recorded on a recording medium 71.

Now the data flow in the operation of reproducing recorded image data and providing image data to a monitor device will be described below.

In a reproducing operation, the CPU 72 examines the content of the header area serving as an identification element of the recorded image data so as to determine the pixel configuration of the image data. The CPU 72 sets the operation mode according to the above information.

Referring to FIGS. 10 and 11, the data recorded in the compressed form on the recording medium 71 is decompressed by the compression/decompression circuit 70, and then separated via the selector 69 into a luminance signal Y and color difference signals R−Y/B−Y. Resultant image data is stored in the second frame memories 66 and 67 according to the mapping rule shown in FIGS. 23A, 23B, and 23C.

In a reading operation mode after the data has been stored in the second frame memories 66 and 67, the image data is read repeatedly from the second frame memories 66 and 67 in response to a sync signal according to the NTSC standard thereby providing a reproduction signal to the monitor device.

In the above operation, the selection of the operation mode is performed in response to the control signals cntB to cntD and cntS2 to cntS6 supplied by the CPU 72.

The process of converting the pixel configuration 13 to the pixel configuration 15 shown in FIG. 1 so that the data is displayed on the monitor in the format having the same number of pixels as that of the recorded data will be described below.

In FIGS. 10 and 11, the luminance signal Y output from the second frame memory 66 is supplied to the D/A converter 62 via the selectors 52, 51, and 58 and via the line memory 60. The data is converted into analog form by the D/A converter 62, and supplied to the monitor and the EVF 65. The color-difference signals R–Y and B–Y outputted from the second frame memory 67 are supplied to the encoder 63 via the selectors 55, 54, and 59 and via the line memory 61. The encoder 63 modulates the received color-difference signals into a chroma signal. The resultant signal is then converted into analog data by the D/A converter 64, and supplied to the monitor and EVF 65.

The line memories 60 and 61 act as a simple delay element for providing a delay of one horizontal scanning period. This ensures that no error in timing occurs among various modes.

The data conversion from the pixel configuration 14 to the pixel configuration 15 shown in FIG. 1 so that the resultant image data is displayed on the monitor will be described below.

As described earlier, since an image is to be displayed on the monitor according to the NTSC standard, it is required to convert 640 horizontal pixels to 768 horizontal pixels.

Referring to FIGS. 10 and 11, the luminance signal Y outputted by the second frame memory 66 is supplied to the second horizontal conversion circuit 56 via the selectors 52 and 51, and is subjected to conversion in terms of horizontal pixels. The data is then supplied to the D/A converter 62 via the selector 58 and the line memory 60 so as to convert it into analog data. The resultant data is supplied to the monitor and the EVF 65.

On the other hand, the color-difference signals R–Y and B–Y output from the second frame memory 67 are supplied to the second horizontal pixel conversion circuit 57 via the selectors 55 and 54 and are subjected to data conversion in terms of horizontal pixels. The data is then supplied to the encoder 63 via the selector 59 and the line memory 61, and modulated into a chroma signal, which is then converted into analog data by the D/A converter 64. The resultant data is supplied to the monitor and the EVF 65.

Figure 27:
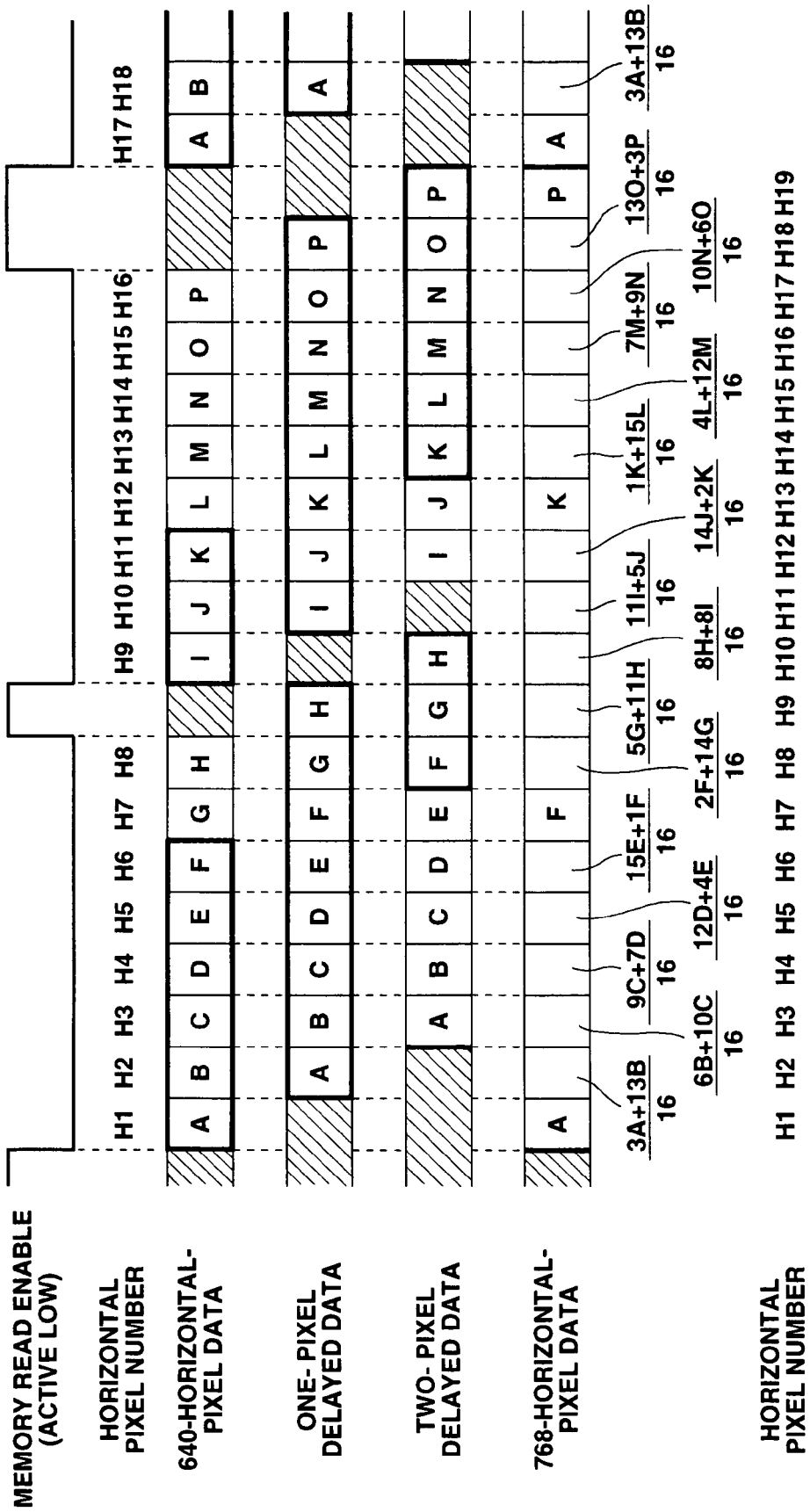
FIG. 27 is a timing chart illustrating 640-horizontal-pixel data, data delayed from the 640-horizontal-pixel data by one pixel period, data delayed from the 640-horizontal-pixel data by two pixel period, and 768-horizontal-pixel data obtained by conversion process, in the digital image recording/reproducing apparatus according to the first embodiment of the invention.
Figure 28:
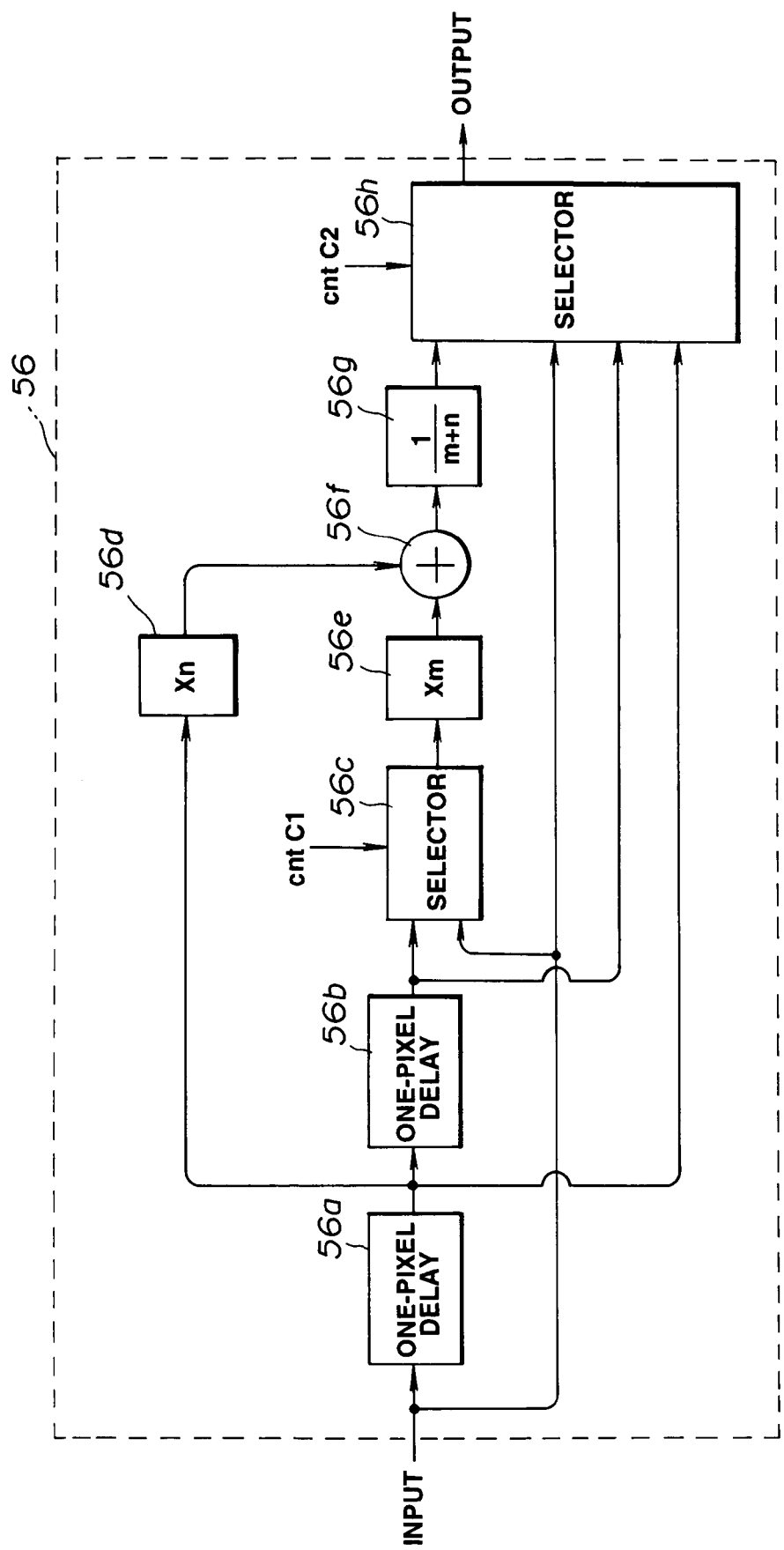
FIG. 28 is a block diagram illustrating the detailed construction of the second horizontal pixel conversion circuit in the digital image recording/reproducing apparatus according to the first embodiment of the invention.

Referring to FIGS. 27 and 28, the data conversion in terms of horizontal pixels will be described below in greater detail.

FIG. 27 illustrates the relationship regarding the timing among 640-horizontal-pixel data, data delayed from the above 640-horizontal-pixel data by an amount of one pixel, data delayed from the above 640-horizontal-pixel data by an amount of two pixels, and 768-horizontal-pixel data obtained by the conversion operation, wherein the data are represented in units of one pixel sampling period.

As described above with reference to FIG. 4, the data conversion from 640 horizontal pixels to 768 horizontal pixels is accomplished by performing calculation on two adjacent pixels or by directly selecting data without calculation depending on the data to be converted. The conversion can be accomplished by periodically performing a unit calculation of converting 16 pixels to 19 pixels. In FIG. 27, as in FIG. 4, 16 pixels to be converted are denoted by A to P from left to right.

As can be seen from FIG. 27, the calculation on two adjacent pixels can be performed using original data and the data delayed from the original data by one or two pixels. When non-processed data is employed, data is selected from the original data, the one-pixel delayed data, and the two-pixel delayed data. In FIG. 27, data which should be selected are denoted by surrounding them by bold solid lines. FIG. 28 is a block diagram illustrating in greater detail the second horizontal pixel conversion circuit 56. The other second horizontal pixel conversion circuit 57 is also constructed in a similar fashion although it is not shown.

As shown in FIG. 28, the second horizontal pixel conversion circuit 56 includes one-pixel delay circuits 56a and 56b, coefficient multipliers 56d and 56e, an adder 56f, a divider 56g, and selectors 56c and 56h, which is very similar to the construction shown in FIG. 20 including one-pixel delay circuits 48a and 48b, coefficient multipliers 48d and 48e, an adder 48f, a divider 48g, and selectors 48c and 48h except that in the case of the construction shown in FIG. 28 the selector 56h is adapted such that the original data, one-pixel delayed data, and two-pixel delayed data are input to the selector 56h. These selectors 56c and 56h operate in response to the control signals cntC1 and cntC2, respectively.

Referring to FIG. 28, the calculation process will be described below.

The one-pixel delayed data is input to the multiplier 56d while the original data with no delay or the two-pixel delayed data is input to the multiplier 56e via the selector 56c which selects data so that either the original data with no delay or the two-pixel delayed data is input to the multiplier 56e. The multipliers 56d and 56e operate such that the data are multiplied by factors n and m, respectively. For example, for line 2, factors n=3 and m=13 are employed and thus the result at the output of the adder 56f will be 3A+13B. The resultant data is then divided by 16 (=m+n) by the divider 56g. Thus (3A+13B)/16 is obtained.

In the conversion from 640 horizontal pixels to 768 horizontal pixels, the dividing factor employed by the divider 56g is always equal to 16 (=m+n). The selector 56h selects one of the following data: the above-described calculation result, the original data, one-pixel delayed data, or the two-pixel delayed data. Thus, the resultant data in the 768-horizontal-pixel format is output by the selector 56h.

Since the 768-horizontal-pixel data is obtained by calculating 19 horizontal pixels from 16 horizontal pixels of the original data, it is required that some blanks are produced in the 640-horizontal-pixel data as shown in FIG. 27. This is achieved by providing the read enable signals such as those shown in FIG. 27 to the second frame memories 66 and 67 so that necessary data is read with correct timing thereby producing a series of 768 horizontal pixel data.

In the above operation, the pixel data is produced successively, and thus the line memories 60 and 61 act as a simple delay elements for providing a delay of one horizontal scanning period. This ensures that no error in timing occurs among various modes.

The data conversion from the pixel configuration 12 to the pixel configuration 15 shown in FIG. 1 so that the image data is displayed on the monitor will be described below. For this purpose, it is required to convert 800 horizontal pixels to 768 horizontal pixels as described earlier in connection with FIG. 2, and it is also required to convert 600 vertical pixels to 480 vertical pixels as described above in connection with FIGS. 7 and 8.

In this case, unlike the conversion from the pixel configuration 13 or 14 to the pixel configuration 15, the conversion process is performed using both the horizontal pixel conversion circuit and the vertical pixel conversion circuit which is also used during a recording operation. This data conversion is performed in absolutely the same manner as the conversion from the pixel configuration 11 to the pixel configuration 15.

That is, in FIGS. 10 and 11, the luminance signal Y is read from the second frame memory 66 and supplied to the first frame memory 42 via the selectors 52 and 39 so that two fields of interlaced data are temporarily stored in the first frame memory 42. The data is then read from the first frame memory 42, and data conversion in terms of vertical pixels is performed using the line memory 44 and the vertical pixel conversion circuit 46. Furthermore, data conversion in terms of horizontal pixels is performed by the first horizontal pixel conversion circuit 48. The resultant data is supplied to the line memory 60 via the selectors 50, 51, and 58. The data which has been adjusted to suit the monitor in this way is then converted into analog data by the D/A converter 62 and finally supplied to the monitor and the EVF 65.

On the other hand, the color-difference signals R−Y and B−Y outputted from the second frame memory 67 are supplied to the first frame memory 43 via the selectors 55 and 41 such that two fields of interlaced data are temporarily stored in the first frame memory 43.

After that, the data is read from the first frame memory 43 and subjected to conversion in terms of vertical pixels via the line memory 45 and the vertical pixel conversion circuit 47.

Furthermore, the data is subjected to conversion in terms of horizontal pixels via the first horizontal conversion circuit 49, and supplied to the line memory 61 via the selectors 53, 54, and 59. The data which has been adjusted to suit the monitor in this way is then supplied to the encoder 63 which in turn modulates the data into a chroma signal. The data is further converted into analog data by the D/A converter 64. Finally, the resultant data is supplied to the monitor and the EVF 65.

In the first embodiment of the invention, as described above, an image can be recorded in a desired format in terms of the pixel configuration selected according to the application. Regardless of which pixel configuration is selected, the image can be correctly reproduced so that the image is displayed with the same angle of view. Furthermore, the apparatus has the capability of displaying a reproduced image on a monitor device according to the NTSC standard, and thus it is possible to check the recorded image immediately after the recording operation without using an expensive a TV monitor. The EVF provided on the apparatus can be designed on the basis of the NTSC standard. This leads to a reduction in cost. Furthermore, since the solid state imaging device has a great number of pixels such as 800×600 elements, the image data produced by the conversion process can still have a high resolution. In this embodiment of the invention, the interline type of solid state imaging device which is widely used can be employed. This also allows a reduction in cost. Since the conversion in terms of vertical pixels is performed taking into account the nature of the output signal of the solid state imaging device, it is possible to achieve an improved resolution in particular along the vertical direction.

FIGS. 29 to 32 illustrate a second embodiment of the invention. This second embodiment includes some parts and techniques which are similar to those employed in the first embodiment. These will not be described here again, and those different from the first embodiment will be given in the following description.

In this second embodiment, an image is recorded and reproduced in the formats in terms of the pixel configuration shown in FIG. 29.

In FIG. 29, the image data output by a solid state imaging device is converted to a digital form having a pixel configuration 17 with 768 horizontal pixels×480 vertical pixels according to the VIDEO-1 standard. The other pixel configurations 13, 14, 15 are the same as those described above with reference to FIG. 1.

In this second embodiment, as in the first embodiment described above, a desired pixel configuration can be selected from a plurality of pixel configurations with a constant angle of view.

Each pixel configuration 17, 13, 14, and 15 described above is concerned with a full image area. When image data is recorded, the data having the pixel configuration 17 is converted to data on the basis of either pixel configuration 13 or 14.

When the recorded image is reproduced, the data having the pixel configuration 13 or 14 is first converted to the data format 15, and then displayed on a TV monitor. When an image taken via a solid state imaging device is displayed on a TV monitor or an EVF, the image data can be displayed directly on the monitor without data conversion since the pixel configuration 17 is equivalent to the pixel configuration 15.

FIG. 30 illustrates the conversion from 768 horizontal pixels to 640 horizontal pixels. This conversion is employed when the pixel configuration 17 is converted to the pixel configuration 14. In FIG. 30, data is shown in an enlarged fashion starting with a pixel data located at the leftmost point in a horizontal direction. The pixel position relative to the starting point is denoted by the horizontal pixel number.

As can be seen from FIG. 30, the sampling period for 8 pixels of 768-horizontal-pixel data is nearly equal to the sampling period for 7 pixels of 640-horizontal-pixel data. Thus, 768 horizontal pixels can be divided into groups each consisting of 8 pixels, and 8 pixels of each group can be converted to 7 pixels in a similar manner so as to finally obtain data composed of 640 horizontal pixels which are sampled during the same sampling period as that of the original 768 horizontal pixels.

In FIG. 30, if 8 pixel data in one group are denoted by A to H respectively from left to right, 7 pixels for the 640-horizontal-pixel data can be calculated from the above 8 pixel data A to H in the manner shown in the FIG. 30.

For example, the value of a pixel H-1 of the 640-horizontal-pixel data can be calculated from the pixel value A and B of the 768-horizontal-pixel data taking into account the relative sampling periods of A and B. Since the ratio of the sampling periods is A:B=7:1, the value of pixel H-1 of the 640-horizontal-pixel data is given as (7A+1B)/8. Similarly, the value of pixel H-2 includes the pixel values B and C with a ratio of 6:2, and the value of pixel H-3 includes the pixel values C and D with a ratio of 5:3, and so on. The value of pixel H-8 and the value of pixels following that can also be calculated in a similar manner to pixels H-1 to H-7 by periodically applying the above-described calculation algorithm to each group consisting of 7 pixels.

If 768 horizontal pixels are divided into groups each consisting of 8 pixels, 96 groups are obtained wherein the counting of the total number of pixels over the entire 96 groups results in 768. On the other hand, if 640 pixels are divided into groups each consisting of 7 pixels, then 96 groups are obtained wherein the total number of pixels counted over the entire 96 groups results in 672 which is greater than 640 by 32. These excessive pixels are necessary to prevent the generation of black data which would cause a problem in displaying an image on a monitor device of a personal computer system since the personal computer system assumes that there be no blanking. In the NTSC standard, on the other hand, 12 pixels prior to and subsequent to the 768 horizontal pixels are assigned as blanking periods. If this fact is taken into account, the number of pixels which will be lost in practical displaying operation is about 20. The above error in the number of pixels is within an acceptable small range.

As can be seen from the above discussion, the data conversion technique according to the present embodiment of the invention in which 8 pixels are taken as a unit of conversion operation provides a great advantage while a small error occurs. That is, in this calculation technique, since a total of 768 pixel data are divided into groups each consisting of 8 pixel data, and conversion is performed so that 7 pixel data in each group of the converted 640-horizontal-pixel data are obtained, division operations required in the conversion process can be performed very easily. More particularly, since 8 is equal to $2^3$, the division operations can be performed by simply removing some bits. Thus, this technique has really a great advantage with a very slight disadvantage of the error.

Figure 31:
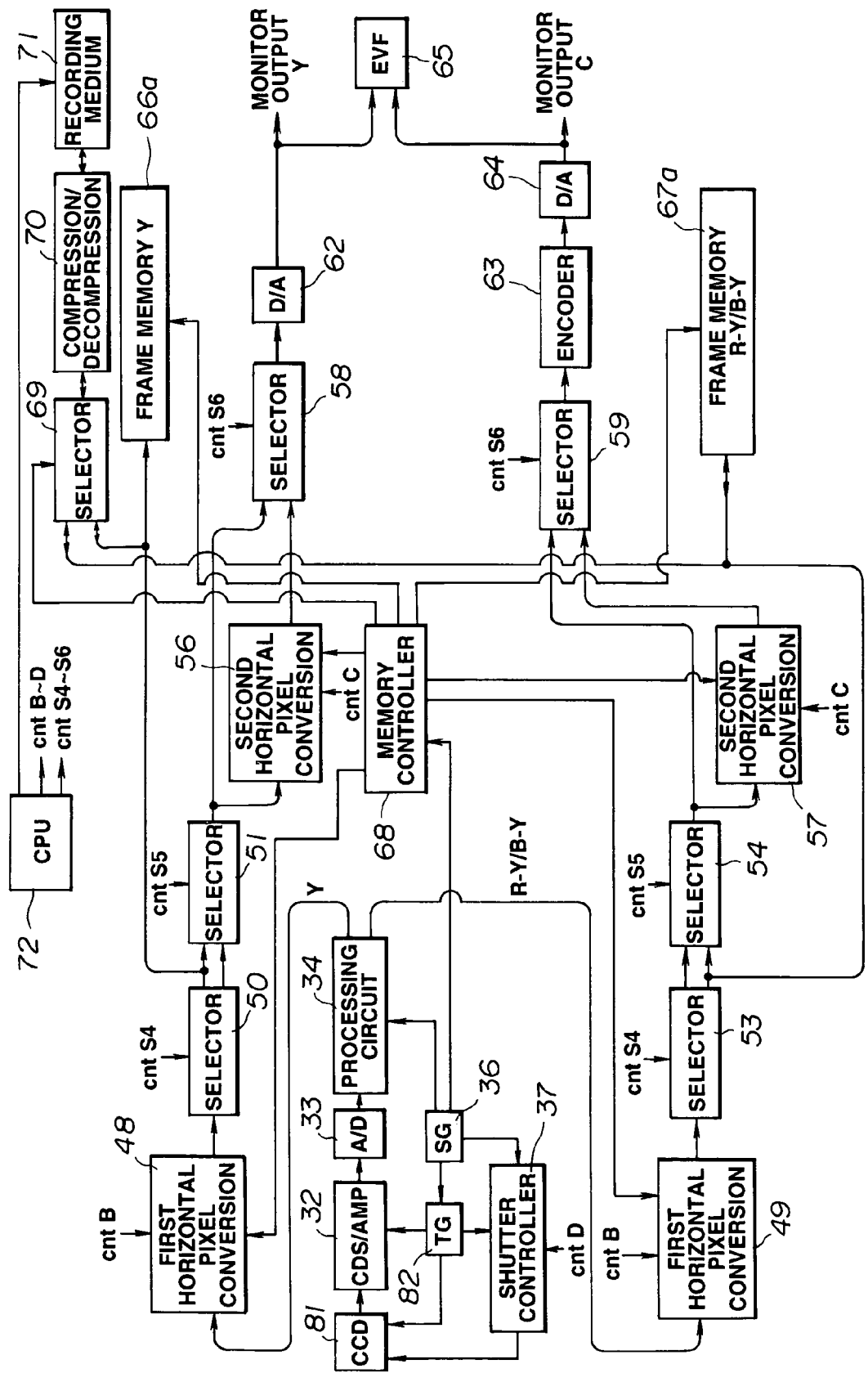
FIG. 31 is a block diagram illustrating the construction of the digital image recording/reproducing apparatus according to the second embodiment of the invention.

FIG. 31 is a block diagram illustrating a circuit of a digital image recording/reproducing apparatus in which data conversion in terms of the pixel-configuration is performed according to the techniques described above with reference to FIGS. 29 and 30.

The digital image recording/reproducing apparatus shown in FIG. 31 is basically the same as that shown in FIGS. 10 and 11 with a slight difference that the solid state imaging device (CCD) 81 is of the interline type having 768 horizontal pixels×480 vertical pixels and having complementary color filters and that the timing generator (TG) 82 is adapted to drive the solid state imaging device.

The data flow in operation from acquisition of image data via the CCD 81 to outputting of moving image data to be displayed on the monitor or recorded on a recording medium will be described.

The CCD 81 outputs a signal representing an image wherein each frame of an image is composed of 768 horizontal pixels×640 lines counted in the vertical direction. The signal is read from the CCD 81 in response to the timing pulse which is generated by the TG 82 on the basis of the sync signal supplied by the SG 36. The exposure time of the CCD 81 is controlled by the shutter controller 37. The signal output from the CCD 81 is applied to the CDS 32, which removes noise from the signal. The resultant signal is then applied to the A/D converter 33 and converted into digital form. The A/D converter 33 operates at a sampling frequency equal to the frequency of the horizontal driving signal generated by the TG 82 so that one sampled digital data is obtained for each horizontal pixel of the CCD 81.

The data output from the A/D converter is applied to the processing circuit 34 and subjected to processes including color separation, gamma correction, and edge enhancement. The resultant signals including a luminance signal Y and color-difference signals R−Y and B−Y are separately outputted as shown in FIG. 31.

These output signals from the processing circuit 34 are further processed so as to obtain image data to be recorded or moving image data to be displayed on a monitor device on the basis of the operation mode. The selection of the operation mode is performed in response to the control signals cntB to cntD and cntS4 to cntS6 supplied by the CPU 72.

In a recording mode, the CPU 72 writes data serving as an identification element into the header area of that image data to be recorded thereby indicating the pixel configuration of that data.

The conversion from the pixel configuration 17 to the same pixel configuration 15 shown in FIG. 29 to obtain image data to be displayed on the monitor and the EVF 65 will be described first.

Referring to FIG. 31, the luminance signal Y output of the processing circuit 34 is supplied to the first horizontal pixel conversion circuit 48 and further to the D/A converter 62 via the selectors 50, 51, and 58. After being converted into analog form by the D/A converter 62, the image data is supplied to the monitor and the EVF 65.

On the other hand, the color-difference signals R−Y and B−Y outputted from the processing circuit 34 are supplied to the first horizontal conversion circuit 49 and further to the encoder 63 via the selectors 53, 54, and 59. After being converted into a chroma signal by the encoder 63, the resultant signal is supplied to the D/A converter 64 and converted into analog data which is finally supplied to the monitor and the EVF 65.

In the above operation, it is possible to obtain data without being processed via the first horizontal pixel conversion circuits 48 and 49 by selecting non-processed data via the selector 48h shown in FIG. 20.

The process of converting the pixel configuration 17 to the pixel configuration 13 having the same number of pixels as the pixel configuration 17 shown in FIG. 29 so as to obtain data to be recorded on a recording medium will be described below.

In FIG. 31, the luminance signal Y output from the processing circuit 34 is supplied to the first frame memory, 66a after passing through the first horizontal pixel conversion circuit 48 and further through the selector 50, and stored in the first frame memory 66a.

On the other hand, the color-difference signals R−Y and B−Y output from the processing circuit 34 are supplied to the frame memory 67a after passing through the first horizontal pixel conversion circuit 49 and further through the selector 53, and are stored in the frame memory 67a.

In the above operation, it is possible to obtain data without being processed via the first horizontal pixel conversion circuits 48 and 49 by selecting non-processed data via the selector 48h shown in FIG. 20.

The luminance signal Y stored in the frame memory 66a and the color-difference signals R−Y and B−Y stored in the frame memory 67a are selected by the selector 69 and supplied to the compression/decompression circuit 70 so as to compress the data. The resultant data is then recorded on a recording medium 71.

The process of converting the pixel configuration 17 to the pixel configuration 14 shown in FIG. 29 so as to obtain data to be recorded on a recording medium will be described below.

For the above purpose, it is required to convert 768 horizontal pixels to 640 horizontal pixels as described earlier with reference to FIG. 30.

Referring to FIG. 31, the luminance output signal Y from the processing circuit 34 is supplied to the first horizontal pixel conversion circuit 48. After being subjected to data conversion in terms of horizontal pixels, the data is supplied to the frame memory 66a via the selector 50 and stored therein.

On the other hand, the color-difference signals R−Y and B−Y output from the processing circuit 34 are supplied to the first horizontal pixel conversion circuit 49 and subjected to a conversion process in terms of horizontal pixels. The resultant data is then supplied to the frame memory 67*a* via the selector 53 and stored therein. The luminance signal Y stored in the frame memory 66*a* and the color-difference signals R−Y and B−Y stored in the frame memory 67*a* are selected by the selector 69 and supplied to the compression/decompression circuit 70 so as to compress the data. The resultant data is then recorded on a recording medium 71.

Figure 32:
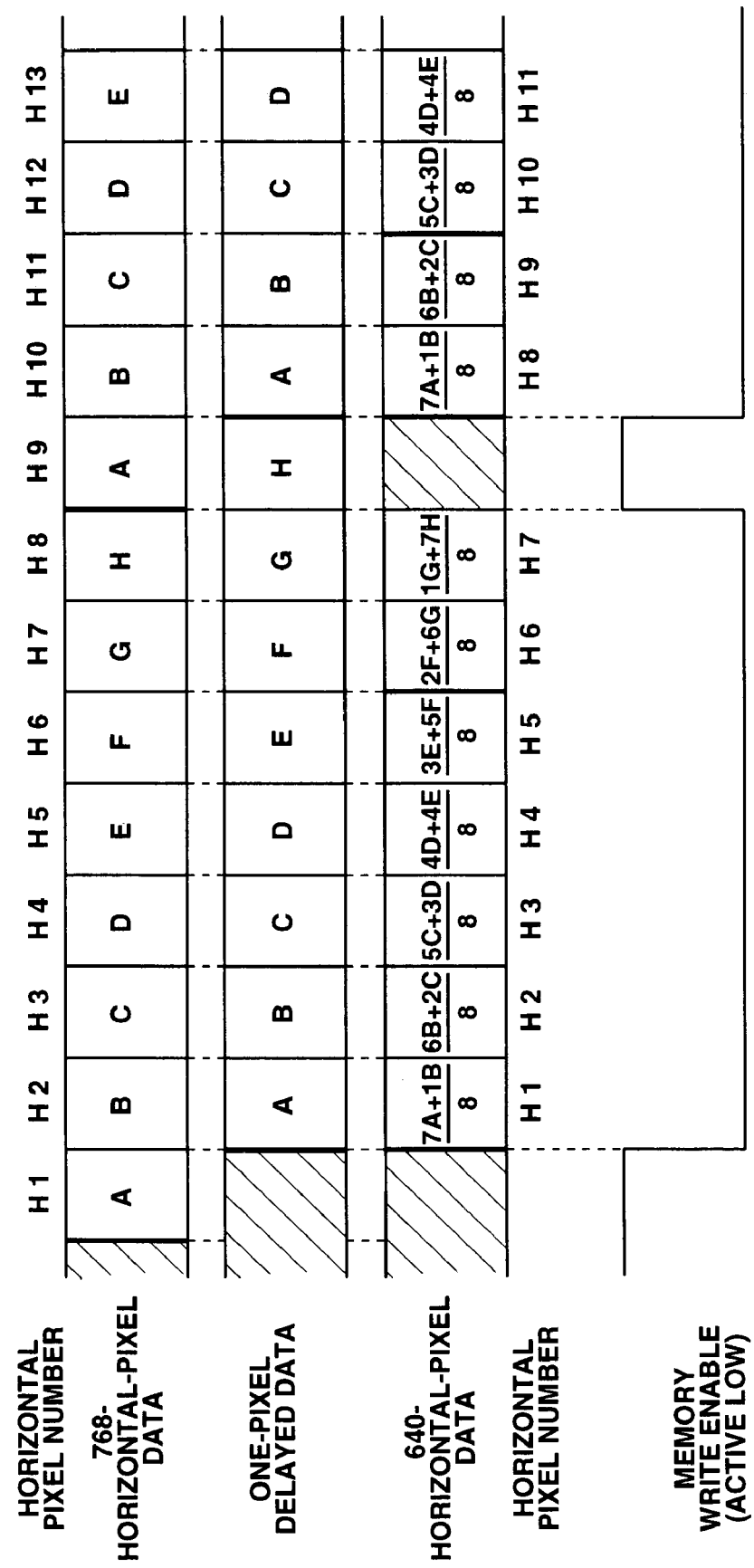
FIG. 32 is a timing chart illustrating 768-horizontal-pixel data, data delayed from the 768-horizontal-pixel data by one pixel period, and 640-horizontal-pixel data obtained by conversion process, in the digital image recording/reproducing apparatus according to the second embodiment of the invention.
Figure 33A:
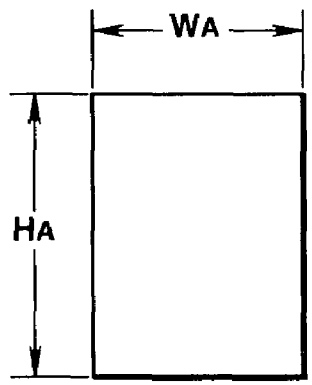
FIGS. 33A and 33B are schematic diagrams illustrating an example of an aspect ratio of a pixel of a conventional solid state imaging device.
Figure 33B:
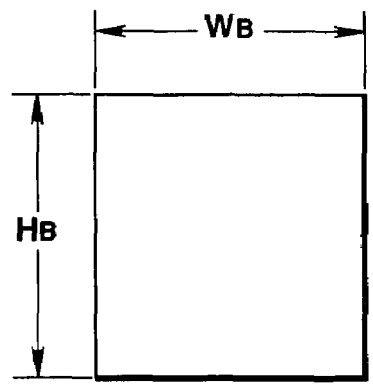
Figure 34:
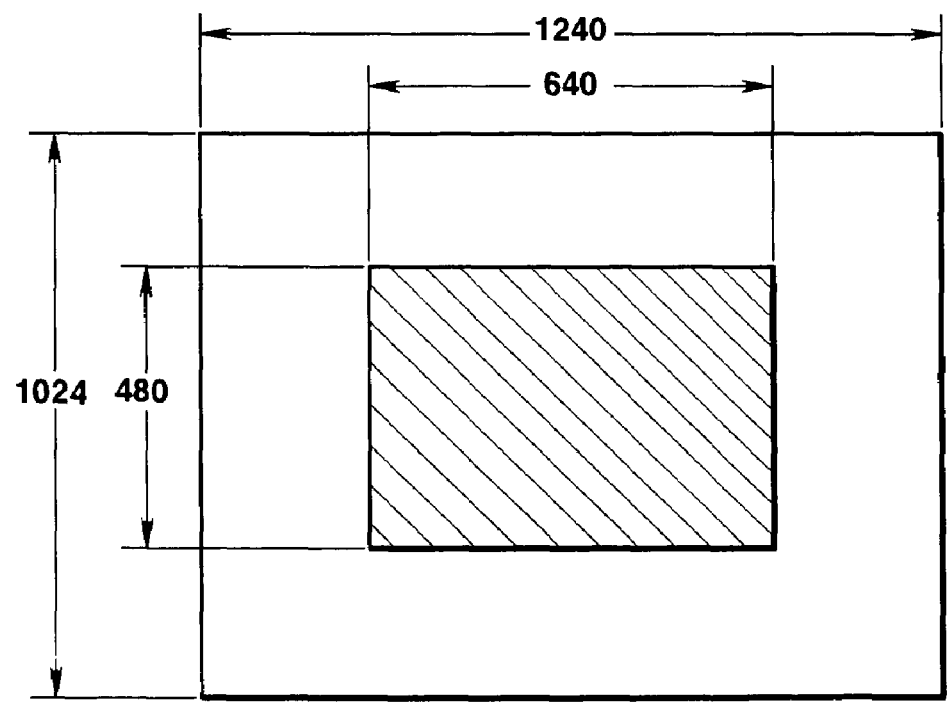
FIG. 34 is a schematic diagram illustrating the pixel configuration of a conventional solid state imaging device and also a display area on the screen of a monitor device according to the NTSC standard.
Figure 35:
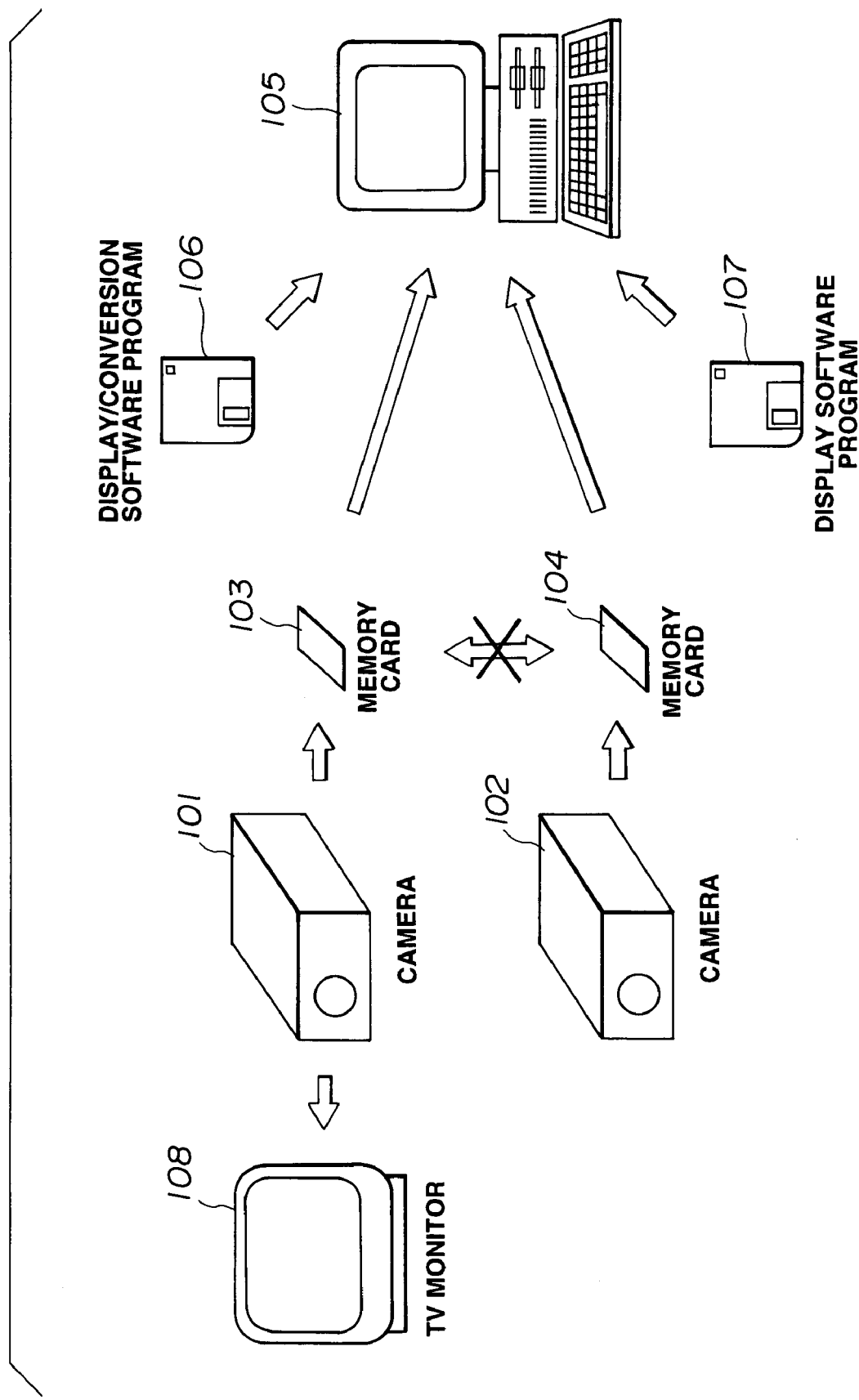
FIG. 35 is a schematic diagram illustrating digital still cameras, a TV monitor, and a personal computer, according to a conventional technique.

Referring to FIGS. 32 and 20, the conversion process in terms of horizontal pixels will be described below.

FIG. 32 illustrates the relationship regarding the timing among 768 horizontal pixel data, data delayed from the 768 horizontal pixel data by an amount of one pixel, and 640 horizontal pixel data obtained by the conversion operation, wherein the data are represented in units of one pixel sampling period.

As described earlier with reference to FIG. 30, the conversion from 768 horizontal pixels to 640 horizontal pixels can be accomplished by performing a calculation on two adjacent pixel data in which the conversion process from 8 pixels to 7 pixels can be regarded as a calculation unit. As shown in FIG. 32, as in FIG. 30, 8 pixels in a calculation unit are denoted by A to H from left to right.

As shown in FIG. 32, the calculation on two adjacent pixels can be performed using one-pixel delayed data and its original data.

Referring to FIG. 20, the process of this calculation will be described below.

The one-pixel delayed data is input to the multiplier 48*d* while the original data with no delay is input to the multiplier 48*e* via the selector 48*c*.

In the case of the conversion from 768 horizontal pixels to 640 horizontal pixels, the conversion is performed using two adjacent pixels as described above, and thus the one-pixel delay circuit 48*b* is not used in this case. Therefore, the CPU 72 sends a control signal cntB1 to the selector 48*c* so as to set the selector 48*c* such that the one-pixel delay circuit 48*b* is skipped. The multipliers 48*d* and 48*e* operate so that the data are multiplied by factors n and m, respectively. For example, for the data of H-1, factors n=7 and m=1 are employed and thus the result at the output of the adder 48*f* will be 7A+1B. The resultant data is then divided by 8 (=m+n) by the divider 48*g*. Thus (7A+1B)/8 is obtained.

In the conversion from 768 horizontal pixels to 640 horizontal pixels, the dividing factor employed by the divider 48*g* is always equal to 8 (=m+n). The selector 48*h* operates such that the above result is always selected.

In the above conversion process, since 8 is horizontal pixel data are converted to 7 horizontal pixel data, a blank occurs every 7 pixels in the converted data. These blanks are removed by applying the write enable signal to the frame memories 66*a* and 67*a* as shown in FIG. 32 so that only effective parts of the data are stored in the frame memories 66*a* and 67*a*. This ensures that data including no blanks is subjected to compression in the following process step.

Now the data flow in the operation of reproducing recorded image data and providing image data to a monitor device will be described.

In the reproducing operation, the CPU 72 examines the content of the header area serving as an identification element of the recorded image data so as to determine the pixel configuration of the image data. The CPU 72 sets the operation mode according to the above information.

In the above operation, the selection of the operation mode is performed in response to the control signals cntB to cntD and cntS2 to cntS6 supplied by the CPU 72.

Referring to FIG. 31, the data recorded in the compressed form on the recording medium 71 is decompressed by the compression/decompression circuit 70, and then separated via the selector 69 into a luminance signal Y and color difference signals R−Y/B−Y. Resultant image data is stored in the frame memories 66*a* and 67*a* according to the mapping rule shown in FIGS. 23A, 23B, and 23C.

In a reading operation mode after the data has been stored in the frame memories 66*a* and 67*a*, the image data is read repeatedly from the frame memories 66*a* and 67*a*, in response to a sync signal according to the NTSC standard thereby providing a reproduction signal to the monitor device.

The process of converting the pixel configuration 13 to the pixel configuration 15 shown in FIG. 29 so that the data is displayed on the monitor in the format having the same number of pixels as that of the recorded data will be described below.

In FIG. 31, the luminance signal Y output from the frame memory 66*a* is supplied to the D/A converter 62 via selectors 51 and 58. The data is converted into analog form by the D/A converter 62, and then supplied to the monitor and the EVF 65. On the other hand, the color-difference signals R−Y and B−Y output from the frame memory 67 are supplied to the encoder 63 via the selectors 54 and 59. The encoder 63 modulates the received color-difference signals into a chroma signal. The resultant signal is then converted into analog data by the D/A converter 64, and supplied to the monitor and EVF 65.

The data conversion from the pixel configuration 14 to the pixel configuration 15 shown in FIG. 29 so as to obtain image data to be displayed on the monitor will be described below.

As described above, since an image is to be displayed on the monitor according to the NTSC standard, it is required to convert 640 horizontal pixels to 768 horizontal pixels.

Referring to FIG. 31, the luminance signal Y output by the frame memory 66*a* is supplied to the second horizontal conversion circuit 56 via the selector 51, and is subjected to conversion in terms of horizontal pixels. The data is then supplied to the D/A converter 62 via the selector 58 and converted into analog data. The resultant data is supplied to the monitor and the EVF 65.

On the other hand, the color-difference signals R−Y and B−Y output from the frame memory 67*a* are supplied to the second horizontal pixel conversion circuit 57 via the selector 54 and subjected to data conversion in terms of horizontal pixels. The data is then supplied to the encoder 63 via the selector 59, and modulated into a chroma signal, which is then converted into analog data by the D/A converter 64. The resultant data is supplied to the monitor and the EVF 65. The conversion process from 640 horizontal pixels to 768 horizontal pixels is performed by the second horizontal pixel conversion circuits 56 and 57 in the same manner as in the first embodiment, and thus is not described here in further detail. In the second embodiment, as described above, an image can be recorded in a desired format in terms of the pixel configuration selected according to the application. Regardless of which pixel configuration is selected, the image can be correctly reproduced so that the image is displayed with the same angle of view.

The conversion of the number of pixels is performed only along the horizontal direction. This allows the circuit to be simplified and thus it is possible to reduce the apparatus cost.

In the first and second embodiments described above, the pixel configuration having 800 horizontal pixels×600 vertical pixels provides the highest resolution of all. However, it is apparent that a solid state imaging device may have a greater number of pixels. In this case, it is required to process the data at a higher clock frequency corresponding to the pixel configuration. Furthermore, in the specific embodiment described above, data processing is performed at the same clock frequency over the entire apparatus. However, since the data obtained via the solid state imaging device is temporarily stored in the frame memory after being passed through the processing circuit, the data output by the solid state imaging device may be processed at a clock frequency different from that used in the operation of data conversion and in the operations that follow.

In this invention, it is apparent that working modes different in a wide range can be formed on the basis of the present invention without departing from the spirit and scope of the invention. This invention is not restricted by any specific embodiment except as may be limited by the appended claims.

What is claimed is:

1. A digital image recording apparatus comprising:
   a solid state imaging device;
   a selecting element for selecting one of a predetermined image data in a format corresponding to a first pixel configuration of said solid state imaging device and another image data in a format corresponding to a pixel configuration different from said first pixel configuration;
   an electronic calculation element responsive to said selecting element for obtaining said another image data by performing inter-pixel calculation on pixels of said one predetermined image data to obtain the different pixel configuration, thereby eliminating need for a shifting mechanism to move the imaging device relative to a given optical path;
   and a recording element for recording image data selected via said selecting element.

2. A digital image recording apparatus according to claim 1, wherein said calculation element performs said inter-pixel calculation in such a manner that n pixels are taken as a unit of said inter-pixels calculation wherein calculation coefficients are varied in said inter-pixel calculation for said n pixels within unit (where n is a positive integer).

3. A digital image recording apparatus according to claim 2, wherein n is equal to $2^m$ wherein m is a positive integer.

4. A digital image recording apparatus according to claim 1, wherein:
   said solid state imaging device is of an interline type which outputs data equal to a sum of values of different pixels; and
   said electronic calculation element obtains said another image data by means for selecting an optimum value from said sum of values thereby performing conversion in terms of a number of vertical pixels.

5. A digital image recording apparatus according to claim 1, wherein in an operation mode in which said recording element records said one predetermined image data, said calculation element performs inter-pixel calculation on said another image data along its vertical direction and said calculation element also interpolates color-difference signals to obtain noninterlaced data.

6. A digital image recording apparatus according to claim 1, further comprising a monitor element for checking a framing condition of image data to be recorded on said recording element, wherein in an operation mode in which image data to be displayed on said monitor element has a format in terms of a pixel configuration which is the same as that of said other image data, and said calculation element includes means which performs calculation in one of a plurality of different manners in selection of pixel data along a vertical direction depending on whether image data is recorded via said recording element or image data is monitored by said monitor element.

7. A digital image reproducing apparatus comprising:
   a recording element for recording image data;
   an identification element for identifying a pixel configuration of the image data recorded on said recording element;
   an electronic conversion element for converting image data to be reproduced into image data having a particular pixel configuration according to an identification result given by said identification element; and
   said electronic conversion element producing image data having said particular pixel configuration by performing an inter-pixel calculation on pixels of the recorded image data.

8. A digital image reproducing apparatus according to claim 7, wherein said image data comprise a plurality of horizontal and vertical pixels and said electronic conversion element converts only horizontal pixels.

9. A digital image reproducing apparatus according to claim 7, wherein said conversion element converts both horizontal pixels and vertical pixels.

10. The apparatus of claim 9 wherein said calculation element enables use of an inexpensive imaging device typically employed in a conventional video camera.

11. A digital image reproducing apparatus according to claim 7, wherein said conversion element converts one of only horizontal pixels and both horizontal pixels and vertical pixels.

12. A digital image reproducing apparatus according to claim 7, wherein the image data having said particular pixel configuration produced by said conversion element has a same angle of view as original image data recorded on said recording element.

13. A digital image reproducing apparatus according to claim 7, wherein the image data having said particular pixel configuration produced by said conversion element is subjected to digital processing in response to a clock signal which is the same as a clock signal for processing image data recorded on said recording element.

14. A digital image recording/reproducing apparatus comprising:
   a solid state imaging device;
   a selecting element for selecting one of a predetermined image data in a format corresponding to a pixel configuration of said solid state imaging device and another image data in a format corresponding to a pixel configuration different from said pixel configuration of said solid state imaging device to accomadate a display format;
   a recording element for recording image data selected via said selecting element;
   an electronic calculation element responsive to said selecting element for producing said another image data by performing inter-pixel calculation on pixels of said predetermined image data thereby eliminating a need for a shifting mechanism to move the imaging device relative to a given optical path;
   an identification element for identifying a pixel configuration of the image data recorded on said recording element; and
   a conversion element for converting image data to be reproduced into image data having a particular pixel configuration according to an identification result given by said identification element, wherein said calculation element and said conversion element are constructed with commonly-used constant multipliers, summing circuits and delay circuits.

15. Digital image recording apparatus according to claim 14 further comprising second frame memory mean and means for coupling said recording means to said second frame memory means and for coupling said second frame memory means to said vertical and horizontal pixel conversion means for conversion of the pixel format stored in said recording means to a pixel format different from that stored in said recording means and for recording the converted pixel format to said recording medium responsive to a selection request.

16. Digital image recording apparatus, comprising:

an image sensing element having a predetermined pixel arrangement comprised of m rows and n columns where m and n are real integers greater than one;

means for converting image information at each pixel into digital form;

a first frame memory for storing one frame of an image, said frame being comprised of digitized pixels;

electronic horizontal pixel conversion means for converting pixels in each row sequentially row by row to a number of pixels different from a number of pixels in said image sensing element;

electronic vertical pixel conversion means for converting pixels in each column to a number of pixels different from a number of pixels in each column of the image sensing element;

a recording medium;

selector means for selecting a predetermined pixel arrangement different from the pixel arrangement of said image sensing element;

means for selectively coupling said vertical and horizontal pixel conversion means to said first frame memory for selectively converting the pixel arrangement in said first frame memory to another pixel arrangement responsive to the selection means;

means for selectively coupling the vertical and horizontal pixel conversion means to said recording means for recording said different arrangement; and wherein said vertical pixel conversion means includes means for electronically performing an inter-pixel calculation.

17. Digital image recording apparatus, comprising:

an image sensing element having a predetermined pixel arrangement comprised of m rows and n columns where m and n are real integers greater than one;

means for converting image information at each pixel into digital form;

a first frame memory for storing one frame of an image, said frame being comprised of digitized pixels;

electronic horizontal pixel conversion means for converting pixels in each row sequentially row by row to a number of pixels different from a number of pixels in said image sensing element;

electronic vertical pixel conversion means for converting pixels in each column to a number of pixels different from a number of pixels in each column of the image sensing element;

a recording medium;

selector means for selecting a predetermined pixel arrangement different from the pixel arrangement of said image sensing element;

means for selectively coupling said vertical and horizontal pixel conversion means to said first frame memory for selectively converting the pixel arrangement in said first frame memory to another pixel arrangement responsive to the selection means;

means for selectively coupling the vertical and horizontal pixel conversion means to said recording means for recording said different arrangement; and wherein said horizontal pixel conversion means includes means for electronically performing an inter-pixel calculation.

18. Digital image recording apparatus according to claim 17 wherein said means for performing inter-pixel calculation includes means for summing different pixels.

19. Digital image recording apparatus according to claim 17 wherein said means for performing inter-pixel calculation includes means for multiplying pixels by a constant value and means for summing different pixels.

20. Digital image recording means according to claim 17 further comprising electronic means for delaying a pixel prior to an inter-pixel calculation.

21. A digital image recording apparatus, comprising:

a solid state imaging device;

a selecting element for selecting one of a predetermined first image data in a format corresponding to a first pixel configuration of the solid state imaging device and a second image data in a format corresponding to a second pixel configuration different from the pixel configuration;

a determining element for determining a first number of pixels by which to divide the first pixel configuration and a second number of pixels by which to divide the second pixel configuration based on a ratio between a sampling period for one pixel in the first image data and a sampling period for one pixel in the second image data;

a grouping element for respectively dividing each of the first image data and the second image data into groups based on the first and second numbers of pixels determined by the determining element;

an electronic calculation element responsive to the selecting element to perform an electronic pixel shift and an inter-pixel calculation on pixels of the imaging device to obtain the different pixel configuration, thereby eliminating need for a shifting mechanism to move the imaging device relative to a given optical path; and a recording element for recording image data selected via the selecting element;

wherein the electronic calculation element calculates the second image data having the second pixel configuration by replacing a pixel in each group of the second image data having the second pixel configuration with a pixel having a sampling period substantially the same as a sampling period of a corresponding pixel of the first image data, and by replacing each of the remaining pixels in each group of the second image data with a pixel obtained by processing of two adjacent pixels in the first image data having the first pixel configuration based on a ratio between the first and second numbers of pixels.

22. A digital image recording apparatus according to claim 21, wherein the second image data obtained by the electronic calculation element has a pixel configuration with a resolution higher than a resolution of the first image data.

23. A digital image recording apparatus according to claim 22, wherein conversion from first image data having the first pixel configuration to the second image data having the second pixel configuration comprises conversion of only pixels arranged in a horizontal direction.

24. A digital image recording apparatus according to claim 21, wherein identification data is stored in the recording element to identify the pixel configuration of the second image data when the second image data is stored in the recorded element.

25. A digital image reproducing apparatus for converting a first image data having a first pixel configuration to a second image data having a second pixel configuration different from the first image data for displaying the converted image data on a monitor, the digital image reproducing apparatus comprising:
- a recording element for recording image data;
- a determining element for determining a first number of pixels by which to divide the first pixel configuration and a second number of pixels by which to divide the second pixel configuration based on a ratio between a sampling period for one pixel in the first image data and a sampling period for one pixel in the second image data;
- a grouping element for dividing each of the first image data and the second image data based on the first and second numbers of pixels determined by the determining element; and
- an electronic conversion element for converting the first image data to the second image data by inter-pixel calculation
- wherein the electronic conversion element produces the second image data having the second pixel configuration by replacing a pixel in each group of the second image dat having the second pixel configuration, with a pixel having a sampling period substantially the same as a sampling period of one corresponding pixel in the first image data having the first pixel configuration based on a ratio between the first and second numbers of pixels.

26. A digital image reproducing apparatus according to claim 25, wherein the second image data obtained by the electronic conversion element has a pixel configuration with a resolution higher than a resolution of the first image data.

27. A digital image reproducing apparatus according to claim 26, wherein conversion from the first image data having the first pixel configuration to the second image data having the second pixel configuration comprises conversion of only pixels arranged in a in horizontal direction.

28. A digital image reproducing apparatus according to claim 25, wherein identification data is stored in the recording element to identify the pixel configuration of the second image data when the second image data is stored in the recording element.

29. A digital image recording apparatus, comprising:
- a solid state imaging device;
- a selecting element for selecting one of a predetermined image data in a format corresponding to a first pixel configuration of the solid state imaging device and another image data in a format corresponding to a pixel configuration different from the first pixel configuration
- an electronic calculation element responsive to the selecting element to perform inter-pixel calculation on pixels of the imaging device to obtain the different pixel configuration, thereby eliminating need for a shifting device to move the imaging device relative to a given optical path;
- a recording element for producing a pseudo moving image data based on the said another image data, the pseudo moving image data conforming to a TV standard system that is adaptable to an electronic viewfinder applied as a monitor element, regardless of the first pixel configuration of the solid state imaging device.

* * * * *

UNITED STATES PATENT AND TRADEMARK OFFICE
CERTIFICATE OF CORRECTION

PATENT NO. : 7,295,765 B1
APPLICATION NO. : 08/645487
DATED : November 13, 2007
INVENTOR(S) : Takayuki Kijima It is certified that error appears in the above-identified patent and that said Letters Patent is hereby corrected as shown below:

Claim 21, column 38, line 28, after the words "from the", insert --first--.

Claim 25, column 39, line 32, after the word "image", delete "dat", and insert therefor --data--.

Claim 25, column 39, line 35, after the word "data", insert --and replacing each of the remaining pixels in each group of the second image data with a pixel obtained by processing two adjacent pixels in the first image data--.

Claim 29, column 40, line 28, insert the paragraph --a recording element for recording image data selected via the selecting element; and--.

Claim 29, column 40, line 29, delete "a recording", before "element" and insert therefor --an--.

Signed and Sealed this

Thirteenth Day of January, 2009

JON W. DUDAS
*Director of the United States Patent and Trademark Office*